(12) United States Patent
Klein et al.

(10) Patent No.: US 12,467,039 B2
(45) Date of Patent: Nov. 11, 2025

(54) KAURENOIC ACID 13-HYDROXYLASE (KAH) VARIANTS AND USES THEREOF

(71) Applicant: Amyris, Inc., Emeryville, CA (US)

(72) Inventors: Andrew P. Klein, Emeryville, CA (US); Sean Lund, Emeryville, CA (US); Gale Wichmann, Emeryville, CA (US); Irina Koryakina, Emeryville, CA (US); Kyle Hogan, Emeryville, CA (US); Svetlana Borisova, Emeryville, CA (US)

(73) Assignee: Amyris, Inc., Emeryville, CA (US)

( * ) Notice: Subject to any disclaimer, the term of this patent is extended or adjusted under 35 U.S.C. 154(b) by 716 days.

(21) Appl. No.: 17/608,437

(22) PCT Filed: May 1, 2020

(86) PCT No.: PCT/US2020/031171
§ 371 (c)(1),
(2) Date: Nov. 2, 2021

(87) PCT Pub. No.: WO2020/227148
PCT Pub. Date: Nov. 12, 2020

(65) Prior Publication Data
US 2022/0282228 A1    Sep. 8, 2022

Related U.S. Application Data

(60) Provisional application No. 62/842,810, filed on May 3, 2019.

(51) Int. Cl.
*C12N 9/02* (2006.01)
*C12P 19/56* (2006.01)

(52) U.S. Cl.
CPC ............ *C12N 9/0073* (2013.01); *C12P 19/56* (2013.01)

(58) Field of Classification Search
CPC .............................. C12N 9/0073; C12P 19/56
See application file for complete search history.

(56) References Cited

U.S. PATENT DOCUMENTS 10,612,064 B2 * 4/2020 Robertson ................ C12N 9/90
2017/0240942 A1  8/2017 Lunde Robertson et al.
(Continued)

FOREIGN PATENT DOCUMENTS

CN  107109358 A  8/2017
CN  108396044 A  8/2018
(Continued)

OTHER PUBLICATIONS von Heijne, G. The Signal Peptide. J. Membrane Biol. 115, 195-201 (1990) (Year: 1990).*
(Continued)

*Primary Examiner* — Louise W Humphrey
*Assistant Examiner* — Rachel Emily Martin
(74) *Attorney, Agent, or Firm* — Clark & Elbing LLP

(57) ABSTRACT

Provided herein are genetically modified host cells, compositions, and methods for improved production of steviol glycosides. The host cells are genetically modified to contain a heterologous nucleic acid that expresses novel and optimized variants of Ro.KAH. The host cell further contains one or more heterologous nucleotide sequence encoding further enzymes of a pathway capable of producing one or more steviol glycosides in the host cell. The host cells, compositions, and methods described herein provide an efficient route for the heterologous production of steviol glycosides including rebaudioside A, rebaudioside D, and rebaudioside M.

17 Claims, 9 Drawing Sheets

Specification includes a Sequence Listing.

(56) References Cited

U.S. PATENT DOCUMENTS

| | | |
|---|---|---|
| 2017/0369922 A1 | 12/2017 | Olsson et al. |
| 2018/0148750 A1 | 5/2018 | Anderson et al. |
| 2019/0078105 A1 | 3/2019 | Van Leeuwen et al. |

FOREIGN PATENT DOCUMENTS

| | | |
|---|---|---|
| EP | 3215629 A4 | 6/2018 |
| JP | 2017-528134 A | 9/2017 |
| WO | WO-2014/122328 A1 | 8/2014 |
| WO | WO-2015/139599 A1 | 9/2015 |
| WO | WO-2016/038095 A2 | 3/2016 |
| WO | WO-2017/098017 A1 | 6/2017 |
| WO | WO-2018/031955 A2 | 2/2018 |
| WO | WO-2018/211032 A1 | 11/2018 |
| WO | WO-2020/081468 A1 | 4/2020 |

OTHER PUBLICATIONS

Jennings JC, Coolbaugh RC, Nakata DA, West CA. Characterization and Solubilization of Kaurenoic Acid Hydroxylase from Gibberella fujikuroi. Plant Physiol. Mar. 1993; 101(3):925-930. doi: 10.1104/pp.101.3.925. PMID: 12231743; PMCID: PMC158708. (Year: 1993).*

Gangl D, Zedler JA, Włodarczyk A, Jensen PE, Purton S, Robinson C. Expression and membrane-targeting of an active plant cytochrome P450 in the chloroplast of the green alga Chlamydomonas reinhardtii. Phytochemistry. Feb. 2015;110:22-8. doi: 10.1016/j.phytochem. 2014.12.006. (Year: 2015).*

Raymond et al., "The Rosa genome provides new insights into the domestication of modern roses," Nat Genet. 50(6):772-7 (2018).

"Cytochrome P450 72A15-like isoform X1 [Rosa chinensis]," NCBI Protein Database Accession No. XP_024159575.1, accessed Mar. 19, 2018 (2 pages).

"Predicted: cytochrome P450 CYP72A219-like isoform X2 [Prunus mume]," NCBI Protein Database Accession No. XP_008226214.1, accessed May 11, 2016 (2 pages).

Kim et al., "Hydroxylation of ent-kaurenoic acid to steviol in Stevia rebaudiana Bertoni—purification and partial characterization of the enzyme," Arch Biochem Biophys. 332(2):223-230 (Aug. 1996).

Extended European Search Report for European Patent Application No. 20802800, dated May 12, 2023 (15 pages).

Broun et al., "Catalytic plasticity of fatty acid modification enzymes underlying chemical diversity of plant lipids," Science 282(5392):1315-7 (1998) (4 pages).

Whisstock et al., "Prediction of protein function from protein sequence and structure," Q Rev Biophys. 36(3):307-40 (2003).

Seffernick et al., "Melamine deaminase and atrazine chlorohydrolase: 98 percent identical but functionally different," J Bacteriol. 183(8):2405-10 (2001).

Witkowski et al., "Conversion of a beta-ketoacyl synthase to a malonyl decarboxylase by replacement of the active-site cysteine with glutamine," Biochemistry. 38(36):11643-50 (Sep. 1999).

Novikova et al., "From structure and function of steroid enzymes to new technologies of gene engineering," Adv Biol Chem. 49:159-210 (2009).

Office Action and Search Report for Chinese Patent Application No. 202080040694.5, dated Sep. 16, 2023 (18 pages).

Office Action for Japanese Patent Application No. 2021-564945, dated May 28, 2024 (7 pages).

Substantive Examination Adverse Report for Malaysian Patent Application No. PI2021006442, dated Sep. 24, 2024 (4 pages).

Written Opinion and Search Report for Singaporean Patent Application No. 11202111698S, dated Nov. 8, 2023 (10 pages).

* cited by examiner

KAURENOIC ACID 13-HYDROXYLASE (KAH) VARIANTS AND USES THEREOF

SEQUENCE LISTING

The instant application contains a Sequence Listing which has been submitted electronically in ASCII format and is hereby incorporated by reference in its entirety. Said ASCII copy, created on Apr. 13, 2022, is named 51494-009002_Sequence_Listing_4_13_22_ST25 and is 100,339 bytes in size.

FIELD OF THE INVENTION

The present disclosure relates to Kaurenoic Acid 13-Hydroxylase (KAH) variants, host cells comprising the same, and methods of their use for the production of heterologous molecules.

BACKGROUND

Reduced-calorie sweeteners derived from natural sources are desired to limit the health effects of high-sugar consumption. The stevia plant (*Stevia rebaudiana* Bertoni) produces a variety of sweet-tasting glycosylated diterpenes termed steviol glycosides. Of all the known steviol glycosides, Reb M has the highest potency (~300 times sweeter than sucrose) and has the most appealing flavor profile. However, Reb M is only produced in minute quantities by the stevia plant and is a small fraction of the total steviol glycoside content (<1.0%), making the isolation of Reb M from stevia leaves impractical. Alternative methods of obtaining Reb M are needed. One such approach is the application of synthetic biology to design microorganisms (e.g. yeast) that produce large quantities of Reb M from sustainable feedstock sources.

To economically produce a product using synthetic biology, each step in the bioconversion from feedstock to product needs to have a high conversion efficiency (ideally >90%). In our engineering of yeast to produce Reb M, we noted that particular enzymatic steps performed poorly in yeast when the wild-type enzyme was used. In order to increase the productivity and yield of Reb M in microorganisms, we sought to produce variant enzymes that performed better than wild-type enzymes. One such enzyme is kaurenoic acid 13-hydroxylase (KAH) which catalyzes the conversion of ent-kaurenoic acid into steviol.

SUMMARY OF THE INVENTION

Provided herein are compositions and methods for the improved conversion of kaurenoic acid to steviol. These compositions and methods are based in part on the production of certain variant kaurenoic acid hydroxylases (KAHs) that are capable of converting kaurenoic acid to steviol with high efficiency.

In one aspect, the invention provides for a host cell having a kaurenoic acid hydroxylase polypeptide having at least 90% sequence identity to the sequence of SEQ ID NO: 1.

In one aspect, the invention provides generally for a variant kaurenoic acid hydroxylase polypeptide having the amino acid sequence of SEQ ID NO: 1, wherein the sequence further contains one or more amino acid substitutions.

In another aspect, the invention provides for nucleic acids encoding variant kaurenoic acid hydroxylase polypeptides having the amino acid sequence of SEQ ID NO: 1 wherein the sequence further contains one or more amino acid substitutions. In another aspect, the invention provides for nucleic acids encoding any one of the variant polypeptides described herein.

In yet another aspect, the invention provides for host cells containing the variant kaurenoic acid hydroxylase polypeptides having the amino acid sequence of SEQ ID NO: 1, wherein the sequence further contains one or more amino acid substitutions. In another aspect, the invention provides for a host cell comprising any one of the polypeptides or nucleic acids described herein.

In a further aspect, the invention provides for host cells containing nucleic acids encoding variant kaurenoic acid hydroxylase polypeptides having the amino acid sequence of SEQ ID NO: 1, wherein the sequence further contains one or more amino acid substitutions.

In an embodiment, the invention provides that the one or more amino acid substitutions are selected from K69R, V343G, T403V, H491P, P72D, L64D, Q84C, L64G, E206D, Y238C, A210G, L64N, I237C, L11V, N207F, M73G, W8G, E60R, Y55S, N475G, D292P, P161C, K267D, L485F, A396F, R507A, P72T, I132G, N61P, K119V, T220E, P72G, Q513R, S133G, Y506V, K69P, E60G, K224C, M73H, H379G, P72C, K314P, W202A, G466F, N49A, S339G, N160D, T216G, D102Y, F246G, M58P, T220R, R458G, M58G, A68I, S70P, F88V, T240D, L205I, K167G, L232M, S62R, G56D, Q244G, A242D, N49R, Q513G, W29T, L303D, T378D, I508L, W202Q, S505R, R233C, I104D, M258G, K69G, F88D, F88S, A217V, E230C, R507G, G466S, G56S, E230G, Y55G, A503C, S460I, I129R, S245G, F246S, Q84L, S133R, T509V, R507E, R233T, V30F, A68G, G56N, T162G, A68P, S165D, K119Y, W29C, S165P, W29V, I284C, A217L, Q335V, L65S, F53R, Y55P, W202V, K224V, W29A, H164G, Q244D, K291C, L65G, K167S, C327I, K291S, D57G, K167H, N160T, W202C, A242G, F88R, I104N, G466D, N475D, K119S, T123D, T216A, S339A, P161D, I104R, L54G, M171F, L232Y, D293C, V340A, T162A, A297V, I104H, F332L, A236R, K224I, S452D, I104A, V340S, F229Y, A297Y, and A297F. In another embodiment, the one or more amino acid substitutions are selected from N146W, A297Y, A236S, V9S, G466F, T283D, T142G, T425V, L459C, T283A, T283G, S460V, S133G, I129V, W52G, S505I, I243T, V340S, S460C, S452D, L118I, S505V, T123D, W52C, S460I, S457G, W52R, W52N, N146T, G466A, and W52T. In a particular embodiment, the one or more amino acid substitutions are selected from A297V, I104H, F332L, A236R, K224I, S452D, I104A, I104A, V340S, F229Y, A297Y, and A297F. In a preferred embodiment, the one or more amino acid substitutions are selected from S452D, I104A, V340S, F229Y, A297Y, and A297F. In further embodiments, the variant polypeptide has a substitution of the N-terminal signal sequence with the signal sequence of another p450 polypeptide. In some embodiments, the N-terminal signal sequence corresponds to amino acids 1-25 of SEQ ID NO: 1. In some embodiments, the signal sequence of another p450 polypeptide has the amino acid sequence of SEQ ID NO: 22. In some embodiments, the variant polypeptide includes the amino acid substitution A297Y and may also include one or more additional amino acid substitutions. In some embodiments, the variant polypeptide includes the amino acid substitutions comprising N146T/A297Y and may also include one or more additional amino acid substitutions. In some embodiments, the variant polypeptide has the amino acid substitutions selected from N146T/A297Y/G466A; W52T/N146T/A297Y; T142G/N146T/A297Y/G466A; W52T/T142G/N146T/A297Y; and W52T/T142G/

N146T/A297Y/G466A. In preferred embodiments, the variant polypeptide has the amino acid sequence of SEQ ID NO: 17, SEQ ID NO: 18, SEQ ID NO: 19, SEQ ID NO: 20, and SEQ ID NO: 21. In some embodiments, the variant polypeptide has the amino acids substitutions selected from W52T/T142G/G466A; A145G/N14F/A297Y; N146W/A297Y/S460I; W52N/N146W/A297Y; F332L/S452D; N146W/A297Y; and Q84R/N146T/A297Y.

In an embodiment, of the invention the host cell is capable of producing one or more steviol glycosides. In another embodiment, the one or more steviol glycosides are selected from RebA, RebB, RebD, RebE, and RebM. In a preferred embodiment, the one or more steviol glycosides is RebM.

In an embodiment, the host cells of the invention contain one or more nucleic acids encoding one or more enzymes of a pathway for making a steviol glycoside. In another embodiment the host cells contain a nucleic acid encoding a geranylgeranyl diphosphate synthase. In yet another embodiment, the host cells contain a nucleic acid encoding a copalyl diphosphate synthase. In another embodiment, the host cells contain a nucleic acid encoding an ent-kaurene synthase. In yet another embodiment, the host cells contain a nucleic acid encoding a kaurene oxidase. In another embodiment, the host cells contain a nucleic acid encoding a cytochrome P450 reductase. In yet another embodiment, the host cells contain a nucleic acid encoding one or more uridine 5'-diphosphate-dependent glycosyltransferases. In a preferred embodiment, the host cells contain one or more nucleic acids encoding a geranylgeranyl diphosphate synthase, a copalyl diphosphate synthase, an ent-kaurene synthase, a kaurene oxidase, a cytochrome P450 reductase, UGT40087, UGT74G1, UGT76G1, UGT85C2, EUGT11, and UGT91D.

In an embodiment, the host cells can be bacterial cells, yeast cells, algal cells, insect cells, or plant cells. In a particular embodiment, the host cells are yeast cells. In a preferred embodiment, the host cells are *Saccharomyces cerevisiae*.

In yet another aspect, the invention provides for a method for producing one or more steviol glycosides involving the steps of a) culturing a population of host cells of the invention in a medium with a carbon source under conditions suitable for making one or more steviol glycosides to yield a culture broth; and b) recovering the one or more steviol glycosides from the culture broth. In a preferred embodiment, the method involves the recovery of RebM.

In a further embodiment, the invention provides for a fermentation composition containing a host cell comprising a nucleic acid encoding a variant kaurenoic acid hydroxylase of the invention; and one or more steviol glycosides produced by the host cell. In a preferred embodiment, the fermentation composition contains RebM.

In an embodiment, the kaurenoic acid hydroxylase polypeptide has an amino acid sequence at least 90% (e.g., at least 91%, 92%, 93%, 94%, 95%, 96%, 97%, 98%, or 99%) identical to the sequence of SEQ ID NO: 1. In a preferred embodiment, host cells of the invention have a kaurenoic acid hydroxylase polypeptide having the amino acid sequence of SEQ ID NO: 1. In some embodiments, host cells of the invention have a kaurenoic acid hydroxylase polypeptide having the amino acid sequence of the kaurenoic acid hydroxylase polypeptide comprises the amino sequence selected from SEQ ID NO: 1, SEQ ID NO: 17, SEQ ID NO: 18, SEQ ID NO: 19, SEQ ID NO: 20, and SEQ ID NO: 21.

In one aspect, the invention provides compositions and food that contains RebM produced by a method of the invention or by a host cell of the invention. In another aspect, the invention provides a composition containing a steviol glycoside (e.g., RebA, RebB, RebD, RebE, or RebM) that is free of any other plant-derived material. In some embodiments, the steviol glycoside is RebM.

BRIEF DESCRIPTION OF THE FIGURES

FIG. 6B is a region of interest from CAD chromatogram for whole cell broth extracts of yeast cultures expressing wild-type Ro.KAH, Sr.KAH, Rs.KAH, or no KAH. The peaks for Reb M and C20H32O4+1Glc are labeled. FIG. 6C is full mass spectrum for the peak at 9.5 min in the Ro.KAH chromatogram. FIG. 6D is an MS2 fragmentation spectra for the peak at 9.5 min in the Ro.KAH chromatogram.

Improvements in specificity (x axis) are calculated as follows, $$\frac{[Reb\,M\,titer]_{mutant} / [Reb\,M\,titer]_{wild-type}}{[C20H32O4 + 1Glc \text{ peak area}]_{mutant} / [C20H32O4 + 1Glc \text{ peak area}]_{wild-type}}.$$

Figure 7:
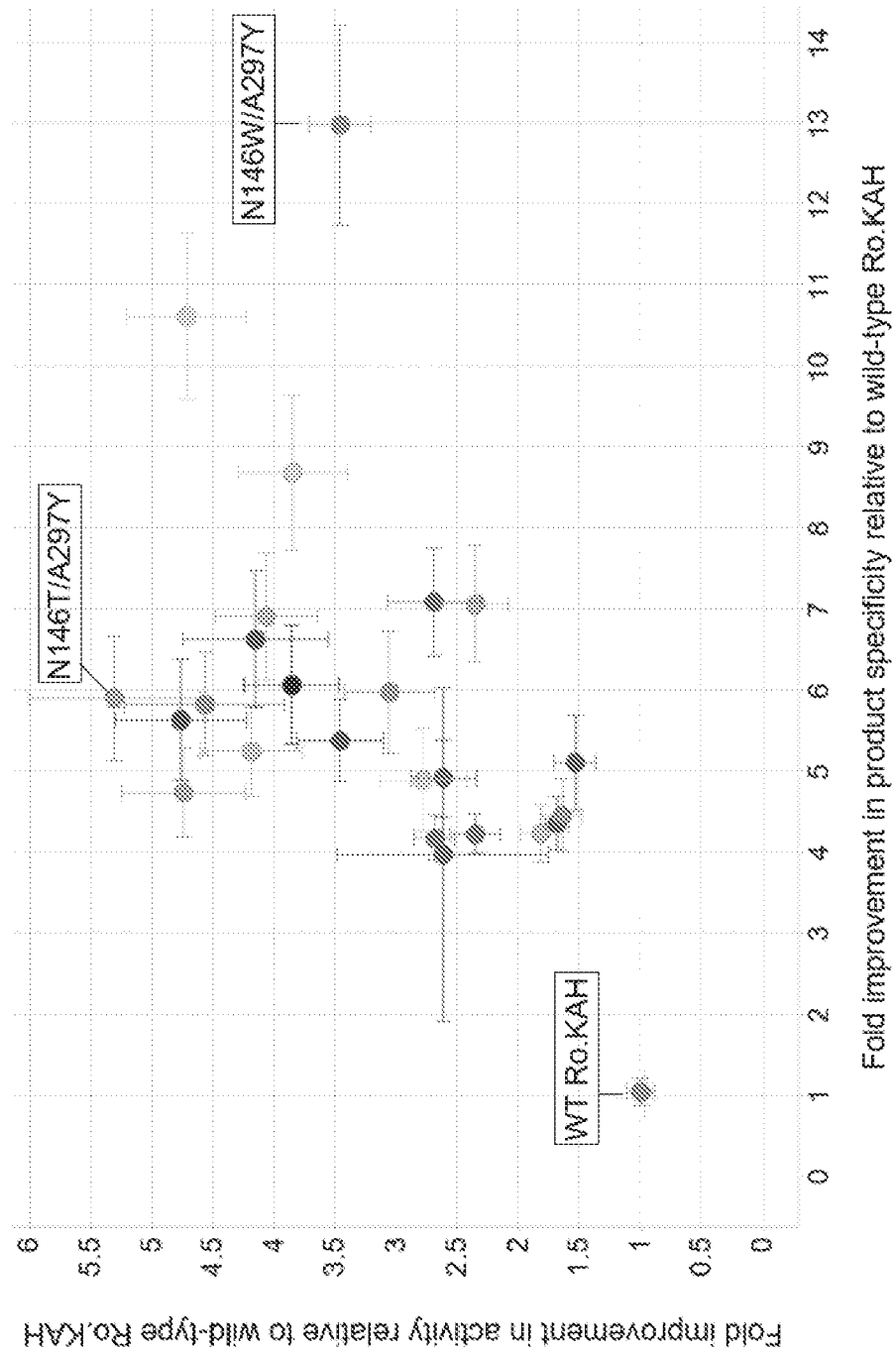
FIG. 7 is a graph depicting improvements in the in vivo activity and product specificity of Ro.KAH mutants generated via site-directed saturation mutagenesis of Ro.KAH A297Y relative to wild-type Ro.KAH. Improvements in activity (y axis) calculated as follows, $$\frac{[Reb\ M\ titer]_{mutant}}{[Reb\ M\ titer]_{wild-type}}.$$
Figure 8:
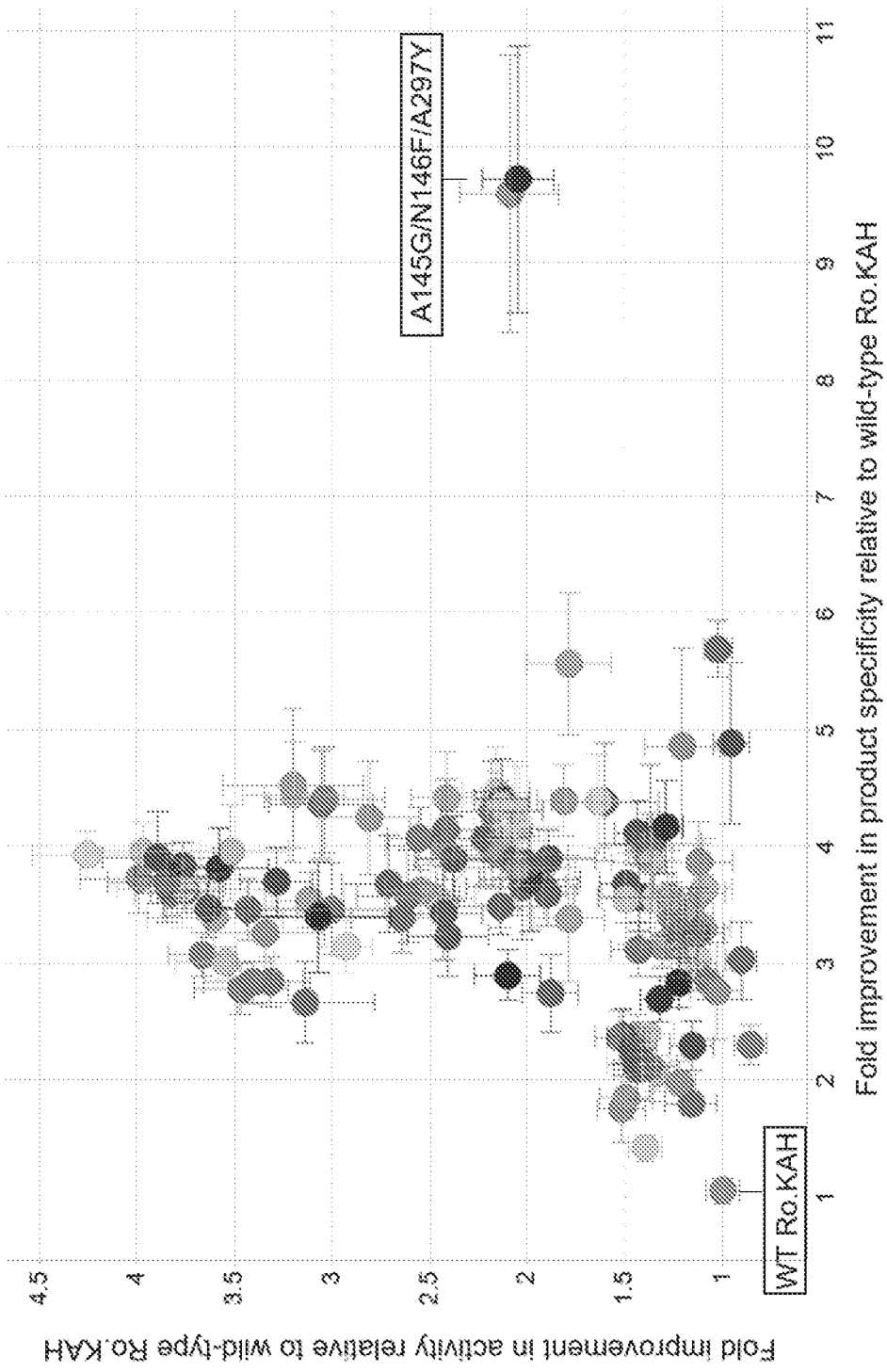

FIG. 8 is a graph depicting improvements in the in vivo activity and product specificity of Ro.KAH mutants generated via combinatorial site-directed saturation mutagenesis of Ro.KAH A297Y relative to wild-type Ro.KAH. Improvements in activity (y axis) and specificity (x axis) are calculated as described in FIG. 7 legend.

Figure 9:
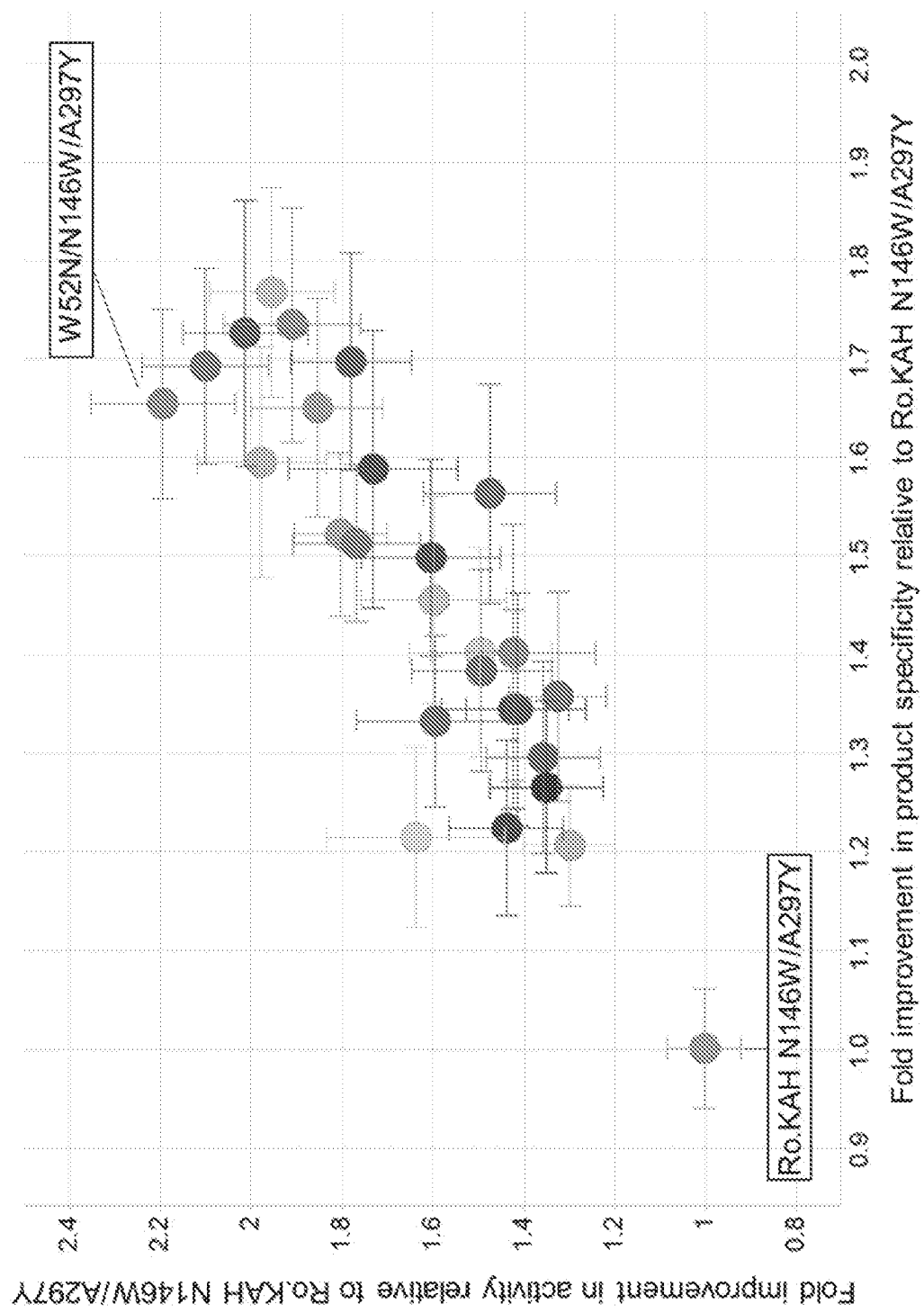

FIG. 9 is a graph depicting improvements in the in vivo activity and product specificity of Ro.KAH mutants generated via full site-directed saturation mutagenesis of Ro.KAH N146W/A297Y relative to Ro.KAH N146W/A297Y. Improvements in activity (y axis) and specificity (x axis) are calculated as described in FIG. 7 legend.

DETAILED DESCRIPTION OF THE EMBODIMENTS

As used herein, the term "heterologous" refers to what is not normally found in nature. The term "heterologous nucleotide sequence" refers to a nucleotide sequence not normally found in a given cell in nature. As such, a heterologous nucleotide sequence may be: (a) foreign to its host cell (i.e., is "exogenous" to the cell); (b) naturally found in the host cell (i.e., "endogenous") but present at an unnatural quantity in the cell (i.e., greater or lesser quantity than naturally found in the host cell); or (c) be naturally found in the host cell but positioned outside of its natural locus.

As used herein, the terms "native" or "endogenous" with reference to molecules, and in particular polypeptides and polynucleotides, indicate molecules that are expressed in the organism in which they originated or are found in nature. It is understood that expression of native polypeptides or polynucleotides may be modified in recombinant organisms.

As used herein, the term "variant" refers to molecules, and in particular polypeptides and polynucleotides, that differ from a specifically recited "reference" molecule in either structure or sequence. In preferred embodiments, the reference is a wild-type molecule. With respect to polypeptides and polynucleotides, variants refer to substitutions, additions, or deletions of the amino acid or nucleotide sequences respectively.

As used herein, the term "heterologous nucleic acid expression cassette" refers to a nucleic acid sequence that comprises a coding sequence operably linked to one or more regulatory elements sufficient to express the coding sequence in a host cell.

As used herein, the term "kaurenoic acid 13-hydroxylase" or "KAH" refers to an enzyme that is able to catalyze the conversion of ent-kaurenoic acid to steviol.

As used herein, the term "parent cell" refers to a cell that has an identical genetic background as a genetically modified host cell disclosed herein except that it does not comprise one or more particular genetic modifications engineered into the modified host cell, for example, one or more modifications selected from the group consisting of: heterologous expression of an enzyme of a steviol pathway, steviol glycoside pathway, heterologous expression of an enzyme of a steviol glycoside pathway, heterologous expression of a geranylgeranyl diphosphate synthase, heterologous expression of a copalyl diphosphate synthase, heterologous expression of a kaurene synthase, heterologous expression of a kaurene oxidase, heterologous expression of a steviol synthase (kaurenoic acid hydroxylase), heterologous expression of a cytochrome P450 reductase, heterologous expression of a UDP-glycosyltransferase including for example EUGT11, UGT74G1, UGT76G1, UGT85C2, UGT91D, and UGT40087 or variants thereof.

As used herein, the term "medium" refers to culture medium and/or fermentation medium.

As used herein, the term "fermentation composition" refers to a composition which comprises genetically modified host cells and products or metabolites produced by the genetically modified host cells. An example of a fermentation composition is a whole cell broth, which may be the entire contents of a vessel, including cells, aqueous phase, and compounds produced from the genetically modified host cells.

As used herein, the term "production" generally refers to an amount of steviol glycoside produced by a genetically modified host cell provided herein. In some embodiments, production is expressed as a yield of steviol glycoside by the host cell. In other embodiments, production is expressed as the productivity of the host cell in producing the steviol glycoside.

As used herein, the term "yield" refers to production of a steviol glycoside by a host cell, expressed as the amount of steviol glycoside produced per amount of carbon source consumed by the host cell, by weight.

As used herein, the term "productivity" refers to production of steviol glycoside by a host cell, expressed as the amount of steviol glycoside produced (by weight) per amount of fermentation broth in which the host cell is cultured (by volume) over time (per hour).

As used herein, the term "signal sequence" or "N-terminal signal sequence" refers to a short peptide (e.g., 5-50 amino acids in length) at the N-terminus of a polypeptide that directs a polypeptide towards the secretory pathway (e.g., the extracellular space). The signal peptide is typically cleaved during secretion of the polypeptide. The signal sequence may direct the polypeptide to an intracellular compartment or organelle, e.g., the endoplasmic reticulum. A signal sequence may be identified by homology, or biological activity, to a peptide with the known function of targeting a polypeptide to a particular region of the cell. One of ordinary skill in the art can identify a signal peptide by using readily available software (e.g., Sequence Analysis Software Package of the Genetics Computer Group, University of Wisconsin Biotechnology Center, 1710 University Avenue, Madison, Wis. 53705, BLAST, or PILEUP/PRETTYBOX programs). A signal peptide can be one that is, for example, substantially identical to the amino acid sequence of SEQ ID NO: 22 or the amino acids 1-25 of SEQ ID NO: 1. An N-terminal signal sequence may be replaced with a corresponding amino acid sequence encoding a heterologous N-terminal signal sequence (e.g., an N-terminal signal sequence from plant p450 polypeptide).

As used herein, the term "kaurenoic acid" refers to the compound kaurenoic acid, including any stereoisomer of kaurenoic acid. In preferred embodiments, the term refers to the enantiomer known in the art as ent-kaurenoic acid and having the following structure:

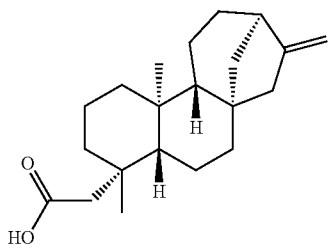

As used herein, the term "steviol" refers to the compound steviol, including any stereoisomer of steviol. In preferred embodiments, the term refers to the compound having the following structure:

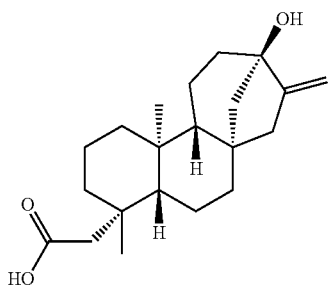

As used herein, the term "steviol glycoside" refers to a glycoside of steviol including but not limited to 19-glycoside, steviolmonoside, steviolbioside, rubusoside, dulcoside B, dulcoside A, rebaudioside A, rebaudioside B, rebaudioside C, rebaudioside D, rebaudioside E, rebaudioside F, rebaudioside G, rebaudioside H, rebaudioside I, rebaudioside J, rebaudioside K, rebaudioside L, rebaudioside M, rebaudioside N, rebaudioside O, rebaudioside D2, and rebaudioside M2.

As used herein, the term "rebaudioside M" or "Reb M" refers to a steviol glycoside having the following structure:

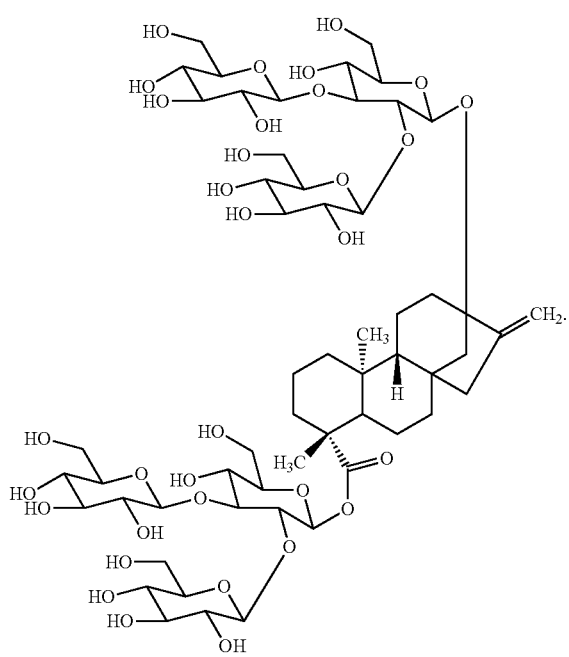

As used herein, the term "sequence identity" or "percent identity" in the context of two or more polynucleotide or polypeptide sequences, refers to two or more sequences or subsequences that are the same or have a specified percentage of nucleotides or amino acid residues that are the same. For example, the sequence may have a percent identity of at least 60%, at least 65%, at least 70%, at least 75%, at least 80%, at least 85%, at least 90%, at least 91%, at least 92%, at least 93%, at least 94%, at least 95%, at least 96%, at least 97%, at least 98%, at least 99%, or higher identity over a specified region to a reference sequence when compared and aligned for maximum correspondence over a comparison window, or designated region as measured using a sequence comparison algorithm or by manual alignment and visual inspection. For example, percent identity is determined by calculating the ratio of the number of identical nucleotides (or amino acid residues) in the sequence divided by the length of the total nucleotides (or amino acid residues) minus the lengths of any gaps.

For convenience, the extent of identity between two sequences can be ascertained using computer programs and mathematical algorithms known in the art. Such algorithms that calculate percent sequence identity generally account for sequence gaps and mismatches over the comparison region. Programs that compare and align sequences, like Clustal W (Thompson et al. (1994) *Nuclei Acids Res.*, vol. 22, pp. 4673-4680), ALIGN (Myers et al., (1988) *CABIOS*, vol. 4, pp. 11-17), FASTA (Pearson et al., (1988) *PNAS*, vol. 85, pp. 2444-2448; Pearson (1990) *Methods Enzymol.*, vol. 183, pp. 63-98), and gapped BLAST (Altschul et al., (1997) *Nucleic Acids Res.*, vol. 25, pp. 3389-3402) are useful for this purpose. The BLAST or BLAST 2.0 (Altschul et al., (1990) *J. Mol. Biol.*, vol. 215 pp. 403-410) are available from several sources, including the National Center for Biological Information (NCBI) and on the Internet, for use in connection with the sequence analysis programs BLASTP, BLASTN, BLASTX, TBLASTN, and TBLASTX. Additional information can be found at the NCBI web site.

In certain embodiments, the sequence alignments and percent identity calculations can be determined using the BLAST program using its standard, default parameters. For nucleotide sequence alignment and sequence identity calculations, the BLASTN program is used with its default parameters (Gap opening penalty=5, Gap extension penalty=2, Nucleic match=2, Nucleic mismatch=−3, Expectation value=10.0, Word size=11, Max matches in a query range=0). For polypeptide sequence alignment and sequence identity calculations, BLASTP program is used with its default parameters (Alignment matrix=BLOSUM62; Gap costs: Existence=11, Extension=1; Compositional adjustments=Conditional compositional score, matrix adjustment; Expectation value=10.0; Word size=6; Max matches in a query range=0). Alternatively, the following program and parameters can be used: Align Plus software of Clone Manager Suite, version 5 (Sci-Ed Software); DNA comparison: Global comparison, Standard Linear Scoring matrix, Mismatch penalty=2, Open gap penalty=4, Extend gap penalty=1. Amino acid comparison: Global comparison, BLOSUM 62 Scoring matrix. In the embodiments described herein, the sequence identity is calculated using BLASTN or BLASTP programs using their default parameters. In the embodiments described herein, the sequence alignment of two or more sequences are performed using Clustal W using the suggested default parameters (Dealign input sequences: no; Mbed-like clustering guide-tree: yes; Mbed-like clustering iteration: yes; number of combined iterations: default(0); Max guide tree iterations: default; Max HMM iterations: default; Order: input).

In certain embodiments of the invention, the parental host cell may comprise one or more enzymatic pathways capable of making kaurenoic acid. As described herein, the host cells comprise a *Rubus occidentalis* kaurenoic acid hydroxylase and variants thereof provided herein, capable of converting kaurenoic acid to steviol. In some embodiments, the host cell further comprises one or more enzymes capable of converting farnesyl diphosphate to geranylgeranyl diphosphate. In further embodiments, the host cell comprises one or more enzymes capable of converting copalyl diphosphate to kaurene. In certain embodiments, the host cell further comprises one or more enzymes capable of converting kaurene to kaurenoic acid. In certain embodiments, the host cell further comprises one or more enzymes capable of converting steviol to one or more steviol glycosides. In certain embodiments, the host cell further comprises one, two, three, four, or more enzymes together capable of converting steviol to Reb A. In certain embodiments, the host cell further comprises one or more enzymes capable of converting Reb A to Reb D. In certain embodiments, the host cell further comprises one or more enzymes capable of converting Reb D to Reb M. Useful enzymes and nucleic acids encoding the enzymes are known to those of skill in the art. Particularly useful enzymes and nucleic acids are described in the sections below and further described, for example in US2014/0329281 A1, US2014/0357588 A1, US2015/0159188, WO2016/038095 A2, and US2016/0198748 A1.

In further embodiments, the host cells further comprise one or more enzymes capable of making geranylgeranyl diphosphate from a carbon source. These include enzymes of the DXP pathway and enzymes of the MEV pathway. Useful enzymes and nucleic acids encoding the enzymes are known to those of skill in the art. Exemplary enzymes of each pathway are described below and further described, for example, in US2016/0177341 A1 which is incorporated by reference herein in its entirety.

In some embodiments, the host cells comprise one or more or all of the isoprenoid pathway enzymes selected from the group consisting of: (a) an enzyme that condenses two molecules of acetyl-coenzyme A to form acetoacetyl-CoA (e.g., an acetyl-coA thiolase); (b) an enzyme that condenses acetoacetyl-CoA with another molecule of acetyl-CoA to form 3-hydroxy-3-methylglutaryl-CoA (HMG-CoA) (e.g., an HMG-CoA synthase); (c) an enzyme that converts HMG-CoA into mevalonate (e.g., an HMG-CoA reductase); (d) an enzyme that converts mevalonate into mevalonate 5-phosphate (e.g., a mevalonate kinase); (e) an enzyme that converts mevalonate 5-phosphate into mevalonate 5-pyrophosphate (e.g., a phosphomevalonate kinase); (f) an enzyme that converts mevalonate 5-pyrophosphate into isopentenyl diphosphate (IPP) (e.g., a mevalonate pyrophosphate decarboxylase); (g) an enzyme that converts IPP into dimethylallyl pyrophosphate (DMAPP) (e.g., an IPP isomerase); (h) a polyprenyl synthase that can condense IPP and/or DMAPP molecules to form polyprenyl compounds containing more than five carbons; (i) an enzyme that condenses IPP with DMAPP to form geranyl pyrophosphate (GPP) (e.g., a GPP synthase); (j) an enzyme that condenses two molecules of IPP with one molecule of DMAPP (e.g., an FPP synthase); (k) an enzyme that condenses IPP with GPP to form farnesyl pyrophosphate (FPP) (e.g., an FPP synthase); (l) an enzyme that condenses IPP and DMAPP to form geranylgeranyl pyrophosphate (GGPP); and (m) an enzyme that condenses IPP and FPP to form GGPP.

In certain embodiments, the additional enzymes are native. In advantageous embodiments, the additional enzymes are heterologous. In certain embodiments, two or more enzymes may be combined in one polypeptide.

Cell Strains

Host cells of the invention provided herein include archae, prokaryotic, and eukaryotic cells.

Suitable prokaryotic host cells include, but are not limited to, any of a gram-positive, gram-negative, and gram-variable bacteria. Examples include, but are not limited to, cells belonging to the genera: *Agrobacterium, Alicyclobacillus, Anabaena, Anacystis, Arthrobacter, Azobacter, Bacillus, Brevibacterium, Chromatium, Clostridium, Corynebacterium, Enterobacter, Erwinia, Escherichia, Lactobacillus, Lactococcus, Mesorhizobium, Methylobacterium, Microbacterium, Phormidium, Pseudomonas, Rhodobacter, Rhodopseudomonas, Rhodospirillum, Rhodococcus, Salmonella, Scenedesmun, Serratia, Shigella, Staphylococcus, Streptomyces, Synechococcus*, and *Zymomonas*. Examples of prokaryotic strains include, but are not limited to: *Bacillus subtilis, Bacillus amyloliquefacines, Brevibacterium ammoniagenes, Brevibacterium immariophilum, Clostridium beijerinckii, Enterobacter sakazakii, Escherichia coli, Lactococcus lactis, Mesorhizobium loti, Pseudomonas aeruginosa, Pseudomonas mevalonii, Pseudomonas pudica, Rhodobacter capsulatus, Rhodobacter sphaeroides, Rhodospirillum rubrum, Salmonella enterica, Salmonella typhi, Salmonella typhimurium, Shigella dysenteriae, Shigella flexneri, Shigella sonnei*, and *Staphylococcus aureus*. In a particular embodiment, the host cell is an *Escherichia coli* cell.

Suitable archae hosts include, but are not limited to, cells belonging to the genera: *Aeropyrum, Archaeoglobus, Halobacterium, Methanococcus, Methanobacterium, Pyrococcus, Sulfolobus*, and *Thermoplasma*. Examples of archae strains include, but are not limited to: *Archaeoglobus fulgidus, Halobacterium sp., Methanococcus jannaschii, Methanobacterium thermoautotrophicum, Thermoplasma acidophilum, Thermoplasma volcanium, Pyrococcus horikoshii, Pyrococcus abyssi*, and *Aeropyrum pernix*.

Suitable eukaryotic hosts include, but are not limited to, fungal cells, algal cells, insect cells, and plant cells. In some embodiments, yeasts useful in the present methods include yeasts that have been deposited with microorganism depositories (e.g. IFO, ATCC, etc.) and belong to the genera *Aciculoconidium, Ambrosiozyma, Arthroascus, Arxiozyma, Ashbya, Babjevia, Bensingtonia, Botryoascus, Botryozyma, Brettanomyces, Bullera, Bulleromyces, Candida, Citeromyces, Clavispora, Cryptococcus, Cystofilobasidium, Debaryomyces, Dekkara, Dipodascopsis, Dipodascus, Eeniella, Endomycopsella, Eremascus, Eremothecium, Erythrobasidium, Fellomyces, Filobasidium, Galactomyces, Geotrichum, Guilliermondella, Hanseniaspora, Hansenula, Hasegaw aea, Holtermannia, Hormoascus, Hyphopichia, Issatchenkia, Kloeckera, Kloeckeraspora, Kluyveromyces, Kondoa, Kuraishia, Kurtzmanomyces, Leucosporidium, Lipomyces, Lodderomyces, Malasserzia, Metschnikowia, Mrakia, Myxozyma, Nadsonia, Nakazawaea, Nematospora, Ogataea, Oosporidium, Pachysolen, Phachytichospora, Phaffia, Pichia, Rhodosporidium, Rhodotorula, Saccharomyces, Saccharomycodes, Saccharomycopsis, Saitoella, Sakaguchia, Saturnospora, Schizoblastoporion, Schizosaccharomyces, Schwanniomyces, Sporidiobolus, Sporobolomyces, Sporopachydermia, Stephanoascus, Sterigmatomyces, Sterigmatosporidium, Symbiotaphrina,*

*Sympodiomyces, Sympodiomycopsis, Torulaspora, Trichosporiella, Trichosporon, Trigonopsis, Tsuchiyaea, Udeniomyces, Waltomyces, Wickerhamia, Wickerhamiella, Williopsis, Yamadazyma, Yarrowia, Zygoascus, Zygosaccharomyces, Zygowilliopsis,* and *Zygozyma.*

In some embodiments, the host microbe is *Saccharomyces cerevisiae, Pichia pastoris, Schizosaccharomyces pombe, Dekkera bruxellensis, Kluyveromyces lactis* (previously called *Saccharomyces lactis*), *Kluveromyces marxianus, Arxula adeninivorans,* or *Hansenula polymorpha* (now known as Pichia angusta). In some embodiments, the host microbe is a strain of the genus *Candida,* such as *Candida hpolytica, Candida guilliermondii, Candida krusei, Candida pseudotropicalis,* or *Candida utils.*

In preferred embodiments, the host microbe is *Saccharomyces cerevisiae.* In some embodiments, the host is a strain of *Saccharomyces cerevisiae* selected from Baker's yeast, CEN.PK2, CBS 7959, CBS 7960, CBS 7961, CBS 7962, CBS 7963, CBS 7964, IZ-1904, TA, BG-1, CR-1, SA-1, M-26, Y-904, PE-2, PE-5, VR-1 BR-1, BR-2, ME-2, VR-2, MA-3, MA-4, CAT-1, CB-1, NR-1, BT-1, and AL-1. In some embodiments, the host microbe is a strain of *Saccharomyces cerevisiae* selected from PE-2, CAT-1, VR-1, BG-1, CR-1, and SA-1. In a particular embodiment, the strain of *Saccharomyces cerevisiae* is PE-2. In another particular embodiment, the strain of *Saccharomyces cerevisiae* is CAT-1. In another particular embodiment, the strain of *Saccharomyces cerevisiae* is BG-1.

The Steviol Glycoside Biosynthesis Pathway

In some embodiments, a steviol glycoside biosynthesis pathway is activated in the genetically modified host cells by engineering the cells to express polynucleotides encoding enzymes capable of catalyzing the biosynthesis of steviol glycosides.

In some embodiments, the genetically modified host cells contain a heterologous polynucleotide encoding geranylgeranyl diphosphate synthase (GGPPS), a heterologous polynucleotide encoding copalyl diphosphate synthase (CDPS), a heterologous polynucleotide encoding kaurene synthase (KS), a heterologous polynucleotide encoding kaurene oxidase (1(0), a heterologous polynucleotide encoding kaurene acid hydroxylase (KAH), a heterologous polynucleotide encoding cytochrome P450 reductase (CPR), a heterologous polynucleotide encoding a UDP-glucose transferase, a heterologous polynucleotide encoding UGT74G1, a heterologous polynucleotide encoding UGT76G1, a heterologous polynucleotide encoding UGT85C2, a heterologous polynucleotide encoding UGT91D, a heterologous polynucleotide encoding EUGT11, and/or a heterologous polynucleotide encoding UGT40087. In some embodiments, the genetically modified host cells contain a heterologous polynucleotide encoding a variant GGPPS, CDPS, KS, KO, KAH, CPR, UDP-glucose transferase, UGT74G1, UGT76G1, UGT85C2, UGT91D, EUGT11, and/or UGT40087. In certain embodiments, the variant enzyme may have from 1 up to 20 amino acid substitutions relative to a reference enzyme. In certain embodiments, the coding sequence of the polynucleotide is codon optimized for the particular host cell.

Geranylgeranyl Diphosphate Synthase (GGPPS)

Geranylgeranyl diphosphate synthases (EC 2.5.1.29) catalyze the conversion of farnesyl pyrophosphate into geranylgeranyl diphosphate. Examples of geranylgeranyl diphosphate synthase include those of *Stevia rebaudiana* (accession no. ABD92926), *Gibberella fujikuroi* (accession no. CAA75568), *Mus musculus* (accession no. AAH69913), *Thalassiosira pseudonana* (accession no. XP 002288339), *Streptomyces clavuligerus* (accession no. ZP-05004570), *Sulfulobus acidocaldarius* (accession no. BAA43200), *Synechococcus* sp. (accession no. ABC98596), *Arabidopsis thaliana* (accession no. MP 195399), and *Blakeslea trispora* (accession no. AFC92798.1), and those described in US2014/0329281 A1.

Copalyl Diphosphate Synthase (CDPS)

Copalyl diphosphate synthases (EC 5.5.1.13) catalyze the conversion of geranylgeranyl diphosphate into copalyl diphosphate. Examples of copalyl diphosphate synthases include those from *Stevia rebaudiana* (accession no. AAB87091), *Streptomyces clavuligerus* (accession no. EDY51667), *Bradyrhizobioum japonicum* (accession no. AAC28895.1), *Zea mays* (accession no. AY562490), *Arabidopsis thaliana* (accession no. NM_116512), and *Oryza sativa* (accession no. Q5MQ85.1), and those described in US2014/0329281 A1.

Kaurene Synthase (KS)

Kaurene synthases (EC 4.2.3.19) catalyze the conversion of copalyl diphosphate into kaurene and diphosphate. Examples of enzymes include those of *Bradyrhizobium japonicum* (accession no. AAC28895.1), *Arabidopsis thaliana* (accession no. Q9SAK2), and *Picea glauca* (accession no. ADB55711.1), and those described in US2014/0329281 A1.

Bifunctional Copalyl Diphosphate Synthase (CDPS) and Kaurene Synthase (KS)

CDPS-KS bifunctional enzymes (EC 5.5.1.13 and EC 4.2.3.19) may also be used in the host cells of the invention. Examples include those of *Phomopsis amygdali* (accession no. BAG30962), *Phaeosphaeria* sp. (accession no. 013284), *Physcomitrella patens* (accession no. BAF61135), and *Gibberella fujikuroi* (accession no. Q9UVY5.1), and those described in US2014/032928 A1, US2014/0357588 A1, US2015/0159188, and WO2016/038095.

Ent-Kaurene Oxidase (KO)

Ent-kaurene oxidases (EC 1.14.13.88) also referred to as kaurene oxidases herein catalyze the conversion of kaurene into kaurenoic acid. Illustrative examples of enzymes include those of *Oryza sativa* (accession no. Q5Z5R4), *Gibberella fujikuroi* (accession no. 094142), *Arabidopsis thaliana* (accession no. Q93ZB2), *Stevia rebaudiana* (accession no. AAQ63464.1), and *Pisum sativum* (Uniprot no. Q6XAF4), and those described in US2014/0329281 A1, US2014/0357588 A1, US2015/0159188, and WO2016/038095.

Kaurenoic Acid Hydroxylase (KAH)

Kaurenoic acid hydroxylases (EC 1.14.13) also referred to as steviol synthases catalyze the conversion of kaurenoic acid into steviol. Examples of enzymes include those of *Stevia rebaudiana* (accession no. ACD93722), *Arabidopsis thaliana* (accession no. NP 197872), *Vitis vinifera* (accession no. XP 002282091), and *Medicago trunculata* (accession no. ABC59076), and those described in US2014/0329281, US2014/0357588, US2015/0159188, and WO2016/038095. In some embodiments, the kaurenoic acid hydroxylase polypeptide may be a variant KAH. In some embodiments, the variant KAH comprises the amino acid sequence of SEQ ID NO: 1. In some embodiments, the amino acid sequence of SEQ ID NO: 1 further includes one or more amino acid substitutions. In some embodiments, the one or more amino acid substitutions are selected from K69R, V343G, T403V, H491P, P72D, L64D, Q84C, L64G, E206D, Y238C, A210G, L64N, I237C, L11V, N207F, M73G, W8G, E60R, Y55S, N475G, D292P, P161C, K267D, L485F, A396F, R507A, P72T, I132G, N61P, K119V, T220E, P72G, Q513R, S133G, Y506V, K69P, E60G, K224C, M73H, H379G, P72C, K314P, W202A, G466F, N49A, S339G, N160D, T216G, D102Y, F246G, M58P, T220R, R458D, M58G, A68I, 570P, F88V, T240D, L205I, K167G, L232M, 562R, G56D, Q244G, A242D, N49R, Q513G, W29T, L303D, T378D, I508L, W202Q, S505R, R233C, I104D, M258G, K69G, F88D, F88S, A217V, E230C, R507G, G466S, G56S, E230G, Y55G, A503C, S460I, I129R, S245G, F246S, Q84L, S133R, T509V, R507E, R233T, V30F, A68G, G56N, T162G, A68P, S165D, K119Y, W29C, S165P, W29V, I284G, A217L, Q335V, L65S, F53R, Y55P, W202V, K224V, W29A, H164G, Q244D, K291C, L65G, K167S, C327I, K291S, D57G, K167H, N160T, W202C, A242G, F88R, I104N, G466D, N475D, K119S, T123D, T216A, S339A, P161D, I104R, L54G, M171F, L232Y, D293C, V340A, T162A, A297V, I104H, F332L, A236R, K224I, S452D, I104A, V340S, F229Y, A297Y, and A297F. In some embodiments, the one or more amino acid substitutions are selected from A297V, I104H, F332L, A236R, K224I, S452D, I104A, I104A, V340S, F229Y, A297Y, and A297F. In some embodiments, the one or more amino acid substitutions are selected from S452D, I104A, V340S, F229Y, A297Y, and A297F. In some embodiments, the one or more amino acid substitutions are selected from N146W, A297Y, A236S, V9S, G466F, T283D, T142G, T425V, L459C, T283A, T283G, S460V, S133G, I129V, W52G, S505I, I243T, V340S, S460C, S452D, L118I, S505V, T123D, W52C, S460I, S457G, W52R, W52N, N146T, G466A, and W52T. In some embodiments, the one or more amino acid substitutions are selected from N146T/A297Y/G466A; W52T/N146T/A297Y; T142G/N146T/A297Y/G466A; W52T/T142G/N146T/A297Y; and W52T/T142G/N146T/A297Y/G466A. In some embodiments, the amino acid substitutions include N146T/A297Y/G466A. In some embodiments, the amino acid substitutions include W52T/N146T/A297Y. In some embodiments, the amino acid substitutions include T142G/N146T/A297Y/G466A. In some embodiments, the amino acid substitutions include W52T/T142G/N146T/A297Y. In some embodiments, the amino acid substitutions include W52T/T142G/N146T/A297Y/G466A. In some embodiments, the amino acid substitutions include W52T/T142G/G466A. In some embodiments, the amino acid substitutions include A145G/N146F/A297Y. In some embodiments, the amino acid substitutions include N146W/A297Y/S460I. In some embodiments, the amino acid substitutions include W52N/N146W/A297Y. In some embodiments, the amino acid substitutions include F332L/S452D. In some embodiments, the amino acid substitutions include N146W/A297Y. In some embodiments, the amino acid substitutions comprise A297Y. In some embodiments, the amino acid substitutions include Q84R/N146T/A297Y. In some embodiments, the variant polypeptide includes the amino acid sequence selected from SEQ ID NO: 17, SEQ ID NO: 18, SEQ ID NO: 19, SEQ ID NO: 20, and SEQ ID NO: 21. In some embodiments, the variant polypeptide includes the amino acid sequence of SEQ ID NO: 17. In some embodiments, the variant polypeptide includes the amino acid sequence of SEQ ID NO: 18. In some embodiments, the variant polypeptide includes the amino acid sequence of SEQ ID NO: 19. In some embodiments, the variant polypeptide includes the amino acid sequence of SEQ ID NO: 20. In some embodiments, the variant polypeptide includes the amino acid sequence of SEQ ID NO: 21. In some embodiments, the amino acids encoding an N-terminal signal sequence are replaced with a corresponding amino acid sequence encoding the N-terminal signal sequence of a heterologous plant p450 polypeptide. In some embodiments, the N-terminal signal sequence corresponds to amino acids 1-25 of SEQ ID NO: 1. In some embodiments, the amino acid sequence corresponding to the N-terminal signal sequence includes SEQ ID NO: 22.

Cytochrome P450 Reductase (CPR)

Cytochrome P450 reductases (EC 1.6.2.4) are necessary for the activity of KO and/or KAH above. Examples of enzymes include those of *Stevia rebaudiana* (accession no. ABB88839), *Arabidopsis thaliana* (accession no. NP 194183), *Gibberella fujikuroi* (accession no. CAE09055), and *Artemisia annua* (accession no. ABC47946.1), and those described in US2014/0329281, US2014/0357588, US2015/0159188, and WO2016/038095.

UDP glycosyltransferase 74G1 (UGT74G1)

UGT74G1 is capable of functioning as a uridine 5'-diphospho glucosyl: steviol 19-COOH transferase and as a uridine 5'-diphospho glucosyl: steviol-13-O-glucoside 19-COOH transferase. Accordingly, UGT74G1 is capable of converting steviol to 19-glycoside; converting steviol to 19-glycoside, steviolmonoside to rubusoside; and steviolbioside to stevioside. UGT74G1 has been described in Richman et al., 2005, *Plant J.*, vol. 41, pp. 56-67; US2014/0329281; WO2016/038095; and accession no. AAR06920.1.

UDP glycosyltransferase 76G1 (UGT76G1)

UGT76G1 is capable of transferring a glucose moiety to the C-3' position of an acceptor molecule a steviol glycoside (where glycoside=Glcb(1→2)Glc). This chemistry can occur at either the C-13-O-linked glucose of the acceptor molecule, or the C-19-O-linked glucose acceptor molecule. Accordingly, UGT76G1 is capable of functioning as a uridine 5'-diphospho glucosyltransferase to the: (1) C-3' position of the 13-O-linked glucose on steviolbioside in a beta linkage forming Reb B, (2) C-3' position of the 19-O-linked glucose on stevioside in a beta linkage forming Reb A, and (3) C-3' position of the 19-O-linked glucose on Reb D in a beta linkage forming Reb M. UGT76G1 has been described in Richman et al., 2005, *Plant J.*, vol. 41, pp. 56-67; US2014/0329281; WO2016/038095; and accession no. AAR06912.1.

UDP glycosyltransferase 85C2 (UGT85C2)

UGT85C2 is capable of functioning as a uridine 5'-diphospho glucosyl:steviol 13-OH transferase, and a uridine 5'-diphospho glucosyl: steviol-19-O-glucoside 13-OH transferase. UGT85C2 is capable of converting steviol to steviolmonoside and is also capable of converting 19-glycoside to rubusoside. Examples of UGT85C2 enzymes include those of *Stevia rebaudiana*: see e.g., Richman et al., (2005), Plant J., vol. 41, pp. 56-67; US2014/0329281; WO2016/038095; and accession no. AAR06916.1.

UDP glycosyltransferase 91D (UGT91D)

UGT91D is capable of functioning as a uridine 5'-diphosphoglucosyl:steviol-13-O-glucoside transferase, transferring a glucose moiety to the C-2' of the 13-O-glucose of the acceptor molecule, steviol-13-O-glucoside (steviolmonoside) to produce steviolbioside. A UGT91D is also capable of functioning as a uridine 5'-diphosphoglucosyl:rubusoside transferase, transferring a glucose moiety to the C-2' of the 13-O-glucose of the acceptor molecule, rubusoside, to provide stevioside. UGT91D is also referred to as UGT91D2, UGT91D2e, or UGT91D-like3. Examples of UGT91D enzymes include those of *Stevia rebaudiana*: see e.g., accession no. ACE87855.1; US2014/0329281; and WO2016/038095. UDP glycosyltransferase 40087 (UGT40087)

UGT40087 is capable of transferring a glucose moiety to the C-2' position of the 19-O-glucose of Reb A to produce Reb D. UGT40087 is also capable of transferring a glucose moiety to the C-2' position of the 19-O-glucose of stevioside to produce Reb E. Examples of UGT40087 include those of accession no. XP_004982059.1 and WO2018/031955.

Additional Uridine Diphosphate-Dependent Glycosyl Transferases Capable of Converting Reb A to Reb D (UGTAD)

In addition to UGT40087, other UGTAD are capable of transferring a glucose moiety to the C-2' position of 19-O-glucose of Reb A to produce Reb D. UGTAD is also capable of transferring a glucose moiety to the C-2' position of 19-O-glucose of stevioside to produce Reb E. Examples of UGTAD include Os_UGT_91C1 from *Oryza sativa* (also referred to as EUGT11 (see WO2013/022989 and accession number XP 01529141.1)); S1_UGT_101249881 from *Solanum lycopersicum* (also referred to as UGTSL2 (see WO2014/193888 and accession no. XP_0042504851)); sr.UGT_925778; Bd_UGT0840 (see accession no. XP_003560669.1); Hv_UGT_V1 (see accession no. BAJ94055.1); Bd_UGT10850 (see accession no. XP_010230871.1); and OB_UGT91B1_like (see accession no. XP_0066504551.).

MEV Pathway FPP and/or GGPP Production

In some embodiments, a genetically modified host cell provided herein comprises one or more heterologous enzymes of the MEV pathway, useful for the formation of FPP and/or GGPP. The one or more enzymes of the MEV pathway may include an enzyme that condenses acetyl-CoA with malonyl-CoA to form acetoacetyl-CoA; an enzyme that condenses two molecules of acetyl-CoA to form acetoacetyl-CoA; an enzyme that condenses acetoacetyl-CoA with acetyl-CoA to form HMG-CoA; or an enzyme that converts HMG-CoA to mevalonate. In addition, the genetically modified host cells may include a MEV pathway enzyme that phosphorylates mevalonate to mevalonate 5-phosphate; a MEV pathway enzyme that converts mevalonate 5-phosphate to mevalonate 5-pyrophosphate; a MEV pathway enzyme that converts mevalonate 5-pyrophosphate to isopentenyl pyrophosphate; or a MEV pathway enzyme that converts isopentenyl pyrophosphate to dimethylallyl diphosphate. In particular, the one or more enzymes of the MEV pathway are selected from acetyl-CoA thiolase, acetoacetyl-CoA synthetase, HMG-CoA synthase, HMG-CoA reductase, mevalonate kinase, phosphomevalonate kinase, mevalonate pyrophosphate decarboxylase, and isopentyl diphosphate: dimethylallyl diphosphate isomerase (IDI or IPP isomerase). The genetically modified host cell of the invention may express one or more of the heterologous enzymes of the MEV from one or more heterologous nucleotide sequences comprising the coding sequence of the one or more MEV pathway enzymes.

In some embodiments, the genetically modified host cell comprises a heterologous nucleic acid encoding an enzyme that can convert isopentenyl pyrophosphate (IPP) into dimethylallyl pyrophosphate (DMAPP). In addition, the host cell may contain a heterologous nucleic acid encoding an enzyme that may condense IPP and/or DMAPP molecules to form a polyprenyl compound. In some embodiments, the genetically modified host cell further contains a heterologous nucleic acid encoding an enzyme that may modify IPP or a polyprenyl to form an isoprenoid compound such as FPP.

Conversion of Acetyl-CoA to Acetoacetyl-CoA

The genetically modified host cell may contain a heterologous nucleic acid that encodes an enzyme that may condense two molecules of acetyl-coenzyme A to form acetoacetyl-CoA (an acetyl-CoA thiolase). Examples of nucleotide sequences encoding acetyl-CoA thiolase include (accession no. NC_000913 REGION: 2324131.2325315 (*Escherichia coli*)); (D49362 (*Paracoccus denitrificans*)); and (L20428 (*Saccharomyces cerevisiae*)).

Acetyl-CoA thiolase catalyzes the reversible condensation of two molecules of acetyl-CoA to yield acetoacetyl-CoA, but this reaction is thermodynamically unfavorable; acetoacetyl-CoA thiolysis is favored over acetoacetyl-CoA synthesis. Acetoacetyl-CoA synthase (AACS) (also referred to as acetyl-CoA:malonyl-CoA acyltransferase; EC 2.3.1.194) condenses acetyl-CoA with malonyl-CoA to form acetoacetyl-CoA. In contrast to acetyl-CoA thiolase, AACS-catalyzed acetoacetyl-CoA synthesis is essentially an energy-favored reaction, due to the associated decarboxylation of malonyl-CoA. In addition, AACS exhibits no thiolysis activity against acetoacetyl-CoA, and thus the reaction is irreversible.

In cells expressing acetyl-CoA thiolase and a heterologous ADA and/or phosphotransacetylase (PTA), the reversible reaction catalyzed by acetyl-CoA thiolase, which favors acetoacetyl-CoA thiolysis, may result in a large acetyl-CoA pool. In view of the reversible activity of ADA, this acetyl-CoA pool may in turn drive ADA towards the reverse reaction of converting acetyl-CoA to acetaldehyde, thereby diminishing the benefits provided by ADA towards acetyl-CoA production. Similarly, the activity of PTA is reversible, and thus, a large acetyl-CoA pool may drive PTA towards the reverse reaction of converting acetyl-CoA to acetyl phosphate. Therefore, in some embodiments, in order to provide a strong pull on acetyl-CoA to drive the forward reaction of ADA and PTA, the MEV pathway of the genetically modified host cell provided herein utilizes an acetoacetyl-CoA synthase to form acetoacetyl-CoA from acetyl-CoA and malonyl-CoA.

The AACS obtained from *Streptomyces* sp. Strain CL190 may be used (see Okamura et al., (2010), PNAS, vol. 107, pp. 11265-11270). Representative AACS encoding nucleic acids sequences from *Streptomyces* sp. Strain CL190 include the sequence of accession no. AB540131.1, and the corresponding AACS protein sequences include the sequence of accession nos. D7URVO and BAJ10048. Other acetoacetyl-CoA synthases useful for the invention include those of *Streptomyces* sp. (see accession nos. AB183750; KO-3988 BAD86806; KO-3988 AB212624; and KO-2988 BAE78983); *S. anulatus* strain 9663 (see accession nos. FN178498 and CAX48662); *Actinoplanes* sp. A40644 (see accession nos. AB113568 and BAD07381); *Streptomyces* sp. C (see accession nos. NZ_ACEWO10000640 and ZP_05511702); *Nocardiopsis dassonvillei* DSM 43111 (see accession nos. NZ_ABUI01000023 and ZP_04335288); *Mycobacterium ulcerans* Agy99 (see accession nos. NC_008611 and YP_907152); *Mycobacterium marinum* M (see accession nos. NC_010612 and YP_001851502); *Streptomyces* sp. Mg1 (see accession nos. NZ_DS570501 and ZP_05002626); *Streptomyces* sp. AA4 (see accession nos. NZ_ACEV01000037 and ZP_05478992); *S. roseosporus* NRRL 15998 (see accession nos. NZ_ABYB01000295 and ZP_04696763); *Streptomyces* sp. ACTE (see accession nos. NZ_ADFD01000030 and ZP_06275834); *S. viridochromogenes* DSM 40736 (see accession nos. NZ_ACEZ01000031 and ZP_05529691); *Frankia* sp. Ccl3 (see accession nos. NC_007777 and YP_480101); *Nocardia brasiliensis* (see accession nos. NC_018681 and YP_006812440.1); and *Austwickia chelonae* (see accession nos. NZ_BAGZ01000005 and ZP_10950493.1). Additional suitable acetoacetyl-CoA synthases include those described in U.S. Patent Application Publication Nos. 2010/0285549 and 2011/0281315.

Acetoacetyl-CoA synthases also useful in the compositions and methods provided herein include those molecules which are said to be "derivatives" of any of the acetoacetyl-CoA synthases described herein. Such a "derivative" has the following characteristics: (1) it shares substantial homology with any of the acetoacetyl-CoA synthases described herein; and (2) is capable of catalyzing the irreversible condensation of acetyl-CoA with malonyl-CoA to form acetoacetyl-CoA. A derivative of an acetoacetyl-CoA synthase is said to share "substantial homology" with acetoacetyl-CoA synthase if the amino acid sequences of the derivative is at least 80%, and more preferably at least 90%, and most preferably at least 95%, the same as that of acetoacetyl-CoA synthase.

Conversion of Acetoacetyl-CoA to HMG-CoA

In some embodiments, the host cell comprises a heterologous nucleotide sequence encoding an enzyme that can condense acetoacetyl-CoA with another molecule of acetyl-CoA to form 3-hydroxy-3-methylglutaryl-CoA (HMG-CoA), e.g., an HMG-CoA synthase. Examples of nucleotide sequences encoding such an enzyme include: (NC_001145. complement 19061.20536; *Saccharomyces cerevisiae*), (X96617; *Saccharomyces cerevisiae*), (X83882; *Arabidopsis thaliana*), (AB037907; *Kitasatospora griseola*), (BT007302; *Homo sapiens*), and (NC_002758, Locus tag SAV2546, GeneID 1122571; *Staphylococcus aureus*).

Conversion of HMG-CoA to Mevalonate

In some embodiments, the host cell comprises a heterologous nucleotide sequence encoding an enzyme that can convert HMG-CoA into mevalonate, e.g., an HMG-CoA reductase. The HMG-CoA reductase may be an NADH-using hydroxymethylglutaryl-CoA reductase-CoA reductase. HMG-CoA reductases (EC 1.1.1.34; EC 1.1.1.88) catalyze the reductive deacylation of (S)-HMG-CoA to (R)-mevalonate, and can be categorized into two classes, class I and class II HMGrs. Class I includes the enzymes from eukaryotes and most archaea, and class II includes the HMG-CoA reductases of certain prokaryotes and archaea. In addition to the divergence in the sequences, the enzymes of the two classes also differ with regard to their cofactor specificity. Unlike the class I enzymes, which utilize NADPH exclusively, the class II HMG-CoA reductases vary in the ability to discriminate between NADPH and NADH (See, e.g., Hedl et al., (2004) *Journal of Bacteriology*, vol. 186, pp. 1927-1932). Co-factor specificities for select class II HMG-CoA reductases are provided in Table 1.

TABLE 1

| Source | Coenzyme specificity | $K_m^{NADPH}$ (µM) | $K_m^{NADH}$ (µM) |
|---|---|---|---|
| P. mevalonii | NADH | | 80 |
| A. fulgidus | NAD(P)H | 500 | 160 |
| S. aureus | NAD(P)H | 70 | 100 |
| E. faecalis | NADPH | 30 | |

HMG-CoA reductases useful for the invention include HMG-CoA reductases that are capable of utilizing NADH as a cofactor, e.g., HMG-CoA reductase from *P. mevalonii, A. fulgidus,* or *S. aureus*. In particular embodiments, the HMG-CoA reductase is capable of only utilizing NADH as a cofactor, e.g., HMG-CoA reductase from *P. mevalonii, S. pomeroyi,* or *D. acidovorans*.

In some embodiments, the NADH-using HMG-CoA reductase is from *Pseudomonas mevalonii*. The sequence of the wild-type mvaA gene of *Pseudomonas mevalonii*, which encodes HMG-CoA reductase (EC 1.1.1.88), has been previously described (see Beach and Rodwell, (1989), *J. Bacteriol.,* vol. 171, pp. 2994-3001). Representative mvaA nucleotide sequences of *Pseudomonas mevalonii* include accession number M24015. Representative HMG-CoA reductase protein sequences of *Pseudomonas mevalonii* include accession numbers AAA25837, P13702, and MVAA_PSEMV.

In some embodiments, the NADH-using HMG-CoA reductase is from *Silicibacter pomeroyi*. Representative HMG-CoA reductase nucleotide sequences of *Silicibacter pomeroyi* include accession number NC_006569.1. Representative HMG-CoA reductase protein sequences of *Silicibacter pomeroyi* include accession number YP_164994.

In some embodiments, the NADH-using HMG-CoA reductase is from *Delftia acidovorans*. A representative HMG-CoA reductase nucleotide sequences of *Delftia acidovorans* includes NC_010002 REGION: complement (319980 . . . 321269). Representative HMG-CoA reductase protein sequences of *Delftia acidovorans* include accession number YP_001561318.

In some embodiments, the NADH-using HMG-CoA reductase is from *Solanum tuberosum* (see Crane et al., (2002), *J. Plant Physiol.,* vol. 159, pp. 1301-1307).

NADH-using HMG-CoA reductases useful in the practice of the invention also include those molecules which are said to be "derivatives" of any of the NADH-using HMG-CoA reductases described herein, e.g., from *P. mevalonii, S. pomeroyi* and *D. acidovorans*. Such a "derivative" has the following characteristics: (1) it shares substantial homology with any of the NADH-using HMG-CoA reductases described herein; and (2) is capable of catalyzing the reductive deacylation of (S)-HMG-CoA to (R)-mevalonate while preferentially using NADH as a cofactor. A derivative of an NADH-using HMG-CoA reductase is said to share "substantial homology" with NADH-using HMG-CoA reductase if the amino acid sequences of the derivative is at least 80%, and more preferably at least 90%, and most preferably at least 95%, the same as that of NADH-using HMG-CoA reductase.

As used herein, the phrase "NADH-using" means that the NADH-using HMG-CoA reductase is selective for NADH over NADPH as a cofactor, for example, by demonstrating a higher specific activity for NADH than for NADPH. The selectivity for NADH as a cofactor is expressed as a $k_{cat}^{(NADH)}/k_{cat}^{(NADPH)}$ ratio. The NADH-using HMG-CoA reductase of the invention may have a $k_{cat}^{(NADH)}/k_{cat}^{(NADPH)}$ ratio of at least 5, 10, 15, 20, 25 or greater than 25. The NADH-using HMG-CoA reductase may use NADH exclusively. For example, an NADH-using HMG-CoA reductase that uses NADH exclusively displays some activity with NADH supplied as the sole cofactor in vitro, and displays no detectable activity when NADPH is supplied as the sole cofactor. Any method for determining cofactor specificity known in the art can be utilized to identify HMG-CoA reductases having a preference for NADH as cofactor (see e.g., (Kim et al., (2000), *Protein Science,* vol. 9, pp. 1226-1234) and (Wilding et al., (2000), *J. Bacteriol.,* vol. 182, pp. 5147-5152).

In some cases, the NADH-using HMG-CoA reductase is engineered to be selective for NADH over NAPDH, for example, through site-directed mutagenesis of the cofactor-binding pocket. Methods for engineering NADH-selectivity are described in Watanabe et al., (2007), *Microbiology,* vol. 153, pp. 3044-3054), and methods for determining the cofactor specificity of HMG-CoA reductases are described in Kim et al., (2000), *Protein Sci.,* vol. 9, pp. 1226-1234).\

The NADH-using HMG-CoA reductase may be derived from a host species that natively comprises a mevalonate degradative pathway, for example, a host species that catabolizes mevalonate as its sole carbon source. In these cases, the NADH-using HMG-CoA reductase, which normally catalyzes the oxidative acylation of internalized (R)-mevalonate to (S)-HMG-CoA within its native host cell, is utilized to catalyze the reverse reaction, that is, the reductive deacylation of (S)-HMG-CoA to (R)-mevalonate, in a genetically modified host cell comprising a mevalonate biosynthetic pathway. Prokaryotes capable of growth on mevalonate as their sole carbon source have been described by: (Anderson et al., (1989), *J. Bacteriol*, vol. 171, pp. 6468-6472); (Beach et al., (1989), *J. Bacteriol.*, vol. 171, pp. 2994-3001); Bensch et al., *J. Biol. Chem.*, vol. 245, pp. 3755-3762); (Fimongnari et al., (1965), *Biochemistry*, vol. 4, pp. 2086-2090); Siddiqi et al., (1962), *Biochem. Biophys. Res. Commun.*, vol. 8, pp. 110-113); (Siddiqi et al., (1967), *J. Bacteriol.*, vol. 93, pp. 207-214); and (Takatsuji et al., (1983), *Biochem. Biophys. Res. Commun.*, vol. 110, pp. 187-193).

The host cell may contain both a NADH-using HMGr and an NADPH-using HMG-CoA reductase. Examples of nucleotide sequences encoding an NADPH-using HMG-CoA reductase include: (NM_206548; *Drosophila melanogaster*), (NC_002758, Locus tag SAV2545, GeneID 1122570; *Staphylococcus aureus*), (AB015627; *Streptomyces* sp. KO 3988), (AX128213, providing the sequence encoding a truncated HMG-CoA reductase; *Saccharomyces cerevisiae*), and (NC_001145: complement (115734.118898; *Saccharomyces cerevisiae*).

Conversion of Mevalonate to Mevalonate-5-Phosphate

The host cell may contain a heterologous nucleotide sequence encoding an enzyme that can convert mevalonate into mevalonate 5-phosphate, e.g., a mevalonate kinase. Illustrative examples of nucleotide sequences encoding such an enzyme include: (L77688; *Arabidopsis thaliana*) and (X55875; *Saccharomyces cerevisiae*).

Conversion of Mevalonate-5-Phosphate to Mevalonate-5-Pyrophosphate

The host cell may contain a heterologous nucleotide sequence encoding an enzyme that can convert mevalonate 5-phosphate into mevalonate 5-pyrophosphate, e.g., a phosphomevalonate kinase. Illustrative examples of nucleotide sequences encoding such an enzyme include: (AF429385; *Hevea brasiliensis*), (NM 006556; *Homo sapiens*), and (NC_001145. complement 712315.713670; *Saccharomyces cerevisiae*).

Conversion of Mevalonate-5-Pyrophosphate to IPP

The host cell may contain a heterologous nucleotide sequence encoding an enzyme that can convert mevalonate 5-pyrophosphate into isopentenyl diphosphate (IPP), e.g., a mevalonate pyrophosphate decarboxylase. Illustrative examples of nucleotide sequences encoding such an enzyme include: (X97557; *Saccharomyces cerevisiae*), (AF290095; *Enterococcus faecium*), and (U49260; *Homo sapiens*).

Conversion of IPP to DMAPP

The host cell may contain a heterologous nucleotide sequence encoding an enzyme that can convert IPP generated via the MEV pathway into dimethylallyl pyrophosphate (DMAPP), e.g., an IPP isomerase. Illustrative examples of nucleotide sequences encoding such an enzyme include: (NC_000913, 3031087.3031635; *Escherichia coli*), and (AF082326; *Haematococcus pluvialis*).

Polyprenyl Synthases

In some embodiments, the host cell further comprises a heterologous nucleotide sequence encoding a polyprenyl synthase that can condense IPP and/or DMAPP molecules to form polyprenyl compounds containing more than five carbons.

The host cell may contain a heterologous nucleotide sequence encoding an enzyme that can condense one molecule of IPP with one molecule of DMAPP to form one molecule of geranyl pyrophosphate ("GPP"), e.g., a GPP synthase. Non-limiting examples of nucleotide sequences encoding such an enzyme include: (AF513111; *Abies grandis*), (AF513112; *Abies grandis*), (AF513113; *Abies grandis*), (AY534686; *Antirrhinum majus*), (AY534687; *Antirrhinum majus*), (Y17376; *Arabidopsis thaliana*), (AE016877, Locus AP11092; *Bacillus cereus*; ATCC 14579), (AJ243739; *Citrus sinensis*), (AY534745; *Clarkia breweri*), (AY953508; *Ips pini*), (DQ286930; *Lycopersicon esculentum*), (AF182828; *Mentha x piperita*), (AF182827; *Mentha x piperita*), (MPI249453; *Mentha x piperita*), (PZE431697, Locus CAD24425; *Paracoccus zeaxanthinifaciens*), (AY866498; *Picrorhiza kurrooa*), (AY351862; *Vitis vinifera*), and (AF203881, Locus AAF12843; *Zymomonas mobilis*).

The host cell may contain a heterologous nucleotide sequence encoding an enzyme that can condense two molecules of IPP with one molecule of DMAPP, or add a molecule of IPP to a molecule of GPP, to form a molecule of farnesyl pyrophosphate ("FPP"), e.g., an FPP synthase. Non-limiting examples of nucleotide sequences that encode an FPP synthase include: (ATU80605; *Arabidopsis thaliana*), (ATHFPS2R; *Arabidopsis thaliana*), (AAU36376; *Artemisia annua*), (AF461050; *Bos taurus*), (D00694; *Escherichia coli* K-12), (AE009951, Locus AAL95523; *Fusobacterium nucleatum* subsp. nucleatum ATCC 25586), (GFFPPSGEN; *Gibberella fujikuroi*), (CP000009, Locus AAW60034; *Gluconobacter oxydans* 621H), (AF019892; *Helianthus annuus*), (HUMFAPS; *Homo sapiens*), (KLPFPSQCR; *Kluyveromyces lactis*), (LAU15777; *Lupinus albus*), (LAU20771; *Lupinus albus*), (AF309508; *Mus musculus*), (NCFPPSGEN; *Neurospora crassa*), (PAFPS1; *Parthenium argentatum*), (PAFPS2; *Parthenium argentatum*), (RATFAPS; *Rattus norvegicus*), (YSCFPP; *Saccharomyces cerevisiae*), (D89104; *Schizosaccharomyces pombe*), (CP000003, Locus AAT87386; *Streptococcus pyogenes*), (CP000017, Locus AAZ51849; *Streptococcus pyogenes*), (NC_008022, Locus YP_598856; *Streptococcus pyogenes* MGAS10270), (NC_008023, Locus YP_600845; *Streptococcus pyogenes* MGAS2096), (NC_008024, Locus YP_602832; *Streptococcus pyogenes* MGAS10750), (MZEFPS; *Zea mays*), (AE000657, Locus AAC06913; *Aquifex aeolicus* VF5), (NM_202836; *Arabidopsis thaliana*), (D84432, Locus BAA12575; *Bacillus subtilis*), (U12678, Locus AAC28894; *Bradyrhizobium japonicum* USDA 110), (BACFDPS; *Geobacillus stearothermophilus*), (NC_002940, Locus NP_873754; *Haemophilus ducreyi* 35000HP), (L42023, Locus AAC23087; *Haemophilus influenzae* Rd KW20), (J05262; *Homo sapiens*), (YP_395294; *Lactobacillus sakei* subsp. sakei 23K), (NC_005823, Locus YP_000273; *Leptospira interrogans* serovar Copenhageni str. Fiocruz L1-130), (AB003187; *Micrococcus luteus*), (NC_002946, Locus YP_208768; *Neisseria gonorrhoeae* FA 1090), (U00090, Locus AAB91752; *Rhizobium* sp. NGR234), (J05091; *Saccharomyces cerevisae*), (CP000031, Locus AAV93568; *Silicibacter pomeroyi* DSS-3), (AE008481, Locus AAK99890; *Streptococcus pneumoniae* R6), and (NC 004556, Locus NP 779706; *Xylella fastidiosa* Temecula1).

In addition, the host cell may contain a heterologous nucleotide sequence encoding an enzyme that can combine IPP and DMAPP or IPP and FPP to form geranylgeranyl pyrophosphate ("GGPP"). Non-limiting examples of nucleotide sequences that encode such an enzyme include: (ATHGERPYRS; *Arabidopsis thaliana*), (BT005328; *Arabidopsis thaliana*), (NM_119845; *Arabidopsis thaliana*), (NZ_AAJM01000380, Locus ZP_00743052; *Bacillus thuringiensis serovar israelensis*, ATCC 35646 sq1563), (CRGGPPS; *Catharanthus roseus*), (NZ_AABF02000074, Locus ZP_00144509; *Fusobacterium nucleatum* subsp. vincentii, ATCC 49256), (GFGGPPSGN; *Gibberella fujikuroi*), (AY371321; *Ginkgo biloba*), (AB055496; *Hevea brasiliensis*), (AB017971; *Homo sapiens*), (MCI276129; *Mucor circinelloides f. lusitanicus*), (AB016044; *Mus musculus*), (AABX01000298, Locus NCU01427; *Neurospora crassa*), (NCU20940; *Neurospora crassa*), (NZ_AAKL01000008, Locus ZP_00943566; *Ralstonia solanacearum* UW551), (AB118238; *Rattus norvegicus*), (SCU31632; *Saccharomyces cerevisiae*), (AB016095; *Synechococcus elongates*), (SAGGPS; *Sinapis alba*), (SSOGDS; *Sulfolobus acidocaldarius*), (NC_007759, Locus YP_461832; *Syntrophus acidotrophicus* SB), (NC_006840, Locus YP_204095; *Vibrio fischeri* ES114), (NM_112315; *Arabidopsis thaliana*), (ERWCRTE; *Pantoea agglomerans*), (D90087, Locus BAA14124; *Pantoea ananatis*), (X52291, Locus CAA36538; *Rhodobacter capsulatus*), (AF195122, Locus AAF24294; *Rhodobacter sphaeroides*), and (NC_004350, Locus NP_721015; *Streptococcus mutans* UA159).

While examples of the enzymes of the mevalonate pathway are described above, in certain embodiments, enzymes of the DXP pathway can be used as an alternative or additional pathway to produce DMAPP and IPP in the host cells, compositions and methods described herein. Enzymes and nucleic acids encoding the enzymes of the DXP pathway are well-known and characterized in the art, e.g., WO 2012/135591.

Methods of Producing Steviol Glycosides

The invention provides for the production of steviol glycosides by (a) culturing a population of any of the genetically modified host cells described herein that are capable of producing a steviol glycoside in a medium with a carbon source under conditions suitable for making the steviol glycoside compound, and (b) recovering the steviol glycoside compound from the medium.

The genetically modified host cell produces an increased amount of the steviol glycoside compared to a parent cell not having the genetic modifications, or a parent cell having only a subset of the genetic modifications but is otherwise genetically identical. In some embodiments, the increased amount is at least 1%, 5%, 10%, 15%, 20%, 25%, 30%, 35%, 40%, 45%, 50%, 55%, 60%, 65%, 70%, 75%, 80%, 85%, 90%, 95%, 100% or greater than 100%, as measured, for example, in yield, production, and/or productivity, in grams per liter of cell culture, milligrams per gram of dry cell weight, on a per unit volume of cell culture basis, on a per unit dry cell weight basis, on a per unit volume of cell culture per unit time basis, or on a per unit dry cell weight per unit time basis.

In some embodiments, the host cell may produce an elevated level of a steviol glycoside that is greater than about 1 gram per liter of fermentation medium. In some embodiments, the host cell produces an elevated level of a steviol glycoside that is greater than about 5 grams per liter of fermentation medium. In some embodiments, the host cell produces an elevated level of a steviol glycoside that is greater than about 10 grams per liter of fermentation medium. In some embodiments, the steviol glycoside is produced in an amount from about 10 to about 50 grams, from about 10 to about 15 grams, more than about 15 grams, more than about 20 grams, more than about 25 grams, or more than about 40 grams per liter of cell culture.

In some embodiments, the host cell produces an elevated level of a steviol glycoside that is greater than about 50 milligrams per gram of dry cell weight. In some such embodiments, the steviol glycoside is produced in an amount from about 50 to about 1500 milligrams, more than about 100 milligrams, more than about 150 milligrams, more than about 200 milligrams, more than about 250 milligrams, more than about 500 milligrams, more than about 750 milligrams, or more than about 1000 milligrams per gram of dry cell weight.

In some embodiments, the host cell produces an elevated level of a steviol glycoside that is at least about 10%, at least about 15%, at least about 20%, at least about 25%, at least about 30%, at least about 35%, at least about 40%, at least about 45%, at least about 50%, at least about 60%, at least about 70%, at least about 80%, at least about 90%, at least about 2-fold, at least about 2.5-fold, at least about 5-fold, at least about 10-fold, at least about 20-fold, at least about 30-fold, at least about 40-fold, at least about 50-fold, at least about 75-fold, at least about 100-fold, at least about 200-fold, at least about 300-fold, at least about 400-fold, at least about 500-fold, or at least about 1,000-fold, or more, higher than the level of steviol glycoside produced by a parent cell, on a per unit volume of cell culture basis.

In some embodiments, the host cell produces an elevated level of a steviol glycoside that is at least about 10%, at least about 15%, at least about 20%, at least about 25%, at least about 30%, at least about 35%, at least about 40%, at least about 45%, at least about 50%, at least about 60%, at least about 70%, at least about 80%, at least about 90%, at least about 2-fold, at least about 2.5-fold, at least about 5-fold, at least about 10-fold, at least about 20-fold, at least about 30-fold, at least about 40-fold, at least about 50-fold, at least about 75-fold, at least about 100-fold, at least about 200-fold, at least about 300-fold, at least about 400-fold, at least about 500-fold, or at least about 1,000-fold, or more, higher than the level of steviol glycoside produced by the parent cell, on a per unit dry cell weight basis.

In some embodiments, the host cell produces an elevated level of a steviol glycoside that is at least about 10%, at least about 15%, at least about 20%, at least about 25%, at least about 30%, at least about 35%, at least about 40%, at least about 45%, at least about 50%, at least about 60%, at least about 70%, at least about 80%, at least about 90%, at least about 2-fold, at least about 2.5-fold, at least about 5-fold, at least about 10-fold, at least about 20-fold, at least about 30-fold, at least about 40-fold, at least about 50-fold, at least about 75-fold, at least about 100-fold, at least about 200-fold, at least about 300-fold, at least about 400-fold, at least about 500-fold, or at least about 1,000-fold, or more, higher than the level of steviol glycoside produced by the parent cell, on a per unit volume of cell culture per unit time basis.

In some embodiments, the host cell produces an elevated level of a steviol glycoside that is at least about 10%, at least about 15%, at least about 20%, at least about 25%, at least about 30%, at least about 35%, at least about 40%, at least about 45%, at least about 50%, at least about 60%, at least about 70%, at least about 80%, at least about 90%, at least about 2-fold, at least about 2.5-fold, at least about 5-fold, at least about 10-fold, at least about 20-fold, at least about 30-fold, at least about 40-fold, at least about 50-fold, at least about 75-fold, at least about 100-fold, at least about 200-fold, at least about 300-fold, at least about 400-fold, at least about 500-fold, or at least about 1,000-fold, or more, higher than the level of steviol glycoside produced by the parent cell, on a per unit dry cell weight per unit time basis.

In most embodiments, the production of the elevated level of steviol glycoside by the host cell is inducible by the presence of an inducing compound. Such a host cell can be manipulated with ease in the absence of the inducing compound. The inducing compound is then added to induce the production of the elevated level of steviol glycoside by the host cell. In other embodiments, production of the elevated level of steviol glycoside by the host cell is inducible by changing culture conditions, such as, for example, the growth temperature, media constituents, and the like.

Culture Media and Conditions

Materials and methods for the maintenance and growth of microbial cultures are well known to those skilled in the art of microbiology or fermentation science (see, for example, Bailey et al., Biochemical Engineering Fundamentals, second edition, McGraw Hill, New York, 1986). Consideration must be given to appropriate culture medium, pH, temperature, and requirements for aerobic, microaerobic, or anaerobic conditions, depending on the specific requirements of the host cell, the fermentation, and the process.

The methods of producing steviol glycosides provided herein may be performed in a suitable culture medium (e.g., with or without pantothenate supplementation) in a suitable container, including but not limited to a cell culture plate, a microtiter plate, a flask, or a fermentor. Further, the methods can be performed at any scale of fermentation known in the art to support industrial production of microbial products. Any suitable fermentor may be used including a stirred tank fermentor, an airlift fermentor, a bubble fermentor, or any combination thereof. In particular embodiments utilizing *Saccharomyces cerevisiae* as the host cell, strains can be grown in a fermentor as described in detail by Kosaric, et al, in Ullmann's Encyclopedia of Industrial Chemistry, Sixth Edition, vol. 12, pp. 398-473, Wiley-VCH Verlag GmbH & Co. KDaA, Weinheim, Germany.

In some embodiments, the culture medium is any culture medium in which a genetically modified microorganism capable of producing a steviol glycoside can subsist. The culture medium may be an aqueous medium comprising assimilable carbon, nitrogen, and phosphate sources. Such a medium can also include appropriate salts, minerals, metals, and other nutrients. The carbon source and each of the essential cell nutrients may be added incrementally or continuously to the fermentation media, and each required nutrient may be maintained at essentially the minimum level needed for efficient assimilation by growing cells, for example, in accordance with a predetermined cell growth curve based on the metabolic or respiratory function of the cells which convert the carbon source to a biomass.

Suitable conditions and suitable media for culturing microorganisms are well known in the art. For example, the suitable medium may be supplemented with one or more additional agents, such as, for example, an inducer (e.g., when one or more nucleotide sequences encoding a gene product are under the control of an inducible promoter), a repressor (e.g., when one or more nucleotide sequences encoding a gene product are under the control of a repressible promoter), or a selection agent (e.g., an antibiotic to select for microorganisms comprising the genetic modifications).

The carbon source may be a monosaccharide (simple sugar), a disaccharide, a polysaccharide, a non-fermentable carbon source, or one or more combinations thereof. Non-limiting examples of suitable monosaccharides include glucose, galactose, mannose, fructose, xylose, ribose, and combinations thereof. Non-limiting examples of suitable disaccharides include sucrose, lactose, maltose, trehalose, cellobiose, and combinations thereof. Non-limiting examples of suitable polysaccharides include starch, glycogen, cellulose, chitin, and combinations thereof. Non-limiting examples of suitable non-fermentable carbon sources include acetate and glycerol.

The concentration of a carbon source, such as glucose, in the culture medium may be sufficient to promote cell growth but is not so high as to repress growth of the microorganism used. Typically, cultures are run with a carbon source, such as glucose, being added at levels to achieve the desired level of growth and biomass. The concentration of a carbon source, such as glucose, in the culture medium may be greater than about 1 g/L, preferably greater than about 2 g/L, and more preferably greater than about 5 g/L. In addition, the concentration of a carbon source, such as glucose, in the culture medium is typically less than about 100 g/L, preferably less than about 50 g/L, and more preferably less than about 20 g/L. It should be noted that references to culture component concentrations can refer to both initial and/or ongoing component concentrations. In some cases, it may be desirable to allow the culture medium to become depleted of a carbon source during culture.

Sources of assimilable nitrogen that can be used in a suitable culture medium include simple nitrogen sources, organic nitrogen sources, and complex nitrogen sources. Such nitrogen sources include anhydrous ammonia, ammonium salts, and substances of animal, vegetable and/or microbial origin. Suitable nitrogen sources include protein hydrolysates, microbial biomass hydrolysates, peptone, yeast extract, ammonium sulfate, urea, and amino acids. Typically, the concentration of the nitrogen sources, in the culture medium is greater than about 0.1 g/L, preferably greater than about 0.25 g/L, and more preferably greater than about 1.0 g/L. Beyond certain concentrations, however, the addition of a nitrogen source to the culture medium is not advantageous for the growth of the microorganisms. As a result, the concentration of the nitrogen sources, in the culture medium is less than about 20 g/L, preferably less than about 10 g/L and more preferably less than about 5 g/L. Further, in some instances it may be desirable to allow the culture medium to become depleted of the nitrogen sources during culture.

The effective culture medium may contain other compounds such as inorganic salts, vitamins, trace metals, or growth promoters. Such other compounds may also be present in carbon, nitrogen, or mineral sources in the effective medium or can be added specifically to the medium.

The culture medium may also contain a suitable phosphate source. Such phosphate sources include both inorganic and organic phosphate sources. Preferred phosphate sources include phosphate salts such as mono or dibasic sodium and potassium phosphates, ammonium phosphate and mixtures thereof. Typically, the concentration of phosphate in the culture medium is greater than about 1.0 g/L, preferably greater than about 2.0 g/L and more preferably greater than about 5.0 g/L. Beyond certain concentrations, however, the addition of phosphate to the culture medium is not advantageous for the growth of the microorganisms. Accordingly, the concentration of phosphate in the culture medium is typically less than about 20 g/L, preferably less than about 15 g/L, and more preferably less than about 10 g/L.

A suitable culture medium can also include a source of magnesium, preferably in the form of a physiologically acceptable salt, such as magnesium sulfate heptahydrate, although other magnesium sources in concentrations that contribute similar amounts of magnesium can be used. Typically, the concentration of magnesium in the culture medium is greater than about 0.5 g/L, preferably greater than about 1.0 g/L, and more preferably greater than about 2.0 g/L. Beyond certain concentrations, however, the addition of magnesium to the culture medium is not advantageous for the growth of the microorganisms. Accordingly, the concentration of magnesium in the culture medium is typically less than about 10 g/L, preferably less than about 5 g/L, and more preferably less than about 3 g/L. Further, in some instances, it may be desirable to allow the culture medium to become depleted of a magnesium source during culture.

The culture medium can also include a biologically acceptable chelating agent, such as the dihydrate of trisodium citrate. In such instance, the concentration of a chelating agent in the culture medium is greater than about 0.2 g/L, preferably greater than about 0.5 g/L, and more preferably greater than about 1 g/L. Beyond certain concentrations, however, the addition of a chelating agent to the culture medium is not advantageous for the growth of the microorganisms. Accordingly, the concentration of a chelating agent in the culture medium is typically less than about 10 g/L, preferably less than about 5 g/L, and more preferably less than about 2 g/L.

The culture medium may also initially include a biologically acceptable acid or base to maintain the desired pH of the culture medium. Biologically acceptable acids include, but are not limited to, hydrochloric acid, sulfuric acid, nitric acid, phosphoric acid, and mixtures thereof. Biologically acceptable bases include, but are not limited to, ammonium hydroxide, sodium hydroxide, potassium hydroxide and mixtures thereof. In some embodiments, the base used is ammonium hydroxide.

The culture medium may also include a biologically acceptable calcium source, including, but not limited to, calcium chloride. Typically, the concentration of the calcium source, such as calcium chloride, dihydrate, in the culture medium is within the range of from about 5 mg/L to about 2000 mg/L, preferably within the range of from about 20 mg/L to about 1000 mg/L, and more preferably in the range of from about 50 mg/L to about 500 mg/L.

The culture medium may also include sodium chloride. Typically, the concentration of sodium chloride in the culture medium is within the range of from about 0.1 g/L to about 5 g/L, preferably within the range of from about 1 g/L to about 4 g/L, and more preferably in the range of from about 2 g/L to about 4 g/L.

The culture medium may also include trace metals. Such trace metals can be added to the culture medium as a stock solution that, for convenience, can be prepared separately from the rest of the culture medium. Typically, the amount of such a trace metals solution added to the culture medium is greater than about 1 ml/L, preferably greater than about 5 mL/L, and more preferably greater than about 10 mL/L. Beyond certain concentrations, however, the addition of a trace metals to the culture medium is not advantageous for the growth of the microorganisms. Accordingly, the amount of such a trace metals solution added to the culture medium is typically less than about 100 mL/L, preferably less than about 50 mL/L, and more preferably less than about 30 mL/L. It should be noted that, in addition to adding trace metals in a stock solution, the individual components can be added separately, each within ranges corresponding independently to the amounts of the components dictated by the above ranges of the trace metals solution.

The culture media may include other vitamins, such as pantothenate, biotin, calcium, pantothenate, inositol, pyridoxine-HC1, and thiamine-HC1. Such vitamins can be added to the culture medium as a stock solution that, for convenience, can be prepared separately from the rest of the culture medium. Beyond certain concentrations, however, the addition of vitamins to the culture medium is not advantageous for the growth of the microorganisms.

The fermentation methods described herein can be performed in conventional culture modes, which include, but are not limited to, batch, fed-batch, cell recycle, continuous, and semi-continuous. In some embodiments, the fermentation is carried out in fed-batch mode. In such a case, some of the components of the medium are depleted during culture, including pantothenate during the production stage of the fermentation. In some embodiments, the culture may be supplemented with relatively high concentrations of such components at the outset, for example, of the production stage, so that growth and/or steviol glycoside production is supported for a period of time before additions are required. The preferred ranges of these components are maintained throughout the culture by making additions as levels are depleted by culture. Levels of components in the culture medium can be monitored by, for example, sampling the culture medium periodically and assaying for concentrations. Alternatively, once a standard culture procedure is developed, additions can be made at timed intervals corresponding to known levels at particular times throughout the culture. As will be recognized by those in the art, the rate of consumption of nutrient increases during culture as the cell density of the medium increases. Moreover, to avoid introduction of foreign microorganisms into the culture medium, addition is performed using aseptic addition methods, as are known in the art. In addition, an anti-foaming agent may be added during the culture.

The temperature of the culture medium can be any temperature suitable for growth of the genetically modified cells and/or production of steviol glycoside. For example, prior to inoculation of the culture medium with an inoculum, the culture medium can be brought to and maintained at a temperature in the range of from about 20° C. to about 45° C., preferably to a temperature in the range of from about 25° C. to about 40° C., and more preferably in the range of from about 28° C. to about 32° C. The pH of the culture medium can be controlled by the addition of acid or base to the culture medium. In such cases, when ammonium hydroxide is used to control pH, it also conveniently serves as a nitrogen source in the culture medium. Preferably, the pH is maintained from about 3.0 to about 8.0, more preferably from about 3.5 to about 7.0, and most preferably from about 4.0 to about 6.5.

The carbon source concentration, such as the glucose concentration, of the culture medium is monitored during culture. Glucose concentration of the culture medium can be monitored using known techniques, such as, for example, use of the glucose oxidase enzyme test or high pressure liquid chromatography, which can be used to monitor glucose concentration in the supernatant, e.g., a cell-free component of the culture medium. The carbon source concentration is typically maintained below the level at which cell growth inhibition occurs. Although such concentration may vary from organism to organism, for glucose as a carbon source, cell growth inhibition occurs at glucose concentrations greater than at about 60 g/L, and can be determined readily by trial. Accordingly, when glucose is used as a carbon source the glucose is preferably fed to the fermentor and maintained below detection limits. Alternatively, the glucose concentration in the culture medium is maintained in the range of from about 1 g/L to about 100 g/L, more preferably in the range of from about 2 g/L to about 50 g/L, and yet more preferably in the range of from about 5 g/L to about 20 g/L. Although the carbon source concentration can be maintained within desired levels by addition of, for example, a substantially pure glucose solution, it is acceptable, and may be preferred, to maintain the carbon source concentration of the culture medium by addition of aliquots of the original culture medium. The use of aliquots of the original culture medium may be desirable because the concentrations of other nutrients in the medium (e.g. the nitrogen and phosphate sources) can be maintained simultaneously. Likewise, the trace metals concentrations can be maintained in the culture medium by addition of aliquots of the trace metals solution.

Other suitable fermentation medium and methods are described in, e.g., WO 2016/196321.

Fermentation Compositions

Provided herein are fermentation compositions that contain a genetically modified host cell described herein and steviol glycosides produced by the genetically modified host cell. The fermentation compositions may further contain a medium. The fermentation compositions may contain a genetically modified host cell, Reb A, Reb D, and/or Reb M. The fermentation compositions provided herein may contain Reb M as a major component of the steviol glycosides produced by the genetically modified host cell. The fermentation compositions may contain Reb A, Reb D, and Reb M at a ratio of at least 1:7:50. The fermentation compositions may contain Reb A, Reb D, and Reb M at a ratio of at least 1:7:50 to 1:0.5:150. The ratio of Reb A, Reb D, and Reb M may be based on the total content of steviol glycosides that are associated with the genetically modified host cell and the medium. Alternatively, the ratio of Reb A, Reb D, and Reb M may be based on the total content of steviol glycosides in the medium. Further, the ratio of Reb A, Reb D, and Reb M may be based on the total content of steviol glycosides that are associated with the genetically modified host cell.

The fermentation compositions may contain Reb M2 at an undetectable level. In addition, the fermentation compositions may contain non-naturally occurring steviol glycosides at an undetectable level.

Recovery of Steviol Glycosides

Once the steviol glycoside is produced by the host cell, it may be recovered or isolated for subsequent use using any suitable separation and purification methods known in the art. For example, a clarified aqueous phase containing the steviol glycoside may be separated from the fermentation by centrifugation. Alternatively, a clarified aqueous phase containing the steviol glycoside may be separated from the fermentation by adding a demulsifier into the fermentation reaction. Examples of demulsifiers include flocculants and coagulants.

The steviol glycoside produced in the host cells may be present in the culture supernatant and/or associated with the host cells. Where some of the steviol glycoside is associated with the host cell, the recovery of the steviol glycoside may involve a method of improving the release of the steviol glycosides from the cells. This could take the form of washing the cells with hot water or buffer treatment, with or without a surfactant, and with or without added buffers or salts. The temperature may be any temperature deemed suitable for releasing the steviol glycosides. For example, the temperature may be in a range from 40 to 95° C.; or from 60 to 90° C.; or from 75 to 85° C. Alternatively, the temperature may be 40, 45, 50, 55, 65, 70, 75, 80, 85, 90, or 95° C. Physical or chemical cell disruption may be used to enhance the release of steviol glycosides from the host cell. Alternatively and/or subsequently, the steviol glycoside in the culture medium may be recovered using an isolation unit operations including, solvent extraction, membrane clarification, membrane concentration, adsorption, chromatography, evaporation, chemical derivatization, crystallization, and drying.

Methods of Making Genetically Modified Cells

Also provided herein are methods for producing a host cell that is genetically engineered to contain one or more of the modifications described above, e.g., one or more heterologous nucleic acids encoding kaurenoic acid hydroxylase and/or biosynthetic pathway enzymes, e.g., for a steviol glycoside compound. Expression of a heterologous enzyme in a host cell can be accomplished by introducing into the host cells a nucleic acid comprising a nucleotide sequence encoding the enzyme under the control of regulatory elements that permit expression in the host cell. The nucleic acid may be an extrachromosomal plasmid, a chromosomal integration vector that can integrate the nucleotide sequence into the chromosome of the host cell, or a linear piece of double stranded DNA that can integrate via homology the nucleotide sequence into the chromosome of the host cell.

Nucleic acids encoding these proteins can be introduced into the host cell by any method known to one of skill in the art (see, e.g., Hinnen et al., (1978) *Proc. Natl. Acad. Sci. USA*, vol. 75, pp. 1292-1293; Cregg et al., (1985), *Mol. Cell. Biol.*, vol. 5, pp. 3376-3385; Goeddel et al. eds, 1990, Methods in Enzymology, vol. 185, Academic Press, Inc., CA; Krieger, 1990, Gene Transfer and Expression—A Laboratory Manual, Stockton Press, NY; Sambrook et al., 1989, Molecular Cloning—A Laboratory Manual, Cold Spring Harbor Laboratory, NY; and Ausubel et al., eds., Current Edition, Current Protocols in Molecular Biology, Greene Publishing Associates and Wiley Interscience, NY). Exemplary techniques include, spheroplasting, electroporation, PEG 1000 mediated transformation, and lithium acetate or lithium chloride mediated transformation.

The amount of an enzyme in a host cell may be altered by modifying the transcription of the gene that encodes the enzyme. This can be achieved by modifying the copy number of the nucleotide sequence encoding the enzyme (e.g., by using a higher or lower copy number expression vector comprising the nucleotide sequence, or by introducing additional copies of the nucleotide sequence into the genome of the host cell or by deleting or disrupting the nucleotide sequence in the genome of the host cell), by changing the order of coding sequences on a polycistronic mRNA of an operon or breaking up an operon into individual genes each with its own control elements, or by increasing the strength of the promoter or operator to which the nucleotide sequence is operably linked. Alternatively, or in addition, the copy number of an enzyme in a host cell may be altered by modifying the level of translation of an mRNA that encodes the enzyme. This can be achieved by modifying the stability of the mRNA, modifying the sequence of the ribosome binding site, modifying the distance or sequence between the ribosome binding site and the start codon of the enzyme coding sequence, modifying the entire intercistronic region located "upstream of" or adjacent to the 5' side of the start codon of the enzyme coding region, stabilizing the 3'-end of the mRNA transcript using hairpins and specialized sequences, modifying the codon usage of enzyme, altering expression of rare codon tRNAs used in the biosynthesis of the enzyme, and/or increasing the stability of the enzyme, as, for example, via mutation of its coding sequence.

The activity of an enzyme in a host cell may be altered in a number of ways, including expressing a modified form of the enzyme that exhibits increased or decreased solubility in the host cell, expressing an altered form of the enzyme that lacks a domain through which the activity of the enzyme is inhibited, expressing a modified form of the enzyme that has a higher or lower $K_{cat}$ or a lower or higher $K_m$ for the substrate, expressing a modified form of the enzyme that has a higher or lower thermostability, expressing a modified form of the enzyme that has a higher or lower activity at the pH of the cell, expressing a modified form of the enzyme that has a higher or lower accumulation in a subcellular compartment or organelle, expressing a modified form of the enzyme that has increased or decreased ability to insert into or associate with cellular membranes, expressing a modified form of the enzyme that has a higher or lower affinity for accessory proteins needed to carry out a reaction, expressing a modified form of the enzyme that has a higher or lower affinity for necessary cofactors or ligands, expressing a modified form of the enzyme that has an increased or decreased space in the active site (thereby differentially allowing or excluding different substrates for the reaction), or expressing an altered form of the enzyme that is more or less affected by feed-back or feed-forward regulation by another molecule in the pathway.

A nucleic acid used to genetically modify a host cell may contain one or more selectable markers useful for the selection of transformed host cells and for placing selective pressure on the host cell to maintain the foreign DNA.

The selectable marker may be an antibiotic resistance marker. Examples of antibiotic resistance markers include the BLA, NAT1, PAT, AUR1-C, PDR4, SMR1, CAT, mouse dhfr, HPH, DSDA, KAN$^R$, and SH BLE gene products. The BLA gene product from *E. coli* confers resistance to beta-lactam antibiotics (e.g., narrow-spectrum cephalosporins, cephamycins, and carbapenems (ertapenem), cefamandole, and cefoperazone) and to all the anti-gram-negative-bacterium penicillins except temocillin; the NAT1 gene product from *S. noursei* confers resistance to nourseothricin; the PAT gene product from *S. viridochromogenes* Tu94 confers resistance to bialophos; the AUR1-C gene product from *Saccharomyces cerevisiae* confers resistance to Auerobasidin A (AbA); the PDR4 gene product confers resistance to cerulenin; the SMR1 gene product confers resistance to sulfometuron methyl; the CAT gene product from Tn9 transposon confers resistance to chloramphenicol; the mouse dhfr gene product confers resistance to methotrexate; the HPH gene product of *Klebsiella pneumonia* confers resistance to Hygromycin B; the DSDA gene product of *E. coli* allows cells to grow on plates with D-serine as the sole nitrogen source; the KAN$^R$ gene of the Tn903 transposon confers resistance to G418; and the SH BLE gene product from *Streptoalloteichus hindustanus* confers resistance to Zeocin (bleomycin). The antibiotic resistance marker may be deleted after the genetically modified host cell disclosed herein is isolated.

The selectable marker may function by rescue of an auxotrophy (e.g., a nutritional auxotrophy) in the genetically modified microorganism. In auxotrophy, a parent microorganism contains a functional disruption in one or more gene products that function in an amino acid or nucleotide biosynthetic pathway and that renders the parent cell incapable of growing in media without supplementation with one or more nutrients. Such gene products include the HIS3, LEU2, LYS1, LYS2, MET15, TRP1, ADE2, and URA3 gene products in yeast. The auxotrophic phenotype can then be rescued by transforming the parent cell with an expression vector or chromosomal integration construct encoding a functional copy of the disrupted gene product, and the genetically modified host cell generated can be selected for based on the loss of the auxotrophic phenotype of the parent cell. Utilization of the URA3, TRP1, and LYS2 genes as selectable markers has a marked advantage because both positive and negative selections are possible. Positive selection is carried out by auxotrophic complementation of the URA3, TRP1, and LYS2 mutations, whereas negative selection is based on specific inhibitors, i.e., 5-fluoro-orotic acid (FOA), 5-fluoroanthranilic acid, and aminoadipic acid (aAA), respectively, that prevent growth of the prototrophic strains but allows growth of the URA3, TRP1, and LYS2 mutants, respectively. The selectable marker may rescue other non-lethal deficiencies or phenotypes that can be identified by a known selection method.

Described herein are specific genes and proteins useful in the methods, compositions, and host cells of the invention; however, the absolute identity to such genes is not necessary. For example, changes in a particular gene or polynucleotide containing a sequence encoding a polypeptide or enzyme can be performed and screened for activity. Typically, such changes involve conservative mutations and silent mutations. Such modified or mutated polynucleotides and polypeptides can be screened for expression of a functional enzyme using methods known in the art.

Due to the inherent degeneracy of the genetic code, other polynucleotides which encode substantially the same or functionally equivalent polypeptides may also be used to express the enzymes.

It can be advantageous to modify a coding sequence to enhance its expression in a particular host. The genetic code is redundant with 64 possible codons, but most organisms typically use a subset of these codons. The codons that are utilized most often in a species are called optimal codons, and those not utilized very often are classified as rare or low-usage codons. Codons can be substituted to reflect the preferred codon usage of the host, in a process sometimes called "codon optimization" or "controlling for species codon bias." Codon optimization for other host cells can be readily determined using codon usage tables or can be performed using commercially available software, such as CodonOp from Integrated DNA Technologies.

Optimized coding sequences containing codons preferred by a particular prokaryotic or eukaryotic host (Murray et al., (1989), *Nucl Acids Res.*, vol. 17, pp. 477-508) can be prepared, to increase the rate of translation or to produce recombinant RNA transcripts having desirable properties, such as a longer half-life, as compared with transcripts produced from a non-optimized sequence. Translation stop codons can also be modified to reflect host preference. For example, typical stop codons for *S. cerevisiae* and mammals are UAA and UGA, respectively. The typical stop codon for monocotyledonous plants is UGA, whereas insects and *E. coli* commonly use UAA as the stop codon (Dalphin et al., (1996), *Nucl Acids Res.*, vol. 24, pp. 216-218).

Due to the degenerate nature of the genetic code, a variety of DNA molecules differing in their nucleotide sequences may be used to encode a given enzyme of the disclosure. The native DNA sequence encoding the biosynthetic enzymes described above are referenced herein merely to illustrate an embodiment of the disclosure, and the disclosure includes DNA molecules of any sequence that encode the amino acid sequences of the polypeptides and proteins of the enzymes utilized in the methods of the invention. In similar fashion, a polypeptide can typically tolerate one or more amino acid substitutions, deletions, and insertions in its amino acid sequence without loss or significant loss of a desired activity. The invention includes such polypeptides with different amino acid sequences than the specific proteins described herein so long as the modified or variant polypeptides have the enzymatic activity of the reference polypeptide. Furthermore, the amino acid sequences encoded by the DNA sequences shown herein merely illustrate examples of the invention.

In addition, homologs of enzymes useful for the practice of the compositions, methods, or host cells are encompassed by the invention. Two proteins (or a region of the proteins) are considered to be substantially homologous when the amino acid sequences have at least about 30%, 40%, 50%, 60%, 65%, 70%, 75%, 80%, 85%, 90%, 91%, 92%, 93%, 94%, 95%, 96%, 97%, 98%, or 99% identity. To determine the percent identity of two amino acid sequences, or of two nucleic acid sequences, the sequences are aligned for optimal comparison purposes (e.g., gaps can be introduced in one or both of a first and a second amino acid or nucleic acid sequence for optimal alignment and non-homologous sequences can be disregarded for comparison purposes). The length of a reference sequence aligned for comparison purposes may be at least 30%, typically at least 40%, more typically at least 50%, even more typically at least 60%, and even more typically at least 70%, 80%, 90%, 100% of the length of the reference sequence. The amino acid residues or nucleotides at corresponding amino acid positions or nucleotide positions are then compared. When a position in the first sequence is occupied by the same amino acid residue or nucleotide as the corresponding position in the second sequence, then the molecules are identical at that position (as used herein amino acid or nucleic acid "identity" is equivalent to amino acid or nucleic acid "homology"). The percent identity between the two sequences is a function of the number of identical positions shared by the sequences, taking into account the number of gaps, and the length of each gap, which need to be introduced for optimal alignment of the two sequences.

When "homologous" is used in reference to proteins or peptides, it is recognized that residue positions that are not identical often differ by conservative amino acid substitutions. A "conservative amino acid substitution" is one in which an amino acid residue is substituted by another amino acid residue having a side chain (R group) with similar chemical properties (e.g., charge or hydrophobicity). In general, a conservative amino acid substitution will not substantially change the functional properties of a protein. In cases where two or more amino acid sequences differ from each other by conservative substitutions, the percent sequence identity or degree of homology may be adjusted upwards to correct for the conservative nature of the substitution. Means for making this adjustment are well known to those of skill in the art (See, e.g., Pearson W. R., (1994), *Methods in Mol Biol*, vol. 25, pp. 365-389).

The following six groups each contain amino acids that are conservative substitutions for one another: 1) Serine (S), Threonine (T); 2) Aspartic Acid (D), Glutamic Acid (E); 3) Asparagine (N), Glutamine (Q); 4) Arginine (R), Lysine (K); 5) Isoleucine (I), Leucine (L), Alanine (A), Valine (V), and 6) Phenylalanine (F), Tyrosine (Y), Tryptophan (W).

Sequence homology for polypeptides, which is also referred to as percent sequence identity, is typically measured using sequence analysis software. A typical algorithm used for comparing a molecule sequence to a database containing a large number of sequences from different organisms is the computer program BLAST. When searching a database containing sequences from a large number of different organisms, it is typical to compare amino acid sequences.

Furthermore, any of the genes encoding the foregoing enzymes or any of the regulatory elements that control or modulate their expression may be optimized by genetic/protein engineering techniques, such as directed evolution or rational mutagenesis. Such action allows those of ordinary skill in the art to optimize the enzymes for expression and activity in yeast.

In addition, genes encoding these enzymes can be identified from other fungal and bacterial species and can be expressed for the modulation of the steviol glycoside pathway. A variety of organisms may serve as sources for these enzymes, including *Saccharomyces* spp., including *S. cerevisiae* and *S. uvarum*, *Kluyveromyces* spp., including *K. thermotolerans*, *K. lactis*, and *K. marxianus*, *Pichia* spp., *Hansenula* spp., including *H. polymorpha*, *Candida* spp., *Trichosporon* spp., *Yamadazyma* spp., including *Y.* spp. *stipitis*, *Torulaspora pretoriensis*, *Issatchenkia orientalis*, *Schizosaccharomyces* spp., including *S. pombe*, *Cryptococcus* spp., *Aspergillus* spp., *Neurospora* spp., or *Ustilago* spp. Sources of genes from anaerobic fungi include *Piromyces* spp., *Orpinomyces* spp., or *Neocallimastix* spp. Sources of prokaryotic enzymes that are useful include *Escherichia. coli*, *Zymomonas mobilis*, *Staphylococcus aureus*, *Bacillus* spp., *Clostridium* spp., *Corynebacterium* spp., *Pseudomonas* spp., *Lactococcus* spp., *Enterobacter* spp., and *Salmonella* spp.

Techniques known to those skilled in the art may be suitable to identify additional homologous genes and enzymes. Generally, analogous genes and/or analogous enzymes can be identified by functional analysis and will have functional similarities. Techniques known to be suitable to identify analogous genes and analogous enzymes include PCR, degenerate PCR, low stringency nucleic acid hybridization, expression cloning, and high through-put screening. For example, to identify homologous or analogous UDP glycosyltransferases, KAH, or any steviol glycoside biosynthetic pathway genes, proteins, or enzymes, techniques may include, but are not limited to, cloning a gene by PCR using primers based on a published sequence of a gene/enzyme of interest, or by degenerate PCR using degenerate primers designed to amplify a conserved region among a gene of interest. Further, one may use techniques to identify homologous or analogous genes, proteins, or enzymes with functional homology or similarity. Techniques include examining a cell or cell culture for the catalytic activity of an enzyme through in vitro enzyme assays for said activity (e.g. as described herein or in Kiritani, K., Branched-Chain Amino Acids Methods Enzymology, 1970), then isolating the enzyme with said activity through purification, determining the protein sequence of the enzyme through techniques such as Edman degradation, design of PCR primers to the likely nucleic acid sequence, amplification of said DNA sequence through PCR, and cloning of said nucleic acid sequence. To identify homologous or similar genes and/or homologous or similar enzymes, analogous genes and/or analogous enzymes or proteins, techniques also include comparison of data concerning a candidate gene or enzyme with databases such as BRENDA, KEGG, or MetaCYC. The candidate gene or enzyme may be identified within the above-mentioned databases in accordance with the teachings herein.

EXAMPLES

Example 1

Yeast Transformation Methods

Each DNA construct was integrated into *Saccharomyces cerevisiae* (CEN.PK113-7D) using standard molecular biology techniques in an optimized lithium acetate transformation. Briefly, cells were grown overnight in yeast extract peptone dextrose (YPD) media at 30° C. with shaking (200 rpm), diluted to an $OD_{600}$ of 0.1 in 100 mL YPD, and grown to an $OD_{600}$ of 0.6-0.8. For each transformation, 5 mL of culture were harvested by centrifugation, washed in 5 mL of sterile water, spun down again, resuspended in 1 mL of 100 mM lithium acetate, and transferred to a microcentrifuge tube. Cells were spun down (13,000×g) for 30 s, the supernatant was removed, and the cells were resuspended in a transformation mix consisting of 240 µL 50% PEG, 36 µL 1 M lithium acetate, 10 µL boiled salmon sperm DNA, and 74 µL of donor DNA. For transformations that require expression of the endonuclease F-CphI, the donor DNA included a plasmid carrying the F-CphI gene expressed under the yeast TDH3 promoter. F-CphI endonuclease expressed in such a manner cuts a specific recognition site engineered in a host strain to facilitate integration of the target gene of interest. Following a heat shock at 42° C. for 40 min, cells were recovered overnight in YPD media before plating on selective media. DNA integration was confirmed by colony PCR with primers specific to the integrations.

Example 2

Generation of a Base Strain Capable of High Flux to Farnesyl Pyrophosphate (FPP) and the Isoprenoid Farnesene A farnesene production strain was created from a wild-type *Saccharomyces cerevisiae* strain (CEN.PK113-7D) by expressing the genes of the mevalonate pathway under the control of native GAL promoters. This strain comprised the following chromosomally integrated mevalonate pathway genes from *S. cerevisiae*: acetyl-CoA thiolase, HMG-CoA synthase, HMG-CoA reductase, mevalonate kinase, phosphomevalonate kinase, mevalonate pyrophosphate decarboxylase, and IPP:DMAPP isomerase. In addition, the strain contained multiple copies of farnesene synthase from *Artemisia annua*, also under the control of either native GAL1 or GAL10 promoters. All heterologous genes described herein were codon optimized using publicly available or other suitable algorithms. The strain also contained a deletion of the GAL80 gene and the ERG9 gene encoding squalene synthase is downregulated by replacing the native promoter with the promoter of the yeast gene MET3. Examples of methods of creating *S. cerevisiae* strains with high flux to isoprenoids are described in the U.S. Pat. Nos. 8,415,136 and 8,236,512 which are incorporated herein in their entireties.

Example 3

Figure 1:
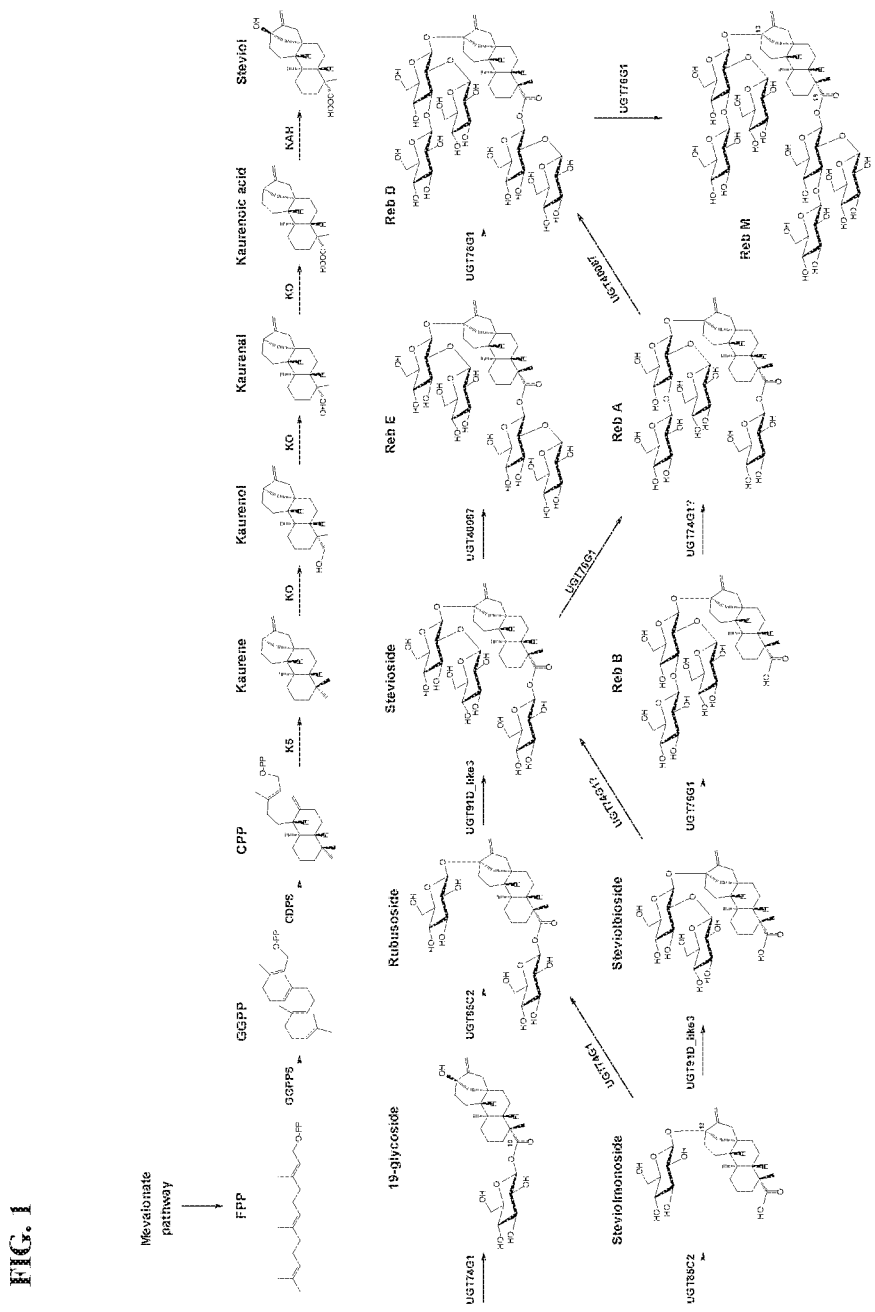
FIG. 1 is a schematic showing an enzymatic pathway from the native yeast metabolite farnesyl pyrophosphate (FPP) to rebaudioside M (Reb M).

Construction of a Series of Strains for Rapid Screening for Novel Kaurenoic Acid Hydroxylase P450 Enzymes FIG. 1 shows an exemplary biosynthetic pathway from FPP to Reb M with the kaurenoic acid intermediate. The farnesene base strain described above was further engineered to have high flux to the C20 isoprenoid kaurene by integrating six copies of a geranylgeranyl pyrophosphate synthase (GGPPS) into the genome, four copies of a copalyl diphosphate synthase, and four copies of a kaurene synthase. Subsequently, all copies of farnesene synthase were removed from the strain and the strain was confirmed to produce ent-kaurene and no farnesene.

Kaurenoic acid hydroxylase (KAH) is a cytochrome P450 enzyme that catalyzes the oxidation of kaurenoic acid to produce steviol (see FIG. 1) which is necessary to produce Reb M. To screen novel P450 enzymes for KAH activity in vivo in *S. cerevisiae*, several strains were made that contained all the genes necessary to produce Reb M, except they lacked any copy of a KAH gene. Table 1 lists all Reb M pathway genes and promoters used. The strains containing all genes described in Table 1 primarily produce kaurenoic acid, the substrate for KAH.

TABLE 1

Genes, promoters, and amino acid sequences of the enzymes used to convert FPP to RebM.

| Enzyme | SEQ ID | Promoter |
| --- | --- | --- |
| Bt.GGPPS | SEQ ID NO: 7 | PGAL1 |
| Ent-Os.CDPS | SEQ ID NO: 8* | PGAL1 |
| Ent-Pg.KS | SEQ ID NO: 9 | PGAL1 |
| Sr.KO | SEQ ID NO: 6 | PGAL1 |
| At.CPR | SEQ ID NO: 11 | PGAL3 |
| UGT85C2 | SEQ ID NO: 12 | PGAL10 |
| UGT74G1 | SEQ ID NO: 13 | PGAL1 |
| UGT91D_like3 | SEQ ID NO: 14 | PGAL1 |
| UGT76G1 | SEQ ID NO: 15 | PGAL10 |
| UGT40087 | SEQ ID NO: 16 | PGAL1 |

*First 65 amino acids replaced with methionine.

Figure 2:
FIG. 2 is a schematic of the landing pad DNA construct used to insert KAH genes into Reb M strains. The landing pad consists of 500 bp of locus-targeting DNA sequences on either end of the construct to the genomic region upstream and downstream of the yeast locus of choice. The locus is chosen so that insertion of the landing pad does not delete any gene. Internally, the landing pad contains a GAL promoter followed by a recognition site for the F-CphI endonuclease and the yeast terminator. Endonuclease F-CphI cuts the recognition sequence creating a double strand break at the landing pad thus facilitating homologous recombination of the Ro.KAH DNA variants at the site.

To measure the activity of KAH variants in vivo in *S. cerevisiae*, initially a first screening strain was constructed that contains all the genes necessary to produce Reb M, except it lacked any copy of a KAH gene (Table 1 and FIG. 1). Instead, it contains a landing pad to allow for the rapid insertion of KAH variants (FIG. 2). The landing pad consists of 500 bp of locus-targeting DNA sequences on either end of the construct to the genomic region upstream and downstream of the yeast locus of choice (Upstream locus and Downstream locus), thereby deleting the locus when the landing pad is integrated into the yeast chromosome. Internally, the landing pad contains a promoter (Promoter) which can be GAL1, GAL3, or any other promoter of yeast GAL regulon and a yeast terminator of choice (Terminator) flanking an endonuclease recognition site (F-CphI). DNA variants of Ro.KAH (SEQ ID NO: 1) were used to transform the strain along with a plasmid expressing endonuclease F-CphI, which cuts the recognition sequence, creating a double strand break at the landing pad, and facilitating homologous recombination of the Ro.KAH DNA variants at the site.

A second screening strain was generated that has the same engineering as the first screening strain except the Sr.KO was replaced with Ps.KO (SEQ ID NO: 10). The Ps.KO enzyme is described in PCT/US2018/046359 (PISUM SATIVUM KAURENE OXIDASE FOR HIGH EFFICIENCY PRODUCTION OF REBAUDIOSIDES filed Aug. 10, 2018) and is significantly more active in converting kaurene to kaurenoic acid (FIG. 1). The second screening strain therefore has a higher carbon flux to kaurenoic acid, the substrate of the KAH P450.

These strains and their modified derivatives (e.g., different GAL promoters and yeast terminators can be used within the landing pad to tune the expression of the KAH genes) are referred to as Reb M producing yeast that lack a functional KAH gene.

Example 4

Yeast Culturing Conditions

Yeast colonies verified to contain the expected KAH gene were picked into 96-well microtiter plates containing Bird Seed Media (BSM, originally described by van Hoek et al., *Biotechnology and Bioengineering* 68(5), 2000, pp. 517-523) with 20 g/L sucrose, 37.5 g/L ammonium sulfate, and 1 g/L lysine. Cells were cultured at 30° C. in a high capacity microtiter plate incubator shaking at 1000 rpm and 80% humidity for 3 days until the cultures reached carbon exhaustion. The growth-saturated cultures were subcultured into fresh plates containing BSM with 40 g/L sucrose, 150 g/L ammonium sulfate, and 1 g/L lysine by taking 14.4 µL from the saturated cultures and diluting into 360 µL of fresh media. Cells in the production media were cultured at 30° C. in a high capacity microtiter plate shaker at 1000 rpm and 80% humidity for additional 3 days prior to extraction and analysis.

Example 5

Whole Cell Broth Sample Preparation Conditions for Analysis of Steviol Glycosides To extract all steviol glycosides made by cells (see FIG. 1), upon culturing completion, the whole cell broth was diluted with 628 µL of 100% ethanol, sealed with a foil seal, and shaken at 1250 rpm for 30 s. Water (314 µL) was added to each well directly to dilute the extraction, and the plate was briefly centrifuged to pellet solids. Ethanol:water mixture (198 µL of 50:50) containing 0.48 mg/L rebaudioside N (used as an internal standard) was dispensed to a new 250 µL assay plate and 2 µL of the culture/ethanol mixture was added to the assay plate. A foil seal was applied to the plate for analysis.

Example 6

Analytical Methods

Samples derived from yeast producing steviol glycosides (Example 5) were routinely analyzed using mass spectrometer (Agilent 6470-QQQ) with a RapidFire 365 system autosampler with C8 cartridge. Steviol glycosides and an undesirable impurity abbreviated as C20H32O4+1Glc were measured in the assay.

TABLE 2

| RapidFire 365 system configuration. | |
|---|---|
| Pump 1, Line A: 2 mM ammonium formate in water | 100% A, 1.5 mL/min |
| Pump 2, Line A: 35% acetonitrile in water | 100% A, 1.5 mL/min |
| Pump 3, Line A: 80% acetonitrile in water | 100% A, 0.8 mL/min |
| State 1: Aspirate | 600 ms |
| State 2: Load/wash | 3000 ms |
| State 3: Extra wash | 1500 ms |
| State 4: Elute | 5000 ms |
| State 5: Reequilibrate | 1000 ms |

TABLE 3

| 6470-QQQ MS method configuration. | |
|---|---|
| Ion source | AJS ESI |
| Time filtering peak width | 0.02 min |
| Stop time | No limit/as pump |
| Scan type | MRM |
| Diverter valve | To MS |
| Delta EMV | (+)0/(−)300 |
| Ion mode (polarity) | Negative |
| Gas temperature | 250° C. |
| Gas flow | 11 L/min |
| Nebulizer | 30 psi |
| Sheath gas temperature | 350° C. |
| Sheath gas flow | 11 L/min |
| Negative capillary voltage | 2500 V |

The mass spectrometer was operated in negative ion multiple reaction monitoring (MRM) mode. Each steviol glycoside was identified from precursor ion mass and MRM transition (Table 4). The fragmentation at labile carboxylic ester linkage at the C19 allowed for distinction between regioisomers Reb A and Reb E while no distinction can be made between rubusoside and steviolbioside (steviol+2Glc) or stevioside and Reb B (steviol+3Glc) using this method.

TABLE 4

| Steviol glycosides and masses for corresponding precursor and product ions | | |
|---|---|---|
| Compound | Precursor ion (Da) | Product ion (Da) |
| steviol + 1Glc | 479.265 | 317.212 |
| steviol + 2Glc | 641.318 | 479.265 |
| steviol + 3Glc | 803.371 | 641.318 |
| Reb A | 965.424 | 803.371 |
| Reb E | 965.424 | 641.318 |
| steviol + 5Glc | 1127.476 | 803.371 |
| steviol + 6Glc | 1289.529 | 803.371 |
| C20H32O4 + 1Glc | 543.281 (formate) | 335.222 |

The peak areas from a chromatogram from a mass spectrometer were used to generate the calibration curve using authentic standards. The molar ratios of relevant compounds were determined by quantifying the amount in moles of each compound through external calibration using an authentic standard, and then taking the appropriate ratios. Due to the absence of a purified authentic standard for C20H32O4+1Glc, the relative production of C20H32O4+1Glc in different yeast strains was evaluated from the corresponding peak area only.

To determine specific steviol glycosides and to evaluate the presence of new side products, selected samples were also analyzed using ultra-high-performance liquid chromatography (UHPLC) on Thermo Fisher Scientific Vanquish UHPLC system equipped with Acquity UPLC BEH C18 column (15 cm, 2.1 mm, 1.7 µm, 130 Å; part #186002353) (Table 5). Dual detection was performed using Vanquish charged aerosol detector (CAD) (Table 6) and Thermo Fisher Scientific Q-Exactive Orbitrap mass spectrometer (Table 7) with post-column flow split 5:1 (5 to CAD and 1 to MS) using Restek binary fixed-flow splitter.

TABLE 5

| Vanquish UHPLC chromatographic conditions. | | |
|---|---|---|
| Mobile phase A | 0.1% formic acid in water | |
| Mobile phase B | 0.1% formic acid in acetonitrile | |
| Flow rate | 0.4 mL/min | |
| Column temperature | 50° C. | |
| Pre-heater temperature | 50° C. | |
| Gradient | | |
| Time (min) | A% | B% |
| 0 | 80 | 20 |
| 2 | 80 | 20 |
| 28 | 54 | 46 |

TABLE 5-continued

Vanquish UHPLC chromatographic conditions.

| | | |
|---|---|---|
| 28.1 | 5 | 95 |
| 32 | 5 | 95 |
| 32.5 | 80 | 20 |
| 36 | 80 | 20 |

TABLE 6

Vanquish CAD detector configuration.

| | |
|---|---|
| Power function | 1.00 |
| Data collection rate | 2 Hz |
| Filter | 3.6 |
| Gas regulation mode | Analytical |
| Evaporator temperature | 35° C. |

TABLE 7

Q-Exactive Orbitrap MS method configuration.

| Ion source conditions: | | |
|---|---|---|
| Ion source | | ESI |
| Sheath gas flow rate | | 40 |
| Auxiliary gas flow rate | | 15 |
| Sweep gas flow rate | | 2 |
| Spray voltage | | 3500 V |
| Capillary temperature | | 375° C. |
| S-Lens RF level | | 60.0 |
| Auxiliary gas heater temperature | | 400° C. |
| Scan settings: | | |
| General | Runtime | 0 to 36 min |
| | Polarity | Negative |
| | Default charge state | 1 |
| | Inclusion | On |
| | Exclusion | On |
| | Scan type | Full MS-ddMS$^2$ |
| Full MS | Resolution | 70,000 |
| | AGC target | 1e6 |
| | Maximum IT | 50 ms |
| | Scan range | 300 to 2000 m/z |
| | Spectrum data type | Centroid |
| ddMS$^2$ | Resolution | 35,000 |
| | AGC target | 1e5 |
| | Maximum IT | 50 ms |
| | Loop count | 10 |
| | TopN | 10 |
| | Isolation window | 2.0 m/z |
| | Stepped (N)CE | nce: 10, 30, 40 |
| dd Settings | Minimum AGC target | 8.00e3 |
| | Charge exclusion | >3 |
| | Exclude isotopes | On |
| | Dynamic exclusion | 4.0s |
| | If idle . . . | Pick others |

The peak identities were assigned to steviol glycosides and C20H32O4+1Glc based on retention time determined from an authentic standard, molecular ion, and MS fragmentation pattern (Table 8).

TABLE 8

Steviol glycosides, their retention times and precursor ion.

| Compound | Retention time (min) | Precursor ion (Da) |
|---|---|---|
| Steviol | 27.8 | 317.212 |
| Steviolmonoside | 20.6 | 479.265 |
| 19-glycoside | 19.4 | 479.265 |

TABLE 8-continued

Steviol glycosides, their retention times and precursor ion.

| Compound | Retention time (min) | Precursor ion (Da) |
|---|---|---|
| Steviolbioside | 17.5 | 641.318 |
| Rubusoside | 15.5 | 641.318 |
| Reb B | 17.6 | 803.371 |
| Stevioside | 12.7 | 803.371 |
| Reb E | 7.4 | 965.424 |
| Reb A | 12.7 | 965.424 |
| Reb D | 8.0 | 1127.476 |
| Reb M | 8.8 | 1289.529 |
| C20H32O4 + 1Glc | 9.5 | 543.281 (formate) |

Example 7

KAH from *Rubus Occidentalis* is a Novel P450 Enzyme with KAH Activity

A previously identified KAH enzyme (Rs.KAH; SEQ ID NO: 3) from the plant Rubus suavissimus (also known as Chinese blackberry or Chinese sweet leaf) was used as a query to search the genome of the related plant black raspberry (*Rubus occidentalis*). The whole-genome assembly of *R. occidentalis* is publicly available at (https://www.rosaceae/.org/organism/Rubus/occidentalis). Using the default tBLASTn feature on the website and the Rs.KAH amino acid sequence as the query sequence, a putative KAH ortholog was identified encoded by five exons on chromosome 3. The protein sequence of the putative Ro.KAH was deduced by translating the DNA coding sequence of the five exons into a single protein sequence (SEQ ID NO: 1). A yeast-codon optimized DNA sequence (SEQ ID NO: 2) for the putative Ro.KAH protein was generated, and the corresponding synthetic DNA sequence was assembled.

The yeast codon-optimized Ro.KAH gene was PCR-amplified using primers designed to have 40 bp of flanking homology to the promoter and the yeast terminator DNA sequences in the landing pad (see FIG. 2). These flanks were added to the ends of the amplified gene to facilitate homologous recombination into the landing pad at the specific locus of the host strain. Additional other KAH genes used as experimental controls were also amplified with primers containing the same 40 bp of flanking sequences in the landing pad. Each KAH gene was transformed individually as a single copy into a Reb M-screening strain described above (Example 3) and screened for the ability to produce steviol glycosides when expressed in vivo. The host strains described in Example 3 are unable to produce steviol glycosides as they lack any KAH gene. Therefore, in order to produce steviol glycosides, the gene product introduced into the transformants must have KAH activity and be able to convert kaurenoic acid to steviol for further glycosylation by the UGT genes of host yeast.

To determine in vivo KAH activity in a host strain, steviol glycosides in the whole cell broth produced by a strain were extracted and measured via mass spectrometry (Examples 4-6). The sum of all the steviol glycosides was calculated (in μM) and reported as total steviol glycosides (TSG). The activity of individual KAH variants was calculated by normalizing TSG measurements for a strain containing a particular KAH enzyme to that of a strain containing the wild-type Rs.KAH enzyme.

Figure 3:
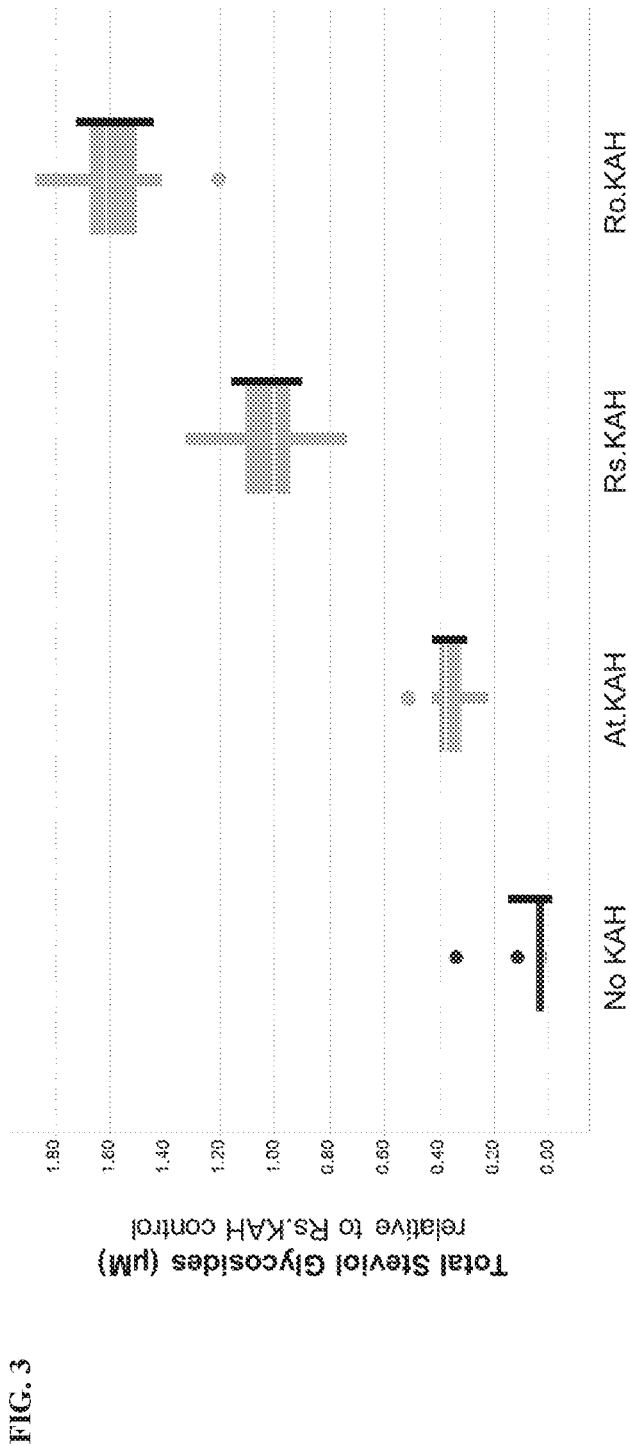
FIG. 3 is a graph of total steviol glycosides (measured in µM) in whole cell broth relative to a Rs.KAH control. Yeast strains with different overexpressed KAH genes were grown in microtiter plates. Also shown are the data for the parent strain that does not contain any KAH. Dark vertical lines represent 95% confidence interval of the mean (N=8).

Overexpression of the putative Ro.KAH sequence in a host strain confirmed that the protein product of this gene encodes a KAH activity (FIG. 3). As expected, a host strain with no KAH gene does not make any steviol glycosides. Expression of the previously identified genes encoding At.KAH (SEQ ID NO: 4) or Rs.KAH (SEQ ID NO: 3) led to the production of steviol glycosides (FIG. 3). The activity of Ro.KAH measured in such a manner was higher than KAH activity of either At.KAH or Rs.KAH (4- and 1.5-fold higher, respectively).

Example 8

Evolution of Wild-Type Ro.KAH Via Site-Directed Saturation Mutagenesis

In this example, activity data is provided for wild-type Ro.KAH and specific mutations that improve Ro.KAH activity when expressed in S. cerevisiae host for production of steviol glycosides including Reb M.

Each amino acid residue in Ro.KAH was mutated using degenerate codons producing two sets of libraries. Degenerate codons consisted of either NDT combined with VHG (first set) or NNY (second set), where N stands for any nucleotide adenine, thymine, guanine, and cytosine; D stands for adenine, guanine, and thymine; T stands for thymine; V stands for adenine, cytosine, and guanine; H stands for adenine, cytosine, and thymine; G stands for guanine; and Y stands for cytosine and guanine. The degenerate codon NDT encodes 12 different amino acids (R, N, D, C, G, H, I, L, F, S, Y, and V) whereas the degenerate codon VHG encodes 9 different amino acids (A, E, K, L, M, P, Q, T, and V) in equal fractions. When VHG and NDT are mixed in a ratio of 3:4, all amino acids except for tryptophan are represented in a roughly equimolar amount. The degenerate codon NNY encodes 15 different amino acids (A, C, D, F, G, H, I, L, N, P, R, S, T, V, and Y). Each library was constructed via PCR using primers designed to introduce a degenerate codon so that each PCR product contains a mixture of gene variants where 19 (first set) or 15 (second set) possible different amino acids are encoded at a specific position corresponding to a single protein residue. In each PCR product, the pool of Ro.KAH gene variants are flanked on both ends by 40 bp of sequences homologous to promoter and terminator regions of the landing pad in a host strain, as described in previous examples.

Each variant pool, representing changes at a single amino acid in Ro.KAH was transformed independently into a host yeast and screened for the effect of mutations on KAH activity as described above. For Tier 1 screening, 24 colonies were chosen per site to screen, roughly representing a 1.4× sampling rate of the library. Every amino acid in the wild-type Ro.KAH sequence (SEQ ID NO: 1) was subjected to mutagenesis and screening as described.

The amount of steviol produced by KAH is deduced by summing all of the steviol glycosides (total steviol glycosides, or TSG; in µM). The effect of a particular mutation was calculated by comparing TSG produced by a strain containing a mutant amino acid to TSG produced by a strain containing the wild-type Ro.KAH protein. Upon finding mutations in Ro.KAH that increased activity of the enzyme in vivo, a Tier 2 screen was performed with higher replication (N≥8) to confirm the improvement in steviol production, using the same calculations as above. A mutation was considered to improve Ro.KAH activity if the median amount of steviol glycosides produced by the mutant was at least one standard deviation above the median amount of steviol glycosides produced by the wild-type Ro.KAH protein.

Figure 4:
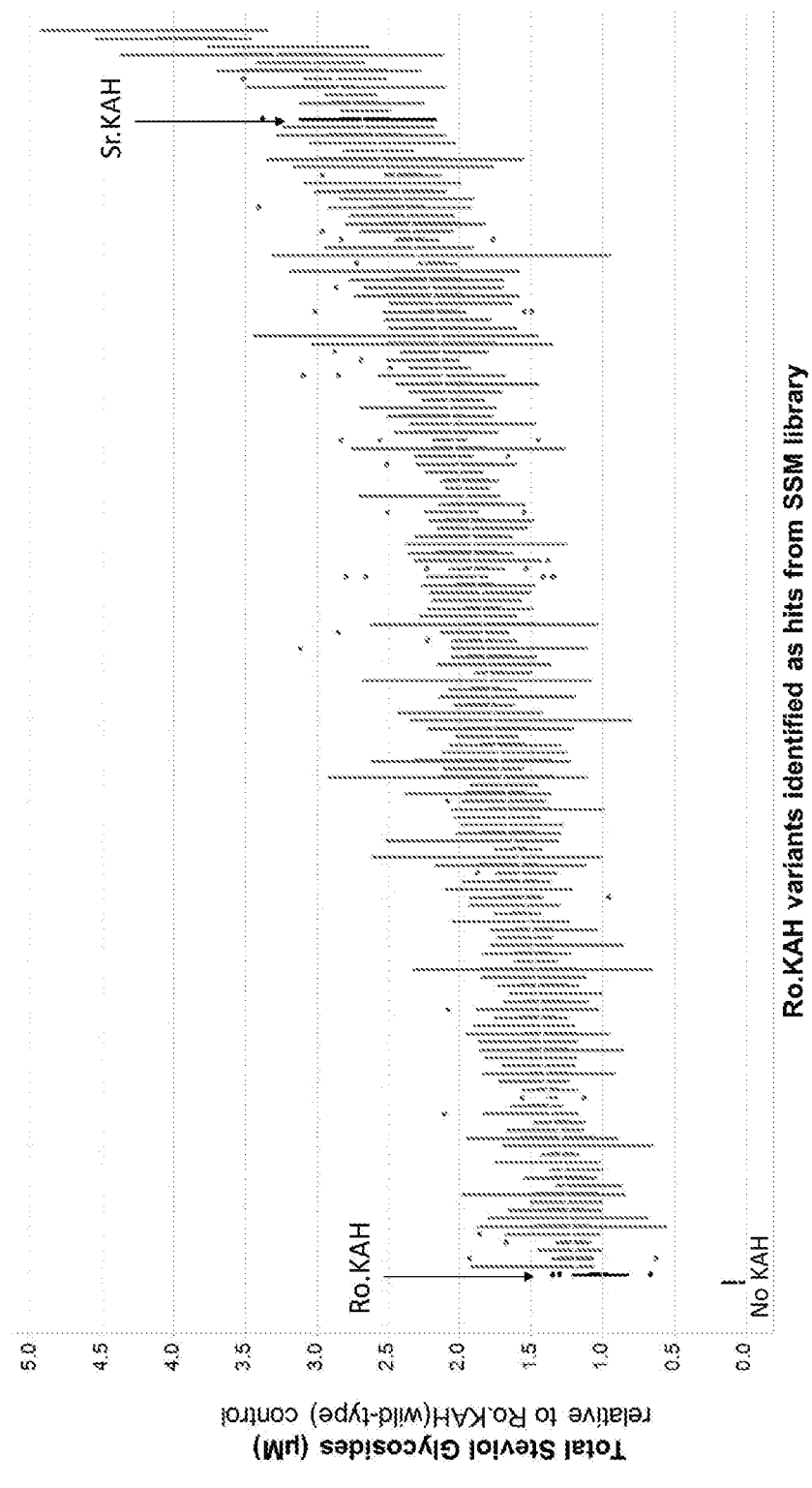
FIG. 4 is a graph of total steviol glycosides (measured in µM) in whole cell broth of Reb M producing yeast containing mutants of Ro.KAH generated in a site saturation mutagenesis library relative to wild-type Ro.KAH-containing yeast. Yeast strains with different overexpressed KAH genes were grown in microtiter plates. Also shown are the data for the parent strain that does not contain any KAH and yeast strains containing wild-type Ro.KAH and Sr.KAH.

In total, 154 unique mutations were found by screening two sets of libraries described above that improved Ro.KAH activity more than one standard deviation above the activity of the wild-type enzyme (FIG. 4). Table 9 lists the median fold improvement for each mutation over wild-type Ro.KAH. The activity of wild-type Sr.KAH is included in FIG. 4 and Table 9 for reference. Note, that the top six mutants of Ro.KAH (S452D, I104A, V340S, F229Y, A297Y, A297F) have activity improved one standard deviation or more than that of wild-type Sr.KAH.

TABLE 9

Ro.KAH alleles that increase activity of wild-type Ro.KAH measured as total steviol glycosides more than one standard deviation. Associated amino acid change and fold improvement over wild-type Ro.KAH are listed.

| Ro.KAH sequence variation | Fold improvement over wild-type Ro.KAH |
| --- | --- |
| No KAH | 0.05 |
| wild-type Ro.KAH | 1.00 |
| K69R | 1.19 |
| V343G | 1.20 |
| T403V | 1.20 |
| H491P | 1.20 |
| P72D | 1.21 |
| L64D | 1.22 |
| Q84C | 1.24 |
| L64G | 1.24 |
| E206D | 1.26 |
| Y238C | 1.26 |
| A210G | 1.26 |
| L64N | 1.26 |
| I237C | 1.27 |
| L11V | 1.27 |
| N207F | 1.28 |
| M73G | 1.28 |
| W8G | 1.28 |
| E60R | 1.31 |
| Y55S | 1.34 |
| N475G | 1.34 |
| D292P | 1.37 |
| P161C | 1.37 |
| K267D | 1.38 |
| L485F | 1.38 |
| A396F | 1.40 |
| R507A | 1.40 |
| P72T | 1.41 |
| I132G | 1.41 |
| N61P | 1.42 |
| K119V | 1.43 |
| T220E | 1.43 |
| P72G | 1.43 |
| Q513R | 1.44 |
| S133G | 1.45 |
| Y506V | 1.46 |
| K69P | 1.47 |
| E60G | 1.47 |
| K224C | 1.48 |
| M73H | 1.49 |
| H379G | 1.49 |
| P72C | 1.49 |
| K314P | 1.50 |
| W202A | 1.52 |
| G466F | 1.52 |
| N49A | 1.52 |
| S339G | 1.53 |
| N160D | 1.54 |
| T216G | 1.56 |
| D102Y | 1.56 |
| F246G | 1.56 |
| M58P | 1.58 |
| T220R | 1.59 |
| R458D | 1.60 |
| M58G | 1.61 |
| A68I | 1.62 |

TABLE 9-continued

Ro.KAH alleles that increase activity of wild-type Ro.KAH measured as total steviol glycosides more than one standard deviation. Associated amino acid change and fold improvement over wild-type Ro.KAH are listed.

| Ro.KAH sequence variation | Fold improvement over wild-type Ro.KAH |
|---|---|
| S70P | 1.66 |
| F88V | 1.66 |
| T240D | 1.67 |
| L205I | 1.67 |
| K167G | 1.67 |
| L232M | 1.67 |
| S62R | 1.69 |
| G56D | 1.70 |
| Q244G | 1.70 |
| A242D | 1.72 |
| N49R | 1.72 |
| Q513G | 1.73 |
| W29T | 1.75 |
| L303D | 1.76 |
| T378D | 1.77 |
| I508L | 1.78 |
| W202Q | 1.79 |
| S505R | 1.79 |
| R233C | 1.80 |
| I104D | 1.80 |
| M258G | 1.81 |
| K69G | 1.81 |
| F88D | 1.82 |
| F88S | 1.82 |
| A217V | 1.83 |
| E230C | 1.83 |
| R507G | 1.83 |
| G466S | 1.85 |
| G56S | 1.87 |
| E230G | 1.88 |
| Y55G | 1.89 |
| A503C | 1.89 |
| S460I | 1.90 |
| H29R | 1.91 |
| S245G | 1.91 |
| F246S | 1.92 |
| Q84L | 1.92 |
| S133R | 1.92 |
| T509V | 1.93 |
| R507E | 1.94 |
| R233T | 1.94 |
| V30F | 1.96 |
| A68G | 1.96 |
| G56N | 1.97 |
| T162G | 1.98 |
| A68P | 1.99 |
| S165D | 2.01 |
| K119Y | 2.02 |
| W29C | 2.04 |
| S165P | 2.05 |
| W29V | 2.05 |
| I284G | 2.06 |
| A217L | 2.06 |
| Q335V | 2.08 |
| L65S | 2.09 |
| F53R | 2.09 |
| Y55P | 2.09 |
| W202V | 2.10 |
| K224V | 2.12 |
| W29A | 2.13 |
| H164G | 2.13 |
| Q244D | 2.13 |
| K291C | 2.14 |
| L65G | 2.15 |
| K167S | 2.16 |
| C327I | 2.16 |
| K291S | 2.16 |
| D57G | 2.17 |
| K167H | 2.17 |
| N160T | 2.19 |
| W202C | 2.23 |
| A242G | 2.25 |
| F88R | 2.32 |
| I104N | 2.32 |
| G466D | 2.34 |
| N475D | 2.34 |
| K119S | 2.35 |
| T123D | 2.37 |
| T216A | 2.38 |
| S339A | 2.42 |
| P161D | 2.45 |
| I104R | 2.48 |
| L54G | 2.51 |
| M171F | 2.55 |
| L232Y | 2.57 |
| D293C | 2.57 |
| V340A | 2.60 |
| T162A | 2.63 |
| Sr.KAH | 2.68 |
| A297V | 2.70 |
| I104H | 2.75 |
| F332L | 2.80 |
| A236R | 2.87 |
| K224I | 2.93 |
| S452D | 2.94 |
| I104A | 3.03 |
| V340S | 3.21 |
| F229Y | 3.43 |
| A297Y | 3.93 |
| A297F | 4.13 |

Example 9

Evolution of Ro.KAH Via Combinatorial Mutagenesis (24 Amino Acid Residues Targeted for Mutagenesis in a Full-Factorial Fashion)

Two sets of 12 mutations were selected from the unique site-directed saturation mutagenesis hits described in Example 8 to build two full factorial combination libraries. The first combinatorial library contained mutations L54G, Y55P, F88R, I104A, K119S, T123D, P161D, T162A, S165D, M171F, T216A, K224I, and the second library contained mutations F229Y, L232Y, A236R, I284G, K291C, D293C, A297Y, F332L, S339A, V340A, S452D, L485F. The libraries were designed to create all possible combinations among the 12 mutations to find the combination that leads to the highest activity of Ro.KAH in vivo. The genes were assembled from a mixture of PCR-amplified fragments containing desired mutations. Each fragment contained overlapping homology on the ends of each piece so that the pieces overlapped in sequence; assembling all the pieces together in vitro using PCR reconstituted a full length KAH allele. The terminal 5' and 3' pieces also had homology to the promoter and terminator of the landing pad sequence in Reb M producing yeast that lack a functional KAH gene. The assembled full-length library genes were transformed into yeast.

Figure 5:
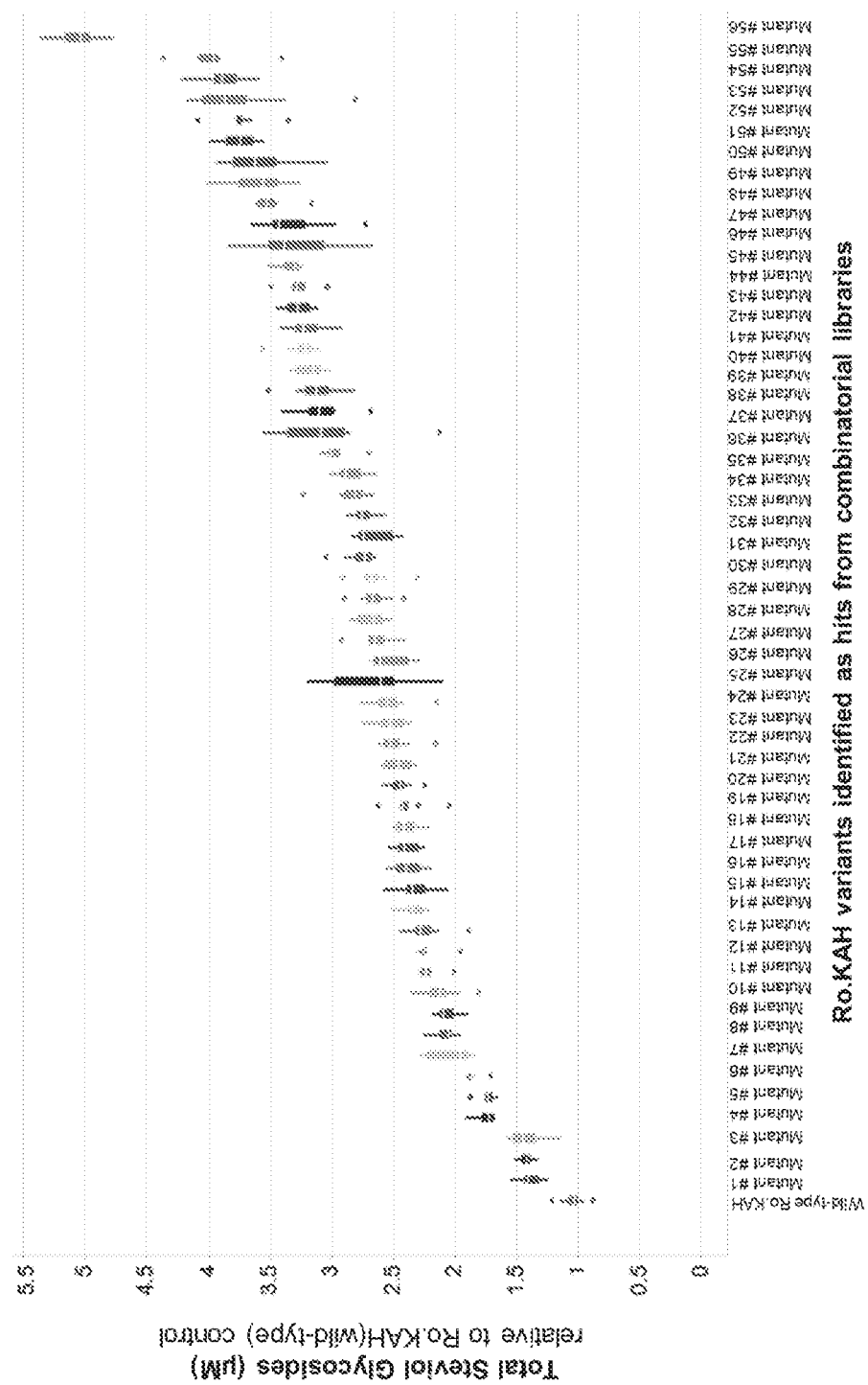
FIG. 5 is a graph of total steviol glycosides (measured in µM) in whole cell broth of Reb M producing yeast containing mutants of Ro.KAH generated in combinatorial libraries relative to wild-type Ro.KAH-containing yeast (also shown). Yeast strains with different overexpressed KAH genes were grown in microtiter plates.

The Tier 1 combinatorial library DNA was screened in the Reb M producing yeast at a 0.9× coverage. The effect of particular mutation combinations was calculated by comparing TSG produced by a strain containing multiple mutant amino acids to TSG produced by a strain containing the wild-type Ro.KAH protein as described above (Example 8). The 56 highest performing KAH alleles identified from the combinatorial library screen were promoted to Tier 2 confirmation at N=8 replication. Most of these variants produced at least 1.4-fold higher TSG comparing to wild-type Ro.KAH, with the top variant resulting in 5.02-fold improved production (FIG. 5 and Table 10). Interestingly, most of the improved variants contained only two or three mutations per variant, only five variants contained four mutations, and there were no improved variants identified that contained more than four mutations (Table 10). The best combination of amino acid substitutions comprised only two mutations: F332L and S452D.

TABLE 10

Improved alleles of Ro.KAH, fold improvement in TSG over wild-type Ro.KAH activity, and the associated amino acid changes.

| Ro.KAH allele | Fold improvement over wild-type Ro.KAH | Genotype of the mutant |
|---|---|---|
| wild-type Ro.KAH | 1.00 | |
| mutant #1 | 1.40 | L232Y/S339A |
| mutant #2 | 1.42 | A297Y/L485F |
| mutant #3 | 1.44 | S339A/V340A/L485F |
| mutant #4 | 1.72 | K291C/V340A |
| mutant #5 | 1.73 | K291C/V340A/L485F |
| mutant #6 | 1.86 | I284G/K291C/S339A/V340A |
| mutant #7 | 1.95 | I284S/K291C/V340A/S452D |
| mutant #8 | 2.04 | K291C/S339A/V340A/S452D |
| mutant #9 | 2.09 | L54G/F88R/K224I |
| mutant #10 | 2.12 | F332L/S339A/S452D |
| mutant #11 | 2.23 | I284G/A297Y |
| mutant #12 | 2.25 | I284G/S339A/V340A |
| mutant #13 | 2.27 | F332L/S452D/L485F |
| mutant #14 | 2.34 | F88R/T216A |
| mutant #15 | 2.34 | K291C/S339A |
| mutant #16 | 2.40 | L54G/T216A |
| mutant #17 | 2.41 | Y55P/F88R |
| mutant #18 | 2.41 | I104A/K119S/T162A/K224I |
| mutant #19 | 2.42 | L54G/F88R/T123D/T162A |
| mutant #20 | 2.44 | I284G/K291C/V340A |
| mutant #21 | 2.46 | L54G/K119S/T123D |
| mutant #22 | 2.52 | I104A/M171F/T216A |
| mutant #23 | 2.52 | L54G/K224I |
| mutant #24 | 2.54 | F332L/S339A/V340A |
| mutant #25 | 2.59 | I284G/K291C/S339A |
| mutant #26 | 2.61 | F88R/M171F |
| mutant #27 | 2.65 | S452D/L485F |
| mutant #28 | 2.65 | I284G/V340A |
| mutant #29 | 2.66 | L54G/Y55P/T162A |
| mutant #30 | 2.67 | P161D/T162A |
| mutant #31 | 2.73 | L54G/Y55P/T123D |
| mutant #32 | 2.74 | Y55P/F88R/K119S |
| mutant #33 | 2.75 | S339A/V340A |
| mutant #34 | 2.81 | I284G/K291C/F332L |
| mutant #35 | 2.89 | K119S/T123D/T216A |
| mutant #36 | 3.00 | I104A/T162A/K224I |
| mutant #37 | 3.09 | I104A/K119S/M171F |
| mutant #38 | 3.10 | T216A/K224I |
| mutant #39 | 3.12 | F229Y/K291C |
| mutant #40 | 3.15 | M171F/T216A |
| mutant #41 | 3.21 | I104A/K119S |
| mutant #42 | 3.23 | Y55P/T123D |
| mutant #43 | 3.27 | I104A/T162A/M171F |
| mutant #44 | 3.28 | K291C/F332L/V340A |
| mutant #45 | 3.29 | T123D/T162A/K224I |
| mutant #46 | 3.38 | F332L/V340A |
| mutant #47 | 3.43 | L54G/T123D |
| mutant #48 | 3.52 | K119S/T216A |
| mutant #49 | 3.55 | T162A/K224I |
| mutant #50 | 3.62 | I284G/K291C/S452D |
| mutant #51 | 3.73 | K119S/M171F |
| mutant #52 | 3.77 | T123D/T162A/T216A |
| mutant #53 | 3.86 | L54G/F88R/T123D |
| mutant #54 | 3.89 | K291C/S452D |
| mutant #55 | 3.96 | T123D/T216A |
| mutant #56 | 5.02 | F332L/S452D |

Example 10

Identification of Undesirable Impurity C20H32O4+1Glc Derived from Side-Product of Ro.KAH Activity on Kaurenoic Acid Samples derived from yeast expressing Ro.KAH were analyzed for production of additional metabolites that are not part of the Reb M pathway depicted in FIG. 1 using UHPLC equipped with tandem CAD and Orbitrap-MS detectors (see Example 6 for analysis details). A comparison of CAD chromatograms of strains expressing either Ro.KAH, Sr.KAH, Rs.KAH, or no KAH identified one peak that is specific to Ro.KAH (FIG. 6B). Further inspection of the high-resolution ion mass and MS/MS fragmentation pattern established that this peak of interest has a molecular formula C26H42O9 consistent with singly glycosylated kaurenoic acid+oxygen+water (FIGS. 6C and 6D). A small peak with the same retention time in CAD chromatogram is also detectable for Rs.KAH-expressing Reb M producer, however the abundance is too low for MS characterization.

Figure 6A:
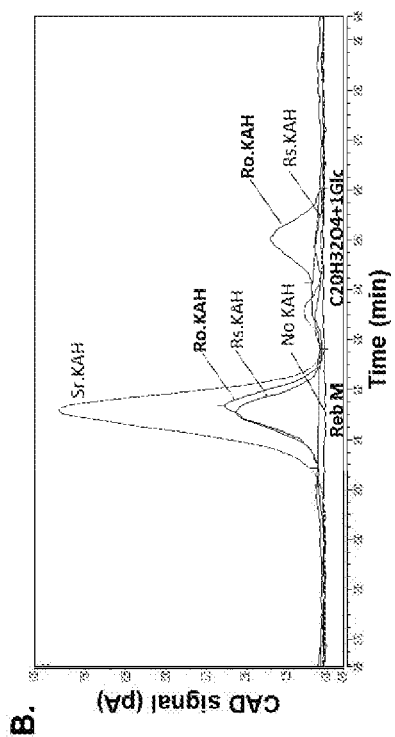
FIG. 6A-6D depicts the proposed structure of the impurity C20H32O4+1Glc derived from a side-product of Ro.KAH activity on kaurenoic acid (FIG. 6A) and experimental evidence supporting impurity identification (FIG. 6B-6D).
Figure 6B:
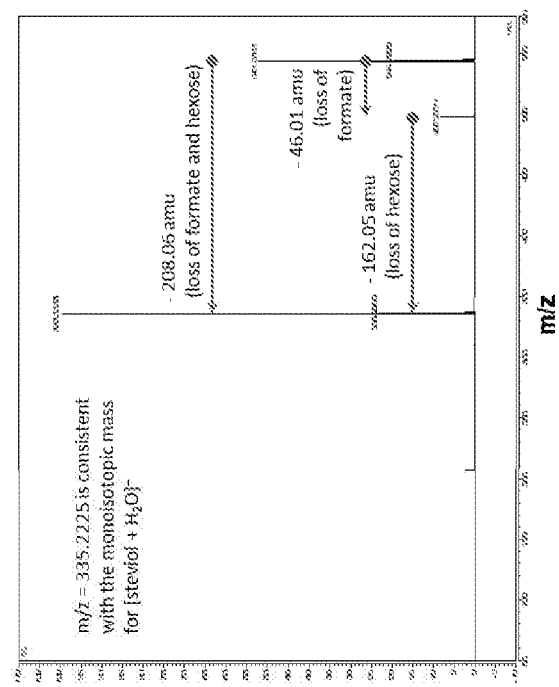
Figure 6C:
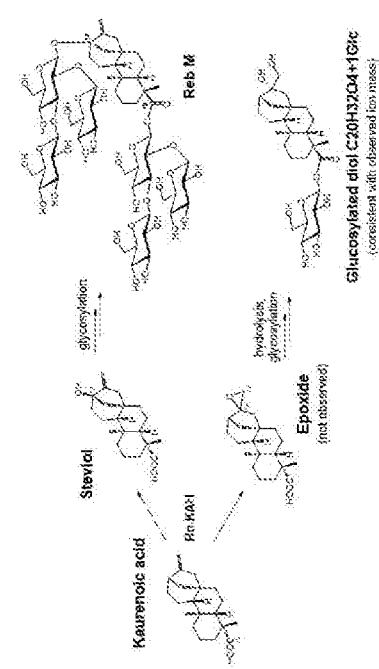
Figure 6D:
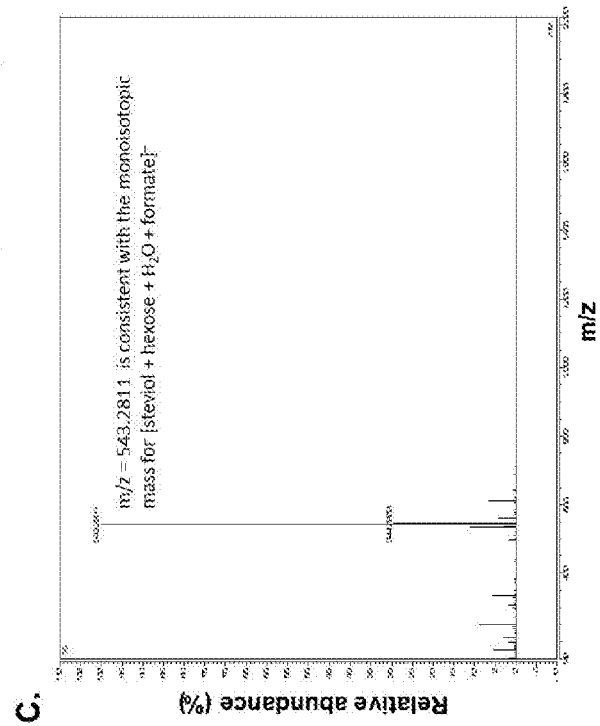

Based on the known scope of reactivity of the cytochrome P450 superfamily, it appears that Ro.KAH can convert kaurenoic acid to either of two products, steviol or an epoxide (FIG. 6A). The epoxide can then spontaneously hydrolyze to diol and be glycosylated at the carboxylate site (C19) by one of the glycosyltransferases of the Reb M pathway to generate a glucosylated diol product consistent with the ion mass detected for the new peak. Although stereocenters already present in the kaurenoic acid core are likely preserved in this diol named C20H32O4+1Glc, the stereochemistry at C16 cannot be determined using the methods used in this study.

C20H32O4+1Glc (the structure as depicted in FIG. 6A) with defined S configuration at C16 has been previously isolated from several plants. Most notably it has been identified as a tasteless minor component of sweet leaves of *R. suavissimus*, the source of Rs.KAH (Ohtani et al., *Phytochemistry* 31(5), 1992, pp. 1553-1559) and named suavioside E. *Stevia phlebophylla* A. Gray, a rare Mexican species, appears to produce the same compound (Ceunen et al., *Carbohydrate Research* 379, 2013, pp. 1-6) as well as several Chinese medicinal plant species of genera *Aster* (Cheng et al., *Phytochemistry* 33(5), 1993, pp. 1181-1183; Tan et al., *Journal of Natural Products* 56(11), 1993, pp. 1917-1922; Tan et al., *Magnetic Resonance in Chemistry* 33(9), 1995, pp. 749-754) and several species of African plants of genera *Cussonia* (Harinantenaina et al., *Chemical & Pharmaceutical Bulletin* 50(2), 2002, pp. 268-271; Harinantenaina et al., *Chemical & Pharmaceutical Bulletin* 50(8), 2002, pp. 1122-1123; Harinantenaina et al., *Phytochemistry* 61(4), 2002, pp. 367-372).

C20H32O4+1Glc (the structure as depicted in FIG. 6A) with defined R configuration at C16, often referred to as paniculoside IV, has also been isolated from a number of different plants including but not limited to Cussonia species (Harinantenaina et al., *Chemical & Pharmaceutical Bulletin* 50(2), 2002, pp. 268-271; Harinantenaina et al., *Chemical & Pharmaceutical Bulletin* 50(8), 2002, pp. 1122-1123; Harinantenaina et al., *Phytochemistry* 61(4), 2002, pp. 367-372), *Pulicaria* species (Darwish et al., *Alexandria Journal of Pharmaceutical Sciences* 15(1), 2001, pp. 21-24; Rasool et al., *Natural Product Communications* 3(2), 2008, pp. 141-144; Rasool et al., *Natural Product Communications* 8(6), 2013, pp. 757-759), *Acanthopanax koreanum* (Cai et al., *Archives of Pharmacal Research* 26(9), 2003, pp. 731-734; Cai et al., *Phytotherapy Research* 18(8), 2004, pp. 677-680) and several others.

The reports of prior isolation and characterization of the plant-derived natural products described above provide support for the proposed structure for C20H32O4+1Glc shown in FIG. 6A, but do not definitively confirm it. Nevertheless, the production of C20H32O4+1Glc only in the presence of Ro.KAH confirms the formation by this enzyme of a side product in addition to steviol. This necessitated the evolution of Ro.KAH enzyme variants with improved product specificity in addition to improved overall activity, i.e. increased formation of steviol with reduced absolute and relative amounts of the undesirable side product.

Example 11

Improvement of Ro.KAH A297Y Activity and Product Specificity Via Site-Directed Saturation Mutagenesis Targeting 46 Amino Acid Residues As described in Example 10, yeast expressing Ro.KAH produces not only Reb M and other minor steviol glycosides (as Reb M pathway intermediates) but also an undesirable side product C20H32O4+1Glc at the molar ratio of approximately 1 to 2 (C20H32O4+1Glc to Reb M). Thus, improvements in both activity and product specificity of Ro.KAH were targeted with the libraries described in the following examples.

To further improve activity and product specificity of Ro.KAH, another round of site-directed saturation mutagenesis was applied to one of the top SSM variants described in Example 8 (Ro.KAH A297Y). Each of 46 selected amino acids (F128, I129, I132, L136, L140, A141, T142, G143, L144, A145, N146, Y238, K241, I243, I273, I277, K328, L329, F330, Y331, F332, A333, G334, Q335, E336, T337, T338, A396, V397, I398, E399, L400, P401, P463, F464, G465, G466, G467, P468, R469, I470, I472, G473, Y506, I508, and T509) in the Ro.KAH A297Y sequence was mutated to 20 different amino acids (A, R, N, D, C, E, Q, G, H, I, L, K, M, F, P, S, T, W, Y, and V) that are encoded by the degenerate codon NNS where N stands for any nucleotide adenine, thymine, guanine and cytosine and S stands for guanine and cytosine. The NNS library of Ro.KAH A297Y gene variants was constructed via PCR using primers containing an NNS degenerate codon at the desired position as described in Example 8 and used to transform Reb M producing yeast that lack a functional KAH gene.

The in vivo KAH activity of the NNS library mutants was measured in a Tier 1 screen. The effect of a particular mutation (in addition to A297Y) was calculated by comparing Reb M titers produced by a mutant strain to Reb M produced by a strain containing the wild-type Ro.KAH protein. Because of the high efficiency of the downstream glycosyltransferases in the Reb M pathway, Reb M constitutes the majority of TSG while other steviol glycosides are present only in minute amounts. Using relative Reb M titer as a measure of KAH in vivo activity simplifies data analysis and produces the same ranking of the variants as relative TSG measurement. The in vivo KAH product specificity of the NNS library mutants was also measured in a Tier 1 screen relative to wild-type Ro.KAH using the peak area from an MS chromatogram for the side-product C20H32O4+1Glc and the titer of Reb M (µM). The fold change in product specificity was estimated by calculating the ratio of Reb M (µM) produced by the mutant relative to the wild-type Ro.KAH to the side-product C20H32O4+1Glc produced by the mutant relative to the wild-type Ro.KAH:

$$\text{specificity change} = \frac{[Reb\ M\ titer]_{mutant} / [Reb\ M\ titer]_{wild-type}}{[C20H32O4 + 1Glc\ \text{peak area}]_{mutant} / [C20H32O4 + 1Glc\ \text{peak area}]_{wild-type}}.$$

Thirty-nine isolates were screened per mutated position in the protein sequence giving approximately a 1.2× coverage at N=1 for each unique variant. Upon finding mutations in combination with Ro.KAH A297Y that appeared to increase activity and product specificity of the enzyme in vivo, a Tier 2 screen was performed with higher replication (N=8) of strains containing a specific mutant of interest to confirm the improvement, using calculations as described above. The resulting activity and product specificity of an NNS-derived mutant Ro.KAH allele is reported in fold improvement over wild-type Ro.KAH in FIG. 7 and Table 11.

TABLE 11

Improved alleles of Ro.KAH A297Y: the associated amino acid changes and fold improvement over wild-type Ro.KAH activity and product specificity.

| Ro.KAH sequence variations compared to Ro.KAH A297Y | Fold improvement in activity over wild-type Ro.KAH | Fold improvement in product specificity over wild-type Ro.KAH |
|---|---|---|
| wild-type Ro.KAH | 1.00 | 1.00 |
| Ro.KAH A297Y | 3.70 | 3.07 |
| N146P | 1.54 | 5.10 |
| N146E | 1.65 | 4.45 |
| A141F | 1.68 | 4.35 |
| A141L | 1.81 | 4.23 |
| G466M | 2.35 | 4.22 |
| A141I | 2.36 | 7.06 |
| T142C | 2.62 | 4.90 |
| N146D | 2.69 | 7.08 |
| T142R | 2.69 | 4.17 |
| T142V | 2.78 | 4.89 |
| N146Y | 3.06 | 5.97 |
| N146W | 3.46 | 12.97 |
| T142D | 3.46 | 5.37 |
| N146L | 3.85 | 8.68 |
| T142A | 3.86 | 6.06 |
| N146Q | 4.06 | 6.90 |
| T142G | 4.15 | 6.62 |
| T142S | 4.19 | 5.24 |
| A141V | 4.57 | 5.82 |
| N146M | 4.72 | 10.61 |
| N146S | 4.74 | 4.72 |
| N146V | 4.77 | 5.63 |
| N146T | 5.31 | 5.89 |

Twenty-three mutations in combination with A297Y were identified that lead to improvements over wild-type Ro.KAH in both activity and product specificity, with most of the improved variants arising from amino acid substitutions at the positions 141, 142, and 146. The best activity mutant from this site-directed saturation mutagenesis NNS library (N146T/A297Y) provides 5.2-fold improvement of in vivo KAH activity comparing to wild-type Ro.KAH. The best specificity mutant (N146W/A297Y) provides 12.97-fold improvement in KAH product specificity comparing to wild-type Ro.KAH. Interestingly, the highest improvements in both activity and specificity resulted from mutagenesis at the same position, N146, but from different amino acid substitutions (T and W, respectively).

Example 12

Improvement of Ro.KAH A297Y Activity and Product Specificity Via Combinatorial Site-Directed Saturation Mutagenesis To further improve activity and product specificity of Ro.KAH, combinatorial site-directed saturation mutagenesis was applied to one of the top SSM variants described in Example 8 (Ro.KAH A297Y). In this type of mutagenesis, also known as combinatorial active-site saturation test (CAST; Reetz et al., *Angewandte Chemie International Edition English* 44(27), 2005, pp. 4192-4196), two amino acid residues that are spatially close are mutated at the same time which allows for potential synergistic effects arising from side-chain orientation. Accordingly, ten libraries were created where two amino acid residues in Ro.KAH A297Y mutant were mutated at the same time: F128 and F129, L144 and A145, A145 and N146, K328 and F332, F330 and G334, F332 and T337, A396 and V397, V397 and I398, R507 and I508, I508 and T509. Each amino acid residue was mutated to 12 different amino acids (R, N, D, C, G, H, I, L, F, S, Y, and V) that are encoded by the degenerate codon NDT where N stands for any nucleotide adenine, thymine, guanine, and cytosine, D stands for adenine, guanine, and thymine; T stands for thymine. The NDT library of Ro.KAH A297Y gene variants was constructed via PCR using primers containing an NDT degenerate codon at the desired position as described in Example 8 and used to transform Reb M producing yeast that lack a functional KAH gene.

The changes in the in vivo KAH activity and product specificity of the mutants were measured as described in Example 11. Thirty-nine isolates were screened per mutated position in the protein sequence giving approximately a 2× coverage at N=1 for each unique variant in Tier 1. Upon finding mutations in combination with Ro.KAH A297Y that appeared to increase activity and product specificity of the enzyme in vivo, a Tier 2 screen was performed with higher replication (N=8) of strains containing a specific mutant of interest to confirm the improvement. The resulting activity and product specificity of a mutant Ro.KAH allele is reported in fold increase over wild-type Ro.KAH in FIG. 8. Table 12 lists a subset of library hits depicted in FIG. 8, specifically those with two (not just one) amino acid changes simultaneously introduced into Ro.KAH A297Y.

TABLE 12

Improved alleles of Ro.KAH A297Y: the associated amino acid changes and fold improvement over wild-type Ro.KAH activity and product specificity.

| Ro.KAH sequence variations compared to Ro.KAH A297Y | Fold improvement in activity over wild-type Ro.KAH | Fold improvement in product specificity over wild-type Ro.KAH |
| --- | --- | --- |
| wild-type Ro.KAH | 1.00 | 1.00 |
| Ro.KAH A297Y | 3.70 | 3.07 |
| F128V/I129G | 0.86 | 2.30 |

TABLE 12-continued

Improved alleles of Ro.KAH A297Y: the associated amino acid changes and fold improvement over wild-type Ro.KAH activity and product specificity.

| Ro.KAH sequence variations compared to Ro.KAH A297Y | Fold improvement in activity over wild-type Ro.KAH | Fold improvement in product specificity over wild-type Ro.KAH |
| --- | --- | --- |
| A145G/N146L | 0.96 | 4.89 |
| F128C/I129V | 1.10 | 3.30 |
| A145S/N146I | 1.21 | 4.86 |
| F128V/I129C | 1.22 | 2.83 |
| F128L/I129V | 1.26 | 3.53 |
| I508V/T509V | 1.29 | 4.17 |
| F128V/I129V | 1.32 | 2.69 |
| F128Y/I129C | 1.43 | 3.56 |
| F128V/I129R | 1.51 | 2.37 |
| V397I/I398V | 1.52 | 1.75 |
| A145G/N146V | 1.60 | 4.38 |
| V397D/I398V | 1.77 | 2.84 |
| A145S/N146V | 1.81 | 4.39 |
| A145G/N146F | 2.09 | 9.60 |
| A145G/N146S | 2.16 | 4.46 |
| F129Y/I129R | 2.41 | 3.23 |
| F128Y/I129V | 2.61 | 3.57 |
| R507N/I508V | 3.06 | 4.36 |
| R507C/I508V | 3.20 | 4.44 |

A number of variants with product specificity improvements relative to wild-type Ro.KAH were identified from this combinatorial library, with the variant A145G/N146F/A297Y resulting in 9.6-fold specificity improvement relative to wild-type Ro.KAH. Improvements in specificity came at a cost of sacrificing overall activity: none of the variants with two amino acid changes relative to parent Ro.KAH A297Y and only a handful with a single amino acid change had better activity than parent enzyme. This is not surprising when more than one amino acid residue is mutated simultaneously.

Example 13

Evolution of Ro.KAH N146T/A297Y Via Full Site-Directed Saturation Mutagenesis

To further improve the activity of Ro.KAH N146T/A297Y (top activity variant, Example 11) another round of site-directed saturation mutagenesis was applied to isolate mutant variants with even higher activity in converting kaurenoic acid to steviol (FIG. 1). Each amino acid residue in Ro.KAH N146T/A297Y sequence was mutated to 15 different amino acids (A, C, D, F, G, H, I, L, N, P, R, S [encoded by two codons], T, V, and Y) that are encoded by the degenerate codon NNT where N stands for any nucleotide adenine, thymine, guanine, and cytosine and T stands for thymine. The NNT library of Ro.KAH N146T/A297Y was constructed via PCR using primers containing an NNT degenerate codon at the desired position as described in Example 8 and used to transform Reb M producing yeast that lack a functional KAH gene.

The relative in vivo KAH activity and product specificity of the Ro.KAH N146T/A297Y mutants were assessed as described in Example 11. Thirteen isolates were screened per mutated position in the protein sequence giving approximately a 0.8× coverage at N=1 for each unique variant in Tier 1. Upon finding mutations in Ro.KAH N146T/A297Y that appeared to increase activity of the enzyme in vivo, a Tier 2 screen was performed with higher replication (N=8) of strains containing a specific mutant of interest to confirm the improvement. Variants with improved activity confirmed in Tier 2 were subjected to Tier 3 validation, in which DNA sequences of the mutant variants were PCR-amplified from a Reb M-producing strains with improved performance using primers containing homology to the promoter and terminator sequences, and used to transform Reb M-producing yeast lacking a KAH gene. Tier 3 eliminates false-positives in Tier 1 and Tier 2 arising due to an unintended, randomly introduced, mutation elsewhere in yeast genome. The resulting activity and product specificity of the NNT-derived mutant Ro.KAH N146T/A297Y alleles are reported in fold increase over Ro.KAH N146T/A297Y in Table 13.

TABLE 13

Improved alleles of Ro.KAH N146T/A297Y: the associated amino acid changes and fold improvement over Ro.KAH N146T/A297Y activity and product specificity.

| Ro.KAH sequence variations compared to Ro.KAH N146T/A297Y | Fold improvement in activity over Ro.KAH N146T/A297Y | Fold improvement in product specificity over Ro.KAH N146T/A297Y |
|---|---|---|
| Ro.KAH N146T/A297Y | 1.00 | 1.00 |
| S505I | 1.18 | 1.04 |
| W52T | 1.21 | 0.97 |
| S457G | 1.23 | 1.06 |
| Q84R | 1.23 | 1.20 |
| G466A | 1.25 | 1.20 |

Five mutations were identified that lead to improvements in activity, ranging from 1.18 to 1.25-fold over Ro.KAH N146T/A297Y. Four of these resulted in modest specificity improvements as well, with the top two variants, Q84R/N146T/A297Y and N146T/A297Y/G466A, resulting in 1.2-fold specificity improvement.

Example 14

Evolution of Ro.KAH N146W/A297Y Via Full Site-Directed Saturation Mutagenesis

To further improve the activity of Ro.KAH N146W/A297Y (top specificity variant, Example 11) another round of site-directed saturation mutagenesis was applied to isolate mutant variants with even higher activity in converting kaurenoic acid to steviol (FIG. 1). Each amino acid residue in Ro.KAH N146W/A297Y sequence was mutated to 15 different amino acids encoded by the degenerate codon NNT as described in Example 13 and resulting mutants were tested in the Reb M producing yeast that lack a functional KAH gene.

The relative in vivo KAH activity and product specificity of the Ro.KAH N146T/A297Y mutants were assessed as described in Example 11. Library coverage and tiered screening were performed as described in Example 13. The resulting activity and product specificity of an NNT-derived mutant Ro.KAH N146W/A297Y alleles are reported in fold increase over Ro.KAH N146W/A297Y in FIG. 9 and Table 14.

TABLE 14

Improved alleles of Ro.KAH N146W/A297Y: the associated amino acid changes and fold improvement over Ro.KAH N146W/A297Y activity and product specificity.

| Ro.KAH sequence variations compared to Ro.KAH N146W/A297Y | Fold improvement in activity. over Ro.KAH N146W/A297Y | Fold improvement in product specificity over Ro.KAH N146W/A297V |
|---|---|---|
| Ro.KAH N146W/A297Y | 1.00 | 1.00 |
| A236S | 1.30 | 1.21 |
| V9S | 1.33 | 1.26 |
| G466F | 1.33 | 1.36 |
| T283D | 1.36 | 1.30 |
| T142G | 1.39 | 1.34 |
| T425V | 1.42 | 1.35 |
| L459C | 1.42 | 1.35 |
| T283A | 1.46 | 1.24 |
| T283D | 1.49 | 1.38 |
| S460V | 1.50 | 1.42 |
| S133G | 1.51 | 1.57 |
| I129V | 1.60 | 1.33 |
| W52G | 1.60 | 1.46 |
| S505I | 1.62 | 1.51 |
| I243T | 1.64 | 1.21 |
| V340S | 1.73 | 1.59 |
| S460C | 1.77 | 1.51 |
| S452D | 1.79 | 1.70 |
| L118I | 1.82 | 1.53 |
| S505V | 1.85 | 1.65 |
| T123D | 1.91 | 1.73 |
| W52C | 1.92 | 1.57 |
| S460I | 1.95 | 1.77 |
| S457G | 2.01 | 1.71 |
| W52R | 2.10 | 1.69 |
| W52N | 2.19 | 1.66 |

Twenty-six mutations were identified that lead to improvements in activity, ranging from 1.3 to 2.2-fold over Ro.KAH N146W/A297Y. The same twenty-six mutations also resulted in specificity improvements over Ro.KAH N146W/A297Y, with the top variant, Ro.KAH N146W/A297Y/S460I, resulting in 1.8-fold specificity improvement.

Example 15

Evolution of Ro.KAH N146T/A297Y/G466A Via Site-Directed Saturation Mutagenesis and Mutations Consolidation In attempts to further improve the activity of the top mutant variant with highest KAH activity, Ro.KAH N146T/A297Y/G466A (Example 13, Table 13), was subjected to yet another round of site-directed saturation mutagenesis targeting 68 amino acids many of which were shown to improve activity in the earlier Examples (W52, Q84, T123, I129, T142, T216, I265, K267, T283, F332, V340, S452, S457, S460, S505): W52, Q84, T123, 1129, T142, R170, M171, L172, P173, S174, F175, H176, Q177, S178, C179, T180, T216, 1265, N266, K267, E268, I269, K270, G271, L272, I273, I277, I278, K279, R280, E281, H282, T283, I284, K285, A286, G287, E288, F332, V340, Q409, L410, G411, K412, F413, S414, L415, P416, E417, G418, V419, E420, V421, R422, L423, P424, T425, L426, L427, I428, H429, H430, D431, K432, S452, S457, S460, S505). Each of these 68 amino acids in Ro.KAH N146T/A297Y/G466A sequence was mutated to 15 different amino acids encoded by the degenerate codon NNT as described in Example 13 and resulting mutants were tested in the Reb M producing yeast that lack a functional KAH gene. The relative in vivo KAH activity and product specificity of the Ro.KAH N146T/A297Y mutants were assessed as described in Example 11. Library coverage and tiered screening was as described in Example 13.

Very few hits were identified in this screen and even these had only modest activity improvements. Thus, the new top activity hit Ro.KAH T142G/N146T/A297Y/G466A produced less than 10% more Reb M than the library parent, Ro.KAH N146T/A297Y/G466A (Table 15). Interestingly, Ro.KAH T142G/N146T/A297Y/G466A variant also had the best product specificity in this set: 1.7-fold improved over library parent. The specific mutation T142G had also been identified as beneficial for both activity and product specificity in the earlier rounds of engineering yielding activity improvements that diminished with each subsequent round of engineering: over 4-fold in Ro.KAH A297Y (Example 11, Table 11) and of 40% in Ro.KAH N146W/A297Y (Example 14, Table 14).

To explore if mutation T142G is beneficial in other backgrounds, it was tested in combination with other top beneficial mutations, W52T and G466A. Briefly, gene sequences for the variants Ro.KAH W52T/T142G/N146T/A297Y and Ro.KAH W52T/T142G/N146T/A297Y/G466A were assembled from a mixture of PCR-amplified fragments containing desired mutations. Each fragment contained overlapping homology on the ends of each piece so that the pieces overlapped in sequence; assembling all the pieces together in vitro using PCR reconstituted a full length KAH allele. The terminal 5' and 3' pieces also had homology to the promoter and terminator of the landing pad sequence. The assembled full-length genes were transformed into the Reb M producing yeast that lack a functional KAH gene and their relative in vivo KAH activity and product specificity were assessed as described in Example 11. The resulting activity and product specificity of the Ro.KAH variants are reported in fold increase over Ro.KAH N146T/A297Y/G466A in Table 15.

TABLE 15

Improved alleles of Ro.KAH N146T/A297Y: the associated amino acid changes and fold improvement over Ro.KAH N146T/A297Y/G466A activity and product specificity.

| Ro.KAH sequence variations compared to Ro.KAH N146T/A297Y | Fold improvement in activity over Ro.KAH N146T/A297Y/G466A | Fold improvement in product specificity over Ro.KAH N146T/A297Y/G466A |
| --- | --- | --- |
| G466A | 1.00 | 1.00 |
| W52T | 1.04 | 0.86 |
| T142G/G466A | 1.08 | 1.71 |
| W52T/T142G | 0.88 | 1.17 |
| W52T/T142G/G466A | 1.12 | 1.45 |

No dramatic improvements over the triple mutant Ro.KAH N146T/A297Y/G466A were detected for the new quadruple and quintuple mutants of Ro.KAH. With returns diminishing with each subsequent round of engineering, a local minimum may have been reached. Interestingly, incorporating only the T142G mutation into the Ro.KAH W52T/N146T/A297Y sequence led to reduction in activity but improvement in product specificity, whereas incorporating T142G and G466A improved both activity and specificity (Table 15).

Example 16

N-Terminal Domain Swaps to Improve In Vivo Activity of Ro.KAH Variants

This example provides modified kaurenoic acid hydroxylase polypeptides with substituted N-terminal domains that show improved activity.

Kaurenoic acid hydroxylase is a cytochrome P450 enzyme. Most eukaryotic P450s are membrane-bound proteins, and the high-level domain structure of membrane-associated cytochrome P450 enzymes is highly conserved. Plant cytochrome P450 enzymes are incorporated into the endoplasmic reticulum (ER) with an N-terminal polypeptide chain of roughly 30-50 amino acids that mediates membrane targeting. The catalytic domain of the P450 enzymes face the cytoplasmic side of the endoplasmic reticulum. It was demonstrated that swapping the ER-associated N-terminus of Sr.KAH with other N-terminal transmembrane domains, for example that of cytochrome P450 reductase (CPR) from *Artemisia annua* (Aa.CPR), results in improved KAH enzymatic activity. See PCT/US2019/056153. A similar approach was tested for Ro.KAH variants as described below.

The transmembrane domain in Ro.KAH was predicted using a TMHMM server (available at http://www.cbs.dtu dk/services/TMHMM/). It was then replaced with the first 66 amino acids of Aa.CPR (SEQ ID NO: 22). Truncations of different lengths (removing from 23 to 50 amino acids from the N-terminus of Ro.KAH) were explored while the sequence of Aa.CPR fused to the N-terminus of these truncations remained constant. Gene sequences for the chimeric proteins were assembled from a mixture of PCR-amplified fragments of Aa.CPR and Ro.KAH variants containing overlapping homology and were transformed into the Reb M producing yeast that lack a functional KAH gene. The in vivo KAH activity of chimeric proteins was assessed as described in Example 11 and is reported in Table 16 as fold increase in Reb M titers over the corresponding Ro.KAH variant without any domain swap. It was established that truncating the first 25 amino acids of Ro.KAH resulted in the highest activity of N-terminal fusion for each of the variants tested; thus only the data for these chimeras are shown in Table 16.

TABLE 16

Alleles of Aa.CPR-Ro.KAH fusions resulting from N-terminal domain swaps and fold improvement in Reb M titers over Ro.KAH parent sequence without domain swap.

| Ro.KAH allele Aa.CPR (1a:66a)-Ro.KAH variant(26a:523a) | SEQ ID NO | Fold improvement in activity over Ro.KAH variant (1a-523a) |
| --- | --- | --- |
| N146T/A297Y/G466A | 17 | 1.09 |
| W52T/N146T/A297Y | 18 | 1.17 |
| T142G/N146T/A297Y/G466A | 19 | 1.08 |
| W52T/T142G/N146T/A297Y | 20 | 1.11 |
| W52T/T142G/N146T/A297Y/G466A | 21 | 1.15 |

For all the Ro.KAH mutants tested, N-terminal domain swaps with Aa.CPR resulted in Ro.KAH variants with 10-17% improvements in KAH activity. The product profile (relative titers of Reb M and C20H32O4+1Glc) of chimeric proteins was unchanged with N-terminal domain swap (data not shown). This is expected, as partitioning to the side product is likely determined by amino acids of the catalytic domain of P450 and not by the membrane-targeting domain. Although modest, the increase in KAH activity resulting from N-terminal domain swap appears to be additive with the activity improvements resulting from point mutations within Ro.KAH sequence providing yet another lever for activity improvement.

All publications, patents and patent applications cited in this specification are herein incorporated by reference as if each individual publication or patent application were specifically and individually indicated to be incorporated by reference. Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

---

SEQUENCE APPENDIX

```
SEQ ID NO:1; Ro.KAH amino acid sequence
MEVTVGSWVALSLVFVSIIVGWAWSVLDWVWLKPKKLERCLREQGLKGNSYWFLYGDMKENSILLK
QAKSKPMNLSTSHDIAPQVIPFVDQTVKVYGKNSFDWIGPIPRVNIMNPEELKDVFTKYDDFIKPISNPL
FKLLATGLANYEGEKWAKHRRIINPTFHSEKLKRMLPSFHQSCTEMIKEWESLVSKEGSSCELDVWP
FLENMTADVISRTAFGTSYKKGRKIFELLREQAIYATKAIQSFYIPGWRFLPTKMNKRMKEINKEIKGLIK
GIIIKREHTIKAGEETKDDLLGALMESNLKDIREHGKNNKNFGMSIEDVIEECKLFYFAGQETTSVLLVW
TMVLLGQNQNWQDRARQEILQVFGSNKPDFDGLTHLKVVTMILLEVLRLYPAVIELPRTIHKKTQLGK
FSLPEGVEVRLPTLLIHHDKELWGDDANEFKPERFSEGVSKATKSRLSFFPFGGGPRICIGQNFAMM
EAKLALVLILQHFTFELSPSYAHAPSYRITLQPQYGVPIILHRR SEQ ID NO:2; Ro.KAH encoding nucleic acid sequence
ATGGAAGTAACCGTTGGATCTTGGGTAGCTTTGTCCTTAGTCTTCGTTTCTATTATCGTCGGTTGG
GCTTGGTCCGTTTTAGATTGGGTCTGGTTGAAACCAAAGAAGTTAGAAAGATGTTTGAGAGAACA
AGGTTTAAAGGGTAACTCTTACTGGTTCTTGTATGGTGACATGAAAGAGAACTCTATTTTGTTGAA
GCAAGCTAAGTCTAAGCCAATGAACTTATCTACCTCTCACGACATCGCCCCACAAGTTATTCCATT
TGTCGACCAAACTGTCAAGGTCTACGGTAAGAACTCTTTCGATTGGATCGGTCCTATTCCAAGAG
TCAATATCATGAACCCAGAAGAATTGAAGGATGTTTTCACCAAGTACGATGACTTCATCAAGCCAA
TTTCTAACCCTTTGTTCAAGTTGTTGGCTACCGGTTTGGCTAATTACGAAGGTGAGAAGTGGGCT
AAGCACAGACGTATTATCAACCCAACTTTCCATTCTGAGAAGTTGAAAAGAATGTTGCCATCCTTC
CACCAATCTTGTACTGAAATGATCAAGGAATGGGAATCTTTGGTTTCTAAGGAAGGTTCTTCTTGT
GAGTTAGACGTCTGGCCATTCTTAGAAAACATGACCGCTGACGTTATTTCTAGAACTGCTTTCGG
TACTTCTTACAAGAAGGGTAGAAAGATTTTCGAATTGTTGAGAGAACAAGCTATTTACGCCACCAA
GGCTATCCAATCTTTTTACATTCCAGGTTGGCGTTTTTGCCTACTAAAATGAACAAGAGAATGAA
GGAAATCAACAAGGAGATCAAGGGTTTGATTAAGGGTATCATCATCAAAAGAGAACACACTATCA
AGGCTGGTGAAGAAACTAAGGATGACTTGTTAGGTGCTTTGATGGAATCTAACTTGAAGGACATT
AGAGAACACGGTAAGAACAACAAGAACTTCGGTATGTCTATCGAAGACGTTATCGAAGAGTGTAA
GTTGTTCTACTTTGCTGGTCAAGAAACTACTTCTGTTTTGTTAGTTTGGACCATGGTTTTGTTGGG
TCAAAATCAAAACTGGCAAGATAGAGCTAGACAAGAAATCTTGCAAGTTTTTGGTTCTAATAAGCC
AGACTTCGATGGTTTGACTCACTTGAAAGTTGTCACCATGATTTTATTGGAAGTCTTGAGATTGTA
CCCAGCTGTTATCGAATTGCCAAGAACCATTCACAAGAAGACTCAATTGGGTAAATTCTCTTTACC
TGAAGGTGTTGAAGTTAGATTGCCAACTTTGTTAATCCACCATGATAAGGAATTGTGGGGTGATG
ACGCTAACGAATTCAAGCCAGAACGTTTCTCTGAAGGTGTTTCTAAGGCTACCAAATCCAGATTG
TCCTTTTTTCCTTTCGGTGGTGGTCCTAGAATCTGTATTGGTCAAAACTTTGCTATGATGGAAGCT
AAATTGGCTTTGGTTTTGATTTTGCAACACTTCACTTTCGAATTGTCCCCTTCCTACGCCCATGCT
CCATCCTACAGAATTACCTTACAACCTCAATATGGTGTCCCTATTATCTTGCACCGTCGTTAG SEQ ID NO: 3; Rs.KAH
MEVTVASSVALSLVFISIVVRWAWSVVNWVWFKPKKLERFLREQGLKGNSYRFLYGDMKENSILLKQ
ARSKPMNLSTSHDIAPQVTPFVDQTVKAYGKNSFNVVVGPIPRVNIMNPEDLKDVLTKNVDFVKPISNP
LIKLLATGIAIYEGEKWTKHRRIINPTFHSERLKRMLPSFHQSCNEMVKEWESLVSKEGSSCELDVWP
FLENMSADVISRTAFGTSYKKGQKIFELLREQVIYVTKGFQSFYIPGWRFLPTKMNKRMNEINEEIKGLI
RGIIIDREQIIKAGEETNDDLLGALMESNLKDIREHGKNNKNVGMSIEDVIQECKLFYFAGQETTSVLLA
WTMVLLGQNQNWQDRARQEVLQVFGSSKPDFDGLAHLKVVTMILLEVLRLYPPVIELRIRTIHKKTQLG
KLSLPEGVEVRLPTLLIHHDKELWGDDANQFNPERFSEGVSKATKNRLSFFPFGAGPRICIGQNFSM
MEAKLALALILQHFTFELSPSHAHAPSHRITLQPQYGVRIILHRR SEQ ID NO: 4; At.KAH
MESLVVHTVNAIWCIVIVGIFSVGYHVYGRAVVEQWRMRRSLKLQGVKGPPPSIFNGNVSEMQRIQS
EAKHCSGDNIISHDYSSSLFPHFDHWRKQYGRIYTYSTGLKQHLYINHPEMVKELSQTNTLNLGRITHI
TKRLNPILGNGIITSNGPHWAHQRRIIAYEFTHDKIKGMVGLMVESAMPMLNKWEEMVKRGGEMGCD
IRVDEDLKDVSADVIAKACFGSSFSKGKAIFSMIRDLLTAITKRSVLFRFNGFTDMVFGSKKHGDVDIDA
LEMELESSIWETVKEREIECKDTHKKDLMQLILEGAMRSCDGNLVVDKSAYRRFWDNCKSIYFAGHD
STAVSVSWCLMLLALNPSWQVKIRDEILSSCKNGIPDAESIPNLKTVTMVIQETMRLYPPAPIVGREAS
KDIRLGDLVVPKGVCIWTLIPALHRDPEIWGPDANDFKPERFSEGISKACKYPQSYIPFGLGPRTCVGK
NFGMMEVKVLVSLIVSKFSFTLSPTYQHSPSHKLLVEPQHGVVIRVV SEQ ID NO: 5; Sr.KAH (wild-type Stevia rebaudiana kaurenoic acid hydroxylase)
MEASYLYISILLLLASYLFTTQLRRKSANLPPTVFPSIPIIGHLYLLKKPLYRTLAKIAAKYGPILQLQLGYR
RVLVISSPSAAEECFTNNDVIFANRPKTLFGKIVGGTSLGSLSYGDQWRNLRRVASIEILSVHRLNEFH
DIRVDENRLLIRKLRSSSSPVTLITVFYALTLNVIMRMISGKRYFDSGDRELEEEGKRFREILDETLLLAG
ASNVGDYLPILNWLGVKSLEKKLIALQKKRDDFFQGLIEQVRKSRGAKVGKGRKTMIELLLSLQESEPE
YYTDAMIRSFVLGLLAAGSDTSAGTMEWAMSLLVNHPHVLKKAQAEIDRVIGNNRLIDESDIGNIPYIG
CIINETLRLYPAGPLLFPHESSADCVISGYNIPRGTMLIVNQWAIHHDPKVWDDPETFKPERFQGLEGT
RDGFKLMPFGSGRRGCPGEGLAIRLLGMTLGSVIQCFDWERVGDEMVDMTEGLGVTLPKAVPLVAK
CKPRSEMTNLLSEL
```

SEQUENCE APPENDIX

SEQ ID NO: 6; Sr.KO
MDAVTGLLTVPATAITIGGTAVALAVALIFWYLKSYTSARRSQSNHLPRVPEVPGVPLLGNLLQLKEKK
PYMTFTRWAATYGPIYSIKTGATSMVVVSSNEIAKEALVTRFQSISTRNLSKALKVLTADKTMVAMSDY
DDYNKTVKRHILTAVLGPNAQKKHRIHRDIMMDNISTQLHEFVKNNPEQEEVDLRKIFQSELFGLAMR
QALGKDVESLYVEDLKITMNRDEIFQVLVVDPMMGAIDVDWRDFFPYLKWVPNKKFENTIQQMYIRR
EAVMKSLIKEHKKRIASGEKLNSYIDYLLSEAQTLTDQQLLMSLVVEPIIESSDTTMVTTEWAMYELAKN
PKLQDRLYRDIKSVCGSEKITEEHLSQLPYITAIFHETLRRHSPVPIIPLRHVHEDTVLGGYHVPAGTEL
AVNIYGCNMDKNVWENPEEWNPERFMKENETIDFQKTMAFGGGKRVCAGSLQALLTASIGIGRMVQ
EFEWKLKDMTQEEVNTIGLTTQMLRPLRAIIKPRI

SEQ ID NO: 7; Bt.GGPPS
MLTSSKSIESFPKNVQPYGKHYQNGLEPVGKSQEDILLEPFHYLCSNPGKDVRTKMIEAFNAWLKVP
KDDLIVITRVIEMLHSASLLIDDVEDDSVLRRGVPAAHHIYGTPQTINCANYVYFLALKEIAKLNKPNMITI
YTDELINLHRGQGMELFWRDTLTCPTEKEFLDMVNDKTGGLLRLAVKLMQEASQSGTDYTGLVSKIGI
HFQVRDDYMNLQSKNYADNKGFCEDLTEGKFSFPIIHSIRSDPSNRQLLNILKQRSSSIELKQFALQLL
ENTNTFQYCRDFLRVLEKEAREEIKLLGGNIMLEKIMDVLSVNE

SEQ ID NO: 8; Ent-Os.CDPS
MEHARPPQGGDDDVAASTSELPYMIESIKSKLRAARNSLGETTVSAYDTAWIALVNRLDGGGERSPQ
FPEAIDWIARNQLPDGSWGDAGMFIVQDRLINTLGCVVALATWGVHEEQRARGLAYIQDNLWRLGED
DEEWMMVGFEITFPVLLEKAKNLGLDINYDDPALQDIYAKRQLKLAKIPREALHARPTTLLHSLEGMEN
LDWERLLQFKCPAGSLHSSPAASAYALSETGDKELLEYLETAINNFDGGAPCTYPVDNFDRLWSVDR
LRRLGISRYFTSEIEEYLEYAYRHLSPDGMSYGGLCPVKDIDDTAMAFRLLRLHGYNVSSSVFNHFEK
DGEYFCFAGQSSQSLTAMYNSYRASQIVFPGDDDGLEQLRAYCRAFLEERRATGNLRDKWVIANGL
PSEVEYALDFPWKASLPRVETRVYLEQYGASEDAWIGKGLYRMTLVNNDLYLEAAKADFTNFQRLSR
LEWLSLKRWYIRNNLQAHGVTEQSVLRAYFLAAANIFEPNRAAERLGWARTAILAEAIASHLRQYSAN
GAADGMTERLISGLASHDWDWRESNDSAARSLLYALDELIDLHAFGNASDSLREAWKQWLMSWTN
ESQGSTGGDTALLLVRTIEICSGRHGSAEQSLKNSEDYARLEQIASSMCSKLATKILAQNGGSMDNVE
GIDQEVDVEMKELIQRVYGSSSNDVSSVTRQTFLDVVKSFCYVAHCSPETIDGHISKVLFEDVN

SEQ ID NO: 9; Ent-Pg.KS
MKREQYTILNEKESMAEELILRIKRMFSEIENTQTSASAYDTAWVAMVPSLDSSQQPQFPQCLSWIID
NQLLDGSWGIPYLIIKDRLCHTLACVIALRKWNAGNQNVETGLRFLRENIEGIVHEDEYTPIGFQIIFPA
MLEEARGLGLELPYDLTPIKLMLTHREKIMKGKAIDHMHEYDSSLIYTVEGIHKIVDWNKVLKHQNKDG
SLFNSPSATACALMHTRKSNCLEYLSSMLQKLGNGVPSVYPINLYARISMIDRLQRLGLARHFRNEIIH
ALDDIYRYWMQRETSREGKSLTPDIVSTSIAFMLLRLHGYDVPADVFCCYDLHSIEQSGEAVTAMLSL
YRASQIMFPGETILEEIKTVSRKYLDKRKENGGIYDHNIVMKDLRGEVEYALSVPWYASLERIENRRYI
DQYGVNDTWIAKTSYKIPCISNDLFLALAKQDYNICQAIQQKELRELERWFADNKFSHLNFARQKLIYC
YFSAAATLFSPELSAARVVWAKNGVITTVVDDFFDVGGSSEEIHSFVEAVRVWDEAATDGLSENVQIL
FSALYNTVDEIVQQAFVFQGRDISIHLREIWYRLVNSMMTEAQWARTHCLPSMHEYMENAEPSIALEP
IVLSSLYFVGPKLSEEIICHPEYYNLMHLLNICGRLLNDIQGCKREAHQGKLNSVTLYMEENSGTTMED
AIVYLRKTIDESRQLLLKEVLRPSIVPRECKQLHWNMMRILQLFYLKNDGFTSPTEMLGYVNAVIVDPIL

SEQ ID NO: 10; Ps.KO
MDTLTLSLGFLSLFLFLFLLKRSTHKHSKLSHVPVVPGLPVIGNLLQLKEKKPHKTFTKMAQKYGPIFSI
KAGSSKIIVLNTAHLAKEAMVTRYSSISKRKLSTALTILTSDKCMVAMSDYNDFHKMVKKHILASVLGA
NAQKRLRFHREVMMENMSSKFNEHVKTLSDSAVDFRKIFVSELFGLALKQALGSDIESIYVEGLTATL
SREDLYNTLVVDFMEGAIEVDWRDFFPYLKWIPNKSFEKKIRRVDRQRKIIMKALINEQKKRLTSGKEL
DCYYDYLVSEAKEVTEEQMIMLLVVEPIIETSDTTLVTTEWAMYELAKDKNRQDRLYEELLNVCGHEKV
TDEELSKLPYLGAVFHETLRKHSPVPIVPLRYVDEDTELGGYHIPAGSEIAINIYGCNMDSNLWENPDQ
WIPERFLDEKYAQADLYKTMAFGGGKRVCAGSLQAMLIACTAIGRLVQEFEWELGHGEEENVDTMG
LTTHRLHPLQVKLKPRNRIY

SEQ ID NO: 11; At.CPR
MSSSSSSSTSMIDLMAAIIKGEPVIVSDPANASAYESVAAELSSMLIENRQFAMIVTTSIAVLIGCIVMLV
WRRSGSGNSKRVEPLKPLVIKPREEEIDDGRKKVTIFFGTQTGTAEGFAKALGEEAKARYEKTRFKIV
DLDDYAADDDEYEEKLKKEDVAFFFLATYGDGEPTDNAARFYKVVFTEGNDRGEWLKNLKYGVFGLG
NRQYEHFNKVAKVVDDILVEQGAQRLVQVGLGDDDQCIEDDFTAVVREALWPELDTILREEGDTAVAT
PYTAAVLEYRVSIHDSEDAKFNDINMANGNGYTVFDAQHPYKANVAVKRELHTPESDRSCIHLEFDIA
GSGLTYETGDHVGVLCDNLSETVDEALRLLDMSPDTYFSLHAEKEDGTPISSSLPPPFPPCNLRTALT
RYACLLSSPKKSALVALAAHASDPTEAERLKHLASPAGKDEYSKWVVESQRSLLEVMAEFPSAKPPL
GVFFAGVAPRLQPRFYSISSSPKIAETRIHVTCALVYEKMPTGRIHKGVCSTVVMKNAVPYEKSENCSS
APIFVRQSNFKLPSDSKVPIIMIGPGTGLAPFRGFLQERLALVESGVELGPSVLFFGCRNRRMDFIYEE
ELQRFVESGALAELSVAFSREGPTKEYVQHKMMDKASDIWNMISQGAYLYVCGDAKGMARDVHRSL
HTIAQEQGSMDSTKAEGFVKNLQTSGRYLRDVW

SEQ ID NO: 12; UGT85C2
MDAMATTEKKPHVIFIPFPAQSHIKAMLKLAQLLHHKGLQITFVNTDFIHNQFLESSGPHCLDGAPGFR
FETIPDGVSHSPEASIPIRESLLRSIETNFLDRFIDLVTKLPDPPTCIISDGFLSVFTIDAAKKLGIPVMMY
WTLAACGFMGFYHIHSLIEKGFAPLKDASYLTNGYLDTVIDWVPGMEGIRLKDFPLDWSTDLNDKVLM
FTTEAPQRSHKVSHHIFHTFDELEPSIIKTLSLRYNHIYTIGPLQLLLDQIPEEKKQTGITSLHGYSLVKEE
PECFQWLQSKEPNSVVYVNFGSTTVMSLEDMTEFGWGLANSNHYFLWIIRSNLVIGENAVLPPELEE
HIKKRGFIASWCSQEKVLKHPSVGGFLTHCGWGSTIESLSAGVPMICWPYSWDQLTNCRYICKEWEV
GLEMGTKVKRDEVKRLVQELMGEGGHKMRNKAKDWKEKARIAIAPNGSSSLNIDKMVKEITVLARN

SEQUENCE APPENDIX

SEQ ID NO: 13; UGT74G1
MAEQQKIKKSPHVLLIPFPLQGHINPFIQFGKRLISKGVKTTLVTTIHTLNSTLNHSNTTTTSIEIQAISDG
CDEGGFMSAGESYLETFKQVGSKSLADLIKKLQSEGTTIDAIIYDSMTEWVLDVAIEFGIDGGSFFTQA
CVVNSLYYHVHKGLISLPLGETVSVPGFPVLQRWETPLILQNHEQIQSPWSQMLFGQFANIDQARWV
FTNSFYKLEEEVIEVVTRKIWNLKVIGPTLPSMYLDKRLDDDKDNGFNLYKANHHECMNWLDDKPKES
VVYVAFGSLVKHGPEQVEEITRALIDSDVNFLWVIKHKEEGKLPENLSEVIKTGKGLIVAWCKQLDVLA
HESVGCFVTHCGFNSTLEAISLGVPVVAMPQFSDQTTNAKLLDEILGVGVRVKADENGIVRRGNLASC
IKMIMEEERGVIIRKNAVKWKDLAKVAVHEGGSSDNDIVEFVSELIKA

SEQ ID NO: 14; UGT91D_like3
MYNVTYHQNSKAMATSDSIVDDRKQLHVATFPWLAFGHILPYLQLSKLIAEKGHKVSFLSTTRNIQRLS
SHISPLINVVQLTLPRVQELPEDAEATTDVHPEDIPYLKKASDGLQPEVTRFLEQHSPDWIIYDYTHYW
LPSIAASLGISRAHFSVTTPWAIAYMGPSADAMINGSDGRTTVEDLTTPPKWFPFPTKVCWRKHDLAR
LVPYKAPGISDGYRMGLVLKGSDCLLSKCYHEFGTQWLPLLETLHQVPVVPVGLLPPEIPGDEKDET
WVSIKKWLDGKQKGSVVYVALGSEVLVSQTEVVELALGLELSGLPFVWAYRKPKGPAKSDSVELPD
GFVERTRDRGLVWTSWAPQLRILSHESVCGFLTHCGSGSIVEGLMFGHPLIMLPIFGDQPLNARLLED
KQVGIEIPRNEEDGCLTKESVARSLRSVVVEKEGEIYKANARELSKIYNDTKVEKEYVSQFVDYLEKNA
RAVAIDHES SEQ ID NO: 15; UGT76G1
MENKTETTVRRRRRIILFPVPFQGHINPILQLANVLYSKGFSITIFHTNFNKPKTSNYPHFTFRFILDNDP
QDERISNLPTHGPLAGMRIPIINEHGADELRRELELLMLASEEDEEVSCLITDALWYFAQSVADSLNLR
RLVLMTSSLFNFHAHVSLPQFDELGYLDPDDKTRLEEQASGFPMLKVKDIKSAYSNWQILKEILGKMIK
QTKASSGVIWNSFKELEESELETVIREIPAPSFLIPLPKHLTASSSSLLDHDRTVFQWLDQQPPSSVLY
VSFGSTSEVDEKDFLEIARGLVDSKQSFLWVVRPGFVKGSTWVEPLPDGFLGERGRIVKWVPQQEV
LAHGAIGAFWTHSGWNSTLESVCEGVPMIFSDFGLDQPLNARYMSDVLKVGVYLENGWERGEIANAI
RRVMVDEEGEYIRQNARVLKQKADVSLMKGGSSYESLESLVSYISSL SEQ ID NO: 16; UGT40087
MDASDSSPLHIVIFPWLAFGHMLASLELAERLAARGHRVSFVSTPRNISRLRPVPPALAPLIDFVALPL
PRVDGLPDGAEATSDIPPGKTELHLKALDGLAAPFAAFLDAACADGSTNKVDWLFLDNFQYWAAAAA
ADHKIPCALNLTFAASTSAEYGVPRVEPPVDGSTASILQRFVLTLEKCQFVIQRACFELEPEPLPLLSDI
FGKPVIPYGLVPPCPPAEGHKREHGNAALSWLDKQQPESVLFIALGSEPPVTVEQLHEIALGLELAGT
TFLWALKKPNGLLLEADGDILPPGFEERTRDRGLVAMGWVPQPIILAHSSVGAFLTHGGWASTIEGV
MSGHPMLFLTFLDEQRINAQLIERKKAGLRVPRREKDGSYDRQGIAGAIRAVMCEEESKSVFAANAK
KMQEIVSDRNCQEKYIDELIQRLGSFEK SEQ ID NO: 17; Aa.CPR(1a:66a)-Ro.KAH N146T/A297Y/G466A(26a:523a)
MQSTTSVKLSPFDLMTALLNGKVSFDTSNTSDTNIPLAVFMENRELLMILTTSVAVLIGCVVVLVWVLD
WVWLKPKKLERCLREQGLKGNSYWFLYGDMKENSILLKQAKSKPMNLSTSHDIAPQVIPFVDQTVKV
YGKNSFDWIGPIPRVNIMNPEELKDVFTKYDDFIKPISNPLFKLLATGLATYEGEKWAKHRRIINPTFHS
EKLKRMLPSFHQSCTEMIKEVVESLVSKEGSSCELDVWPFLENMTADVISRTAFGTSYKKGRKIFELLR
EQAIYATKAIQSFYIPGWRFLPTKMNKRMKEINKEIKGLIKGIIIKREHTIKAGEETKDDLLGYLMESNLK
DIREHGKNNKNFGMSIEDVIEECKLFYFAGQETTSVLLVWTMVLLGQNQNWQDRARQEILQVFGSNK
PDFDGLTHLKVVTMILLEVLRLYPAVIELPRTIHKKTQLGKFSLPEGVEVRLPTLLIHHDKELWGDDANE
FKPERFSEGVSKATKSRLSFFPFGAGPRICIGQNFAMMEAKLALVLILQHFTFELSPSYAHAPSYRITL
QPQYGVPIILHRR SEQ ID NO: 18; Aa.CPR(1a:66a)-Ro.KAH W52T/N146T/A297Y(26a:523a)
MQSTTSVKLSPFDLMTALLNGKVSFDTSNTSDTNIPLAVFMENRELLMILTTSVAVLIGCVVVLVWVLD
WVWLKPKKLERCLREQGLKGNSYTFLYGDMKENSILLKQAKSKPMNLSTSHDIAPQVIPFVDQTVKV
YGKNSFDWIGPIPRVNIMNPEELKDVFTKYDDFIKPISNPLFKLLATGLATYEGEKWAKHRRIINPTFHS
EKLKRMLPSFHQSCTEMIKEVVESLVSKEGSSCELDVWPFLENMTADVISRTAFGTSYKKGRKIFELLR
EQAIYATKAIQSFYIPGVVRFLPTKMNKRMKEINKEIKGLIKGIIIKREHTIKAGEETKDDLLGYLMESNLK
DIREHGKNNKNFGMSIEDVIEECKLFYFAGQETTSVLLVWTMVLLGQNQNWQDRARQEILQVFGSNK
PDFDGLTHLKVVTMILLEVLRLYPAVIELPRTIHKKTQLGKFSLPEGVEVRLPTLLIHHDKELWGDDANE
FKPERFSEGVSKATKSRLSFFPFGGGPRICIGQNFAMMEAKLALVLILQHFTFELSPSYAHAPSYRITL
QPQYGVPIILHRR SEQ ID NO: 19; Aa.CPR(1a:66a)-Ro.KAH T142G/N146T/A297Y/G466A(26a:523a)
MQSTTSVKLSPFDLMTALLNGKVSFDTSNTSDTNIPLAVFMENRELLMILTTSVAVLIGCVVVLVWVLD
WVWLKPKKLERCLREQGLKGNSYWFLYGDMKENSILLKQAKSKPMNLSTSHDIAPQVIPFVDQTVKV
YGKNSFDWIGPIPRVNIMNPEELKDVFTKYDDFIKPISNPLFKLLAGGLATYEGEKWAKHRRIINPTFHS
EKLKRMLPSFHQSCTEMIKEWESLVSKEGSSCELDVWPFLENMTADVISRTAFGTSYKKGRKIFELLR
EQAIYATKAIQSFYIPGWRFLPTKMNKRMKEINKEIKGLIKGIIIKREHTIKAGEETKDDLLGYLMESNLK
DIREHGKNNKNFGMSIEDVIEECKLFYFAGQETTSVLLVWTMVLLGQNQNWQDRARQEILQVFGSNK
PDFDGLTHLKVVTMILLEVLRLYPAVIELPRTIHKKTQLGKFSLPEGVEVRLPTLLIHHDKELWGDDANE
FKPERFSEGVSKATKSRLSFFPFGAGPRICIGQNFAMMEAKLALVLILQHFTFELSPSYAHAPSYRITL
QPQYGVPIILHRR SEQ ID NO: 20; Aa.CPR(1a:66a)-Ro.KAH W52T/T142G/N146T/A297Y(26a:523a)
MQSTTSVKLSPFDLMTALLNGKVSFDTSNTSDTNIPLAVFMENRELLMILTTSVAVLIGCVVVLVWVLD
WVWLKPKKLERCLREQGLKGNSYTFLYGDMKENSILLKQAKSKPMNLSTSHDIAPQVIPFVDQTVKV
YGKNSFDWIGPIPRVNIMNPEELKDVFTKYDDFIKPISNPLFKLLAGGLATYEGEKWAKHRRIINPTFHS
EKLKRMLPSFHQSCTEMIKEVVESLVSKEGSSCELDVWPFLENMTADVISRTAFGTSYKKGRKIFELLR
EQAIYATKAIQSFYIPGVVRFLPTKMNKRMKEINKEIKGLIKGIIIKREHTIKAGEETKDDLLGYLMESNLK
DIREHGKNNKNFGMSIEDVIEECKLFYFAGQETTSVLLVWTMVLLGQNQNWQDRARQEILQVFGSNK

SEQUENCE APPENDIX

```
PDFDGLTHLKVVTMILLEVLRLYPAVIELPRTIHKKTQLGKFSLPEGVEVRLPTLLIHHDKELWGDDANE
FKPERFSEGVSKATKSRLSFFPFGGGPRICIGQNFAMMEAKLALVLILQHFTFELSPSYAHAPSYRITL
QPQYGVPIILHRR

SEQ ID NO: 21; Aa.CPR(1a:66a)-Ro.KAH W52T/T142G/N146T/A297Y/G466A(26a:523a)
MQSTTSVKLSPFDLMTALLNGKVSFDTSNTSDTNIPLAVFMENRELLMILTTSVAVLIGCVVVLVWVLD
WVVLKPKKLERCLREQGLKGNSYTFLYGDMKENSILLKQAKSKPMNLSTSHDIAPQVIPFVDQTVKV
YGKNSFDWIGPIPRVNIMNPEELKDVFTKYDDFIKPISNPLFKLLAGGLATYEGEKWAKHRRIINPTFHS
EKLKRMLPSFHQSCTEMIKEWESLVSKEGSSCELDVWPFLENMTADVISRTAFGTSYKKGRKIFELLR
EQAIYATKAIQSFYIPGWRFLPTKMNKRMKEINKEIKGLIKGIIIKREHTIKAGEETKDDLLGYLMESNLK
DIREHGKNNKNFGMSIEDVIEECKLFYFAGQETTSVLLVWTMVLLGQNQNWQDRARQEILQVFGSNK
PDFDGLTHLKVVTMILLEVLRLYPAVIELPRTIHKKTQLGKFSLPEGVEVRLPTLLIHHDKELWGDDANE
FKPERFSEGVSKATKSRLSFFPFGAGPRICIGQNFAMMEAKLALVLILQHFTFELSPSYAHAPSYRITL
QPQYGVPIILHRR

SEQ ID NO: 22; Aa.CPR signal sequence
MQSTTSVKLSPFDLMTALLNGKVSFDTSNTSDTNIPLAVFMENRELLMILTTSVAVLIGCVVVLVW SEQ ID NO: 23; EUGT11
MDSGYSSSYAAAAGMHVVICPWLAFGHLLPCLDLAQRLASRGHRVSFVSTPRNISRLPPV
RPALAPLVAFVALPLPRVEGLPDGAESTNDVPHDRPDMVELHRRAFDGLAAPFSEFLGTA
CADWVIVDVFHHWAAAAALEHKVPCAMMLLGSAHMIASIADRRLERAETESPAAAGQGRP
AAAPTFEVARMKLIRTKGSSGMSLAERFSLTLSRSSLVVGRSCVEFEPETVPLLSTLRGK
PITFLGLMPPLHEGRREDGEDATVRWLDAQPAKSVVYVALGSEVPLGVEKVHELALGLEL
AGTRFLWALRKPTGVSDADLLPAGFEERTRGRGVVATRWVPQMSILAHAAVGAFLTHCGW
NSTIEGLMFGHPLIMLPIFGDQGPNARLIEAKNAGLQVARNDGDGSFDREGVAAAIRAVA
VEEEESSKVFQAKAKKLQEIVADMACHERYIDGFIQQLRSYKD
```

What is claimed:

1. A kaurenoic acid hydroxylase variant comprising the amino acid sequence of SEQ ID NO:1, further comprising one or more amino acid substitutions selected from the group consisting of: W8G, L11V, W29A, W29C, W29T, W29V, V30F, N49A, N49R, F53R, L54G, Y55G, Y55P, Y55S, G56D, G56N, G56S, D57G, M58G, M58P, E60G, E60R, N61P, S62R, L64D, L64G, L64N, L65G, L65S, A68G, A68I, A68P, K69G, K69P, S70P, P72C, P72D, P72G, P72T, M73G, M73H, Q84C, Q84L, F88D, F88R, F88S, F88V, D102Y, I104A, I104D, I104H, I104N, I104R, K119S, K119V, K119Y, T123D, I129R, I132G, S133G, S133R, N160D, N160T, P161C, P161D, T162A, T162G, H164G, S165D, S165P, K167G, K167H, K167S, M171F, W202A, W202C, W202Q, W202V, L205I, E206D, N207F, A210G, T216A, T216G, A217L, A217V, T220E, T220R, K224C, K224I, K224V, F229Y, E230C, E230G, L232M, L232Y, R233C, R233T, A236R, I237C, Y238C, T240D, A242D, A242G, Q244D, Q244G, S245G, F246G, F246S, M258G, K267D, I284G, K291C, K291S, D292P, D293C, A297F, A297V, A297Y, L303D, K314P, C327I, F332L, Q335V, S339A, S339G, V340A, V340S, V343G, T378D, H379G, A396F, T403V, S452D, R458D, S460I, G466D, G466F, G466S, N475D, N475G, L485F, H491P, A503C, S505R, Y506V, R507A, R507E, R507G, I508L, T509V, Q513G, and Q513R.

2. The variant of claim 1, wherein the one or more amino acid substitutions are F332L/S452D.

3. The variant of claim 1, wherein the amino acids of an N-terminal signal sequence in SEQ ID NO:1 are replaced with the amino acids of an N-terminal signal sequence of a heterologous plant p450 polypeptide.

4. The variant of claim 1, wherein amino acids 1-25 of SEQ ID NO:1 are replaced with the amino acid sequence of SEQ ID NO:22.

5. A nucleic acid encoding the variant polypeptide of claim 1.

6. A host cell comprising the polypeptide of claim 1.

7. The host cell of claim 6, wherein the host cell is capable of producing one or more steviol glycosides.

8. The host cell of claim 7, wherein the one or more steviol glycosides are selected from RebA, RebB, RebD, RebE, and RebM.

9. The host cell of claim 6, further comprising one or more nucleic acids encoding one or more enzymes of a pathway for making a steviol glycoside, optionally wherein the host cell further comprises a nucleic acid encoding a geranylgeranyl diphosphate synthase, a nucleic acid encoding a geranylgeranyl diphosphate synthase, a nucleic acid encoding a copalyl diphosphate synthase, a nucleic acid encoding an ent-kaurene synthase, a nucleic acid encoding a kaurene oxidase, a nucleic acid encoding a cytochrome P450 reductase, and/or a nucleic acid encoding one or more uridine 5'-diphosphate-dependent glycosyltransferases.

10. The host cell of claim 6, wherein the cell is selected from a bacterial cell, a yeast cell, an algal cell, an insect cell, and a plant cell.

11. The host cell of claim 10, wherein the cell is a yeast cell.

12. A method for producing one or more steviol glycosides comprising:
    culturing a population of host cells of claim 6 in a medium with a carbon source under conditions suitable for making one or more steviol glycosides to yield a culture broth; and
    recovering the one or more steviol glycosides from the culture broth.

13. The method of claim 12, wherein the one or more steviol glycosides is RebM.

14. A fermentation composition comprising:
    a host cell comprising a nucleic acid encoding a kaurenoic acid hydroxylase of claim 6; and
    one or more steviol glycosides produced by the host cell.

15. A host cell comprising a kaurenoic acid hydroxylase polypeptide comprising an amino acid sequence at least 90% identical to the amino acid sequence of SEQ ID NO: 1.

16. The host cell of claim 15, wherein the amino acid sequence of the kaurenoic acid hydroxylase polypeptide comprises the amino sequence selected from SEQ ID NO: 1, SEQ ID NO: 17, SEQ ID NO: 18, SEQ ID NO: 19, SEQ ID NO: 20, and SEQ ID NO: 21.

17. The host cell of claim 11, wherein the yeast cell is a *Saccharomyces cerevisiae*.

\* \* \* \* \*

SEQUENCE LISTING

```
<160> NUMBER OF SEQ ID NOS: 23

<210> SEQ ID NO 1
<211> LENGTH: 523
<212> TYPE: PRT
<213> ORGANISM: Rubus occidentalis

<400> SEQUENCE: 1

Met Glu Val Thr Val Gly Ser Trp Val Ala Leu Ser Leu Val Phe Val
1               5                   10                  15

Ser Ile Ile Val Gly Trp Ala Trp Ser Val Leu Asp Trp Val Trp Leu
            20                  25                  30

Lys Pro Lys Lys Leu Glu Arg Cys Leu Arg Glu Gln Gly Leu Lys Gly
        35                  40                  45

Asn Ser Tyr Trp Phe Leu Tyr Gly Asp Met Lys Glu Asn Ser Ile Leu
    50                  55                  60

Leu Lys Gln Ala Lys Ser Lys Pro Met Asn Leu Ser Thr Ser His Asp
65                  70                  75                  80

Ile Ala Pro Gln Val Ile Pro Phe Val Asp Gln Thr Val Lys Val Tyr
                85                  90                  95

Gly Lys Asn Ser Phe Asp Trp Ile Gly Pro Ile Pro Arg Val Asn Ile
            100                 105                 110

Met Asn Pro Glu Glu Leu Lys Asp Val Phe Thr Lys Tyr Asp Asp Phe
        115                 120                 125

Ile Lys Pro Ile Ser Asn Pro Leu Phe Lys Leu Leu Ala Thr Gly Leu
    130                 135                 140

Ala Asn Tyr Glu Gly Glu Lys Trp Ala Lys His Arg Arg Ile Ile Asn
145                 150                 155                 160

Pro Thr Phe His Ser Glu Lys Leu Lys Arg Met Leu Pro Ser Phe His
                165                 170                 175

Gln Ser Cys Thr Glu Met Ile Lys Glu Trp Glu Ser Leu Val Ser Lys
```

```
            180                 185                 190
Glu Gly Ser Ser Cys Glu Leu Asp Val Trp Pro Phe Leu Glu Asn Met
        195                 200                 205

Thr Ala Asp Val Ile Ser Arg Thr Ala Phe Gly Thr Ser Tyr Lys Lys
    210                 215                 220

Gly Arg Lys Ile Phe Glu Leu Leu Arg Glu Gln Ala Ile Tyr Ala Thr
225                 230                 235                 240

Lys Ala Ile Gln Ser Phe Tyr Ile Pro Gly Trp Arg Phe Leu Pro Thr
                245                 250                 255

Lys Met Asn Lys Arg Met Lys Glu Ile Asn Lys Glu Ile Lys Gly Leu
            260                 265                 270

Ile Lys Gly Ile Ile Ile Lys Arg Glu His Thr Ile Lys Ala Gly Glu
        275                 280                 285

Glu Thr Lys Asp Asp Leu Leu Gly Ala Leu Met Glu Ser Asn Leu Lys
    290                 295                 300

Asp Ile Arg Glu His Gly Lys Asn Asn Lys Asn Phe Gly Met Ser Ile
305                 310                 315                 320

Glu Asp Val Ile Glu Glu Cys Lys Leu Phe Tyr Phe Ala Gly Gln Glu
                325                 330                 335

Thr Thr Ser Val Leu Leu Val Trp Thr Met Val Leu Leu Gly Gln Asn
            340                 345                 350

Gln Asn Trp Gln Asp Arg Ala Arg Gln Glu Ile Leu Gln Val Phe Gly
        355                 360                 365

Ser Asn Lys Pro Asp Phe Asp Gly Leu Thr His Leu Lys Val Val Thr
    370                 375                 380

Met Ile Leu Leu Glu Val Leu Arg Leu Tyr Pro Ala Val Ile Glu Leu
385                 390                 395                 400

Pro Arg Thr Ile His Lys Lys Thr Gln Leu Gly Lys Phe Ser Leu Pro
                405                 410                 415

Glu Gly Val Glu Val Arg Leu Pro Thr Leu Leu Ile His His Asp Lys
            420                 425                 430

Glu Leu Trp Gly Asp Asp Ala Asn Glu Phe Lys Pro Glu Arg Phe Ser
        435                 440                 445

Glu Gly Val Ser Lys Ala Thr Lys Ser Arg Leu Ser Phe Phe Pro Phe
    450                 455                 460

Gly Gly Gly Pro Arg Ile Cys Ile Gly Gln Asn Phe Ala Met Met Glu
465                 470                 475                 480

Ala Lys Leu Ala Leu Val Leu Ile Leu Gln His Phe Thr Phe Glu Leu
                485                 490                 495

Ser Pro Ser Tyr Ala His Ala Pro Ser Tyr Arg Ile Thr Leu Gln Pro
            500                 505                 510

Gln Tyr Gly Val Pro Ile Ile Leu His Arg Arg
        515                 520

<210> SEQ ID NO 2
<211> LENGTH: 1571
<212> TYPE: DNA
<213> ORGANISM: Rubus occidentalis

<400> SEQUENCE: 2
atggaagtaa ccgttggatc ttgggtagct ttgtccttag tcttcgtttc tattatcgtc    60
ggttgggctt ggtccgtttt agattgggtc tggttgaaac caagaagtt agaaagatgt    120 ttgagagaac aaggtttaaa gggtaactct tactggttct tgtatggtga catgaaagag   180
```

```
aactctattt tgttgaagca agctaagtct aagccaatga acttatctac ctctcacgac    240
atcgccccac aagttattcc atttgtcgac caaactgtca aggtctacgg taagaactct    300
ttcgattgga tcggtcctat tccaagagtc aatatcatga acccagaaga attgaaggat    360
gttttcacca agtacgatga cttcatcaag ccaatttcta accctttgtt caagttgttg    420
gctaccggtt tggctaatta cgaaggtgag aagtgggcta agcacagacg tattatcaac    480
ccaactttcc attctgagaa gttgaaaaga atgttgccat ccttccacca atcttgtact    540
gaaatgatca aggaatggga atctttggtt tctaaggaag gttcttcttg tgagttagac    600
gtctggccat tcttagaaaa catgaccgct gacgttattt ctagaactgc tttcggtact    660
tcttacaaga agggtagaaa gattttcgaa ttgttgagag aacaagctat ttacgccacc    720
aaggctatcc aatcttttta cattccaggt tggcgttttt tgcctactaa atgaacaag     780
agaatgaagg aaatcaacaa ggagatcaag ggtttgatta gggtatcat catcaaaaga    840
gaacacacta tcaaggctgg tgaagaaact aaggatgact tgttaggtgc tttgatggaa    900
tctaacttga aggacattag agaacacggt aagaacaaca agaacttcgg tatgtctatc    960
gaagacgtta tcgaagagtg taagttgttc tactttgctg gtcaagaaac tacttctgtt   1020
ttgttagttt ggaccatggt tttgttgggt caaaatcaaa actggcaaga tagagctaga   1080
caagaaatct tgcaagtttt tggttctaat aagccagact tcgatggttt gactcacttg   1140
aaagttgtca ccatgatttt attggaagtc ttgagattgt acccagctgt tatcgaattg   1200
ccaagaacca ttcacaagaa gactcaattg ggtaaattct ctttacctga aggtgttgaa   1260
gttagattgc caactttgtt aatccaccat gataaggaat gtgggggtga tgacgctaac   1320
gaattcaagc cagaacgttt ctctgaaggt gtttctaagg ctaccaaatc cagattgtcc   1380
ttttttcctt tcggtggtgg tcctagaatc tgtattggtc aaaactttgc tatgatggaa   1440
gctaaattgg ctttggtttt gattttgcaa cacttcactt tcgaattgtc cccttcctac   1500
gcccatgctc catcctacag aattaccta caacctcaat atggtgtccc tattatcttg   1560
caccgtcgtt a                                                        1571

<210> SEQ ID NO 3
<211> LENGTH: 523
<212> TYPE: PRT
<213> ORGANISM: Rubus suavissimus

<400> SEQUENCE: 3

Met Glu Val Thr Val Ala Ser Ser Val Ala Leu Ser Leu Val Phe Ile
 1               5                  10                  15

Ser Ile Val Val Arg Trp Ala Trp Ser Val Val Asn Trp Val Trp Phe
             20                  25                  30

Lys Pro Lys Lys Leu Glu Arg Phe Leu Arg Glu Gln Gly Leu Lys Gly
         35                  40                  45

Asn Ser Tyr Arg Phe Leu Tyr Gly Asp Met Lys Glu Asn Ser Ile Leu
     50                  55                  60

Leu Lys Gln Ala Arg Ser Lys Pro Met Asn Leu Ser Thr Ser His Asp
 65                  70                  75                  80

Ile Ala Pro Gln Val Thr Pro Phe Val Asp Gln Thr Val Lys Ala Tyr
                 85                  90                  95

Gly Lys Asn Ser Phe Asn Trp Val Gly Pro Ile Pro Arg Val Asn Ile
            100                 105                 110

Met Asn Pro Glu Asp Leu Lys Asp Val Leu Thr Lys Asn Val Asp Phe
        115                 120                 125
```

```
Val Lys Pro Ile Ser Asn Pro Leu Ile Lys Leu Leu Ala Thr Gly Ile
    130                 135                 140

Ala Ile Tyr Glu Gly Glu Lys Trp Thr Lys His Arg Arg Ile Ile Asn
145                 150                 155                 160

Pro Thr Phe His Ser Glu Arg Leu Lys Arg Met Leu Pro Ser Phe His
                165                 170                 175

Gln Ser Cys Asn Glu Met Val Lys Glu Trp Glu Ser Leu Val Ser Lys
            180                 185                 190

Glu Gly Ser Ser Cys Glu Leu Asp Val Trp Pro Phe Leu Glu Asn Met
        195                 200                 205

Ser Ala Asp Val Ile Ser Arg Thr Ala Phe Gly Thr Ser Tyr Lys Lys
210                 215                 220

Gly Gln Lys Ile Phe Glu Leu Leu Arg Glu Gln Val Ile Tyr Val Thr
225                 230                 235                 240

Lys Gly Phe Gln Ser Phe Tyr Ile Pro Gly Trp Arg Phe Leu Pro Thr
                245                 250                 255

Lys Met Asn Lys Arg Met Asn Glu Ile Asn Glu Glu Ile Lys Gly Leu
            260                 265                 270

Ile Arg Gly Ile Ile Ile Asp Arg Glu Gln Ile Ile Lys Ala Gly Glu
        275                 280                 285

Glu Thr Asn Asp Asp Leu Leu Gly Ala Leu Met Glu Ser Asn Leu Lys
290                 295                 300

Asp Ile Arg Glu His Gly Lys Asn Asn Lys Asn Val Gly Met Ser Ile
305                 310                 315                 320

Glu Asp Val Ile Gln Glu Cys Lys Leu Phe Tyr Phe Ala Gly Gln Glu
                325                 330                 335

Thr Thr Ser Val Leu Leu Ala Trp Thr Met Val Leu Leu Gly Gln Asn
            340                 345                 350

Gln Asn Trp Gln Asp Arg Ala Arg Gln Glu Val Leu Gln Val Phe Gly
        355                 360                 365

Ser Ser Lys Pro Asp Phe Asp Gly Leu Ala His Leu Lys Val Val Thr
370                 375                 380

Met Ile Leu Leu Glu Val Leu Arg Leu Tyr Pro Pro Val Ile Glu Leu
385                 390                 395                 400

Ile Arg Thr Ile His Lys Lys Thr Gln Leu Gly Lys Leu Ser Leu Pro
                405                 410                 415

Glu Gly Val Glu Val Arg Leu Pro Thr Leu Leu Ile His His Asp Lys
            420                 425                 430

Glu Leu Trp Gly Asp Asp Ala Asn Gln Phe Asn Pro Glu Arg Phe Ser
        435                 440                 445

Glu Gly Val Ser Lys Ala Thr Lys Asn Arg Leu Ser Phe Phe Pro Phe
450                 455                 460

Gly Ala Gly Pro Arg Ile Cys Ile Gly Gln Asn Phe Ser Met Met Glu
465                 470                 475                 480

Ala Lys Leu Ala Leu Ala Leu Ile Leu Gln His Phe Thr Phe Glu Leu
                485                 490                 495

Ser Pro Ser His Ala His Ala Pro Ser His Arg Ile Thr Leu Gln Pro
            500                 505                 510

Gln Tyr Gly Val Arg Ile Ile Leu His Arg Arg
        515                 520

<210> SEQ ID NO 4
<211> LENGTH: 525
```

<212> TYPE: PRT
<213> ORGANISM: Arabidopsis thaliana

<400> SEQUENCE: 4

```
Met Glu Ser Leu Val Val His Thr Val Asn Ala Ile Trp Cys Ile Val
1               5                   10                  15

Ile Val Gly Ile Phe Ser Val Gly Tyr His Val Tyr Gly Arg Ala Val
            20                  25                  30

Val Glu Gln Trp Arg Met Arg Arg Ser Leu Lys Leu Gln Gly Val Lys
        35                  40                  45

Gly Pro Pro Pro Ser Ile Phe Asn Gly Asn Val Ser Glu Met Gln Arg
    50                  55                  60

Ile Gln Ser Glu Ala Lys His Cys Ser Gly Asp Asn Ile Ile Ser His
65                  70                  75                  80

Asp Tyr Ser Ser Ser Leu Phe Pro His Phe Asp His Trp Arg Lys Gln
                85                  90                  95

Tyr Gly Arg Ile Tyr Thr Tyr Ser Thr Gly Leu Lys Gln His Leu Tyr
            100                 105                 110

Ile Asn His Pro Glu Met Val Lys Glu Leu Ser Gln Thr Asn Thr Leu
        115                 120                 125

Asn Leu Gly Arg Ile Thr His Ile Thr Lys Arg Leu Asn Pro Ile Leu
130                 135                 140

Gly Asn Gly Ile Ile Thr Ser Asn Gly Pro His Trp Ala His Gln Arg
145                 150                 155                 160

Arg Ile Ile Ala Tyr Glu Phe Thr His Asp Lys Ile Lys Gly Met Val
                165                 170                 175

Gly Leu Met Val Glu Ser Ala Met Pro Met Leu Asn Lys Trp Glu Glu
            180                 185                 190

Met Val Lys Arg Gly Gly Glu Met Gly Cys Asp Ile Arg Val Asp Glu
        195                 200                 205

Asp Leu Lys Asp Val Ser Ala Asp Val Ile Ala Lys Ala Cys Phe Gly
    210                 215                 220

Ser Ser Phe Ser Lys Gly Lys Ala Ile Phe Ser Met Ile Arg Asp Leu
225                 230                 235                 240

Leu Thr Ala Ile Thr Lys Arg Ser Val Leu Phe Arg Phe Asn Gly Phe
                245                 250                 255

Thr Asp Met Val Phe Gly Ser Lys Lys His Gly Asp Val Asp Ile Asp
            260                 265                 270

Ala Leu Glu Met Glu Leu Glu Ser Ser Ile Trp Glu Thr Val Lys Glu
        275                 280                 285

Arg Glu Ile Glu Cys Lys Asp Thr His Lys Lys Asp Leu Met Gln Leu
    290                 295                 300

Ile Leu Glu Gly Ala Met Arg Ser Cys Asp Gly Asn Leu Trp Asp Lys
305                 310                 315                 320

Ser Ala Tyr Arg Arg Phe Val Val Asp Asn Cys Lys Ser Ile Tyr Phe
                325                 330                 335

Ala Gly His Asp Ser Thr Ala Val Ser Val Ser Trp Cys Leu Met Leu
            340                 345                 350

Leu Ala Leu Asn Pro Ser Trp Gln Val Lys Ile Arg Asp Glu Ile Leu
        355                 360                 365

Ser Ser Cys Lys Asn Gly Ile Pro Asp Ala Glu Ser Ile Pro Asn Leu
    370                 375                 380

Lys Thr Val Thr Met Val Ile Gln Glu Thr Met Arg Leu Tyr Pro Pro
385                 390                 395                 400
```

```
Ala Pro Ile Val Gly Arg Glu Ala Ser Lys Asp Ile Arg Leu Gly Asp
            405                 410                 415

Leu Val Val Pro Lys Gly Val Cys Ile Trp Thr Leu Ile Pro Ala Leu
            420                 425                 430

His Arg Asp Pro Glu Ile Trp Gly Pro Asp Ala Asn Asp Phe Lys Pro
            435                 440                 445

Glu Arg Phe Ser Glu Gly Ile Ser Lys Ala Cys Lys Tyr Pro Gln Ser
        450                 455                 460

Tyr Ile Pro Phe Gly Leu Gly Pro Arg Thr Cys Val Gly Lys Asn Phe
465                 470                 475                 480

Gly Met Met Glu Val Lys Val Leu Val Ser Leu Ile Val Ser Lys Phe
            485                 490                 495

Ser Phe Thr Leu Ser Pro Thr Tyr Gln His Ser Pro Ser His Lys Leu
            500                 505                 510

Leu Val Glu Pro Gln His Gly Val Val Ile Arg Val Val
            515                 520                 525

<210> SEQ ID NO 5
<211> LENGTH: 500
<212> TYPE: PRT
<213> ORGANISM: Stevia rebaudiana

<400> SEQUENCE: 5

Met Glu Ala Ser Tyr Leu Tyr Ile Ser Ile Leu Leu Leu Leu Ala Ser
1               5                   10                  15

Tyr Leu Phe Thr Thr Gln Leu Arg Arg Lys Ser Ala Asn Leu Pro Pro
            20                  25                  30

Thr Val Phe Pro Ser Ile Pro Ile Ile Gly His Leu Tyr Leu Leu Lys
        35                  40                  45

Lys Pro Leu Tyr Arg Thr Leu Ala Lys Ile Ala Ala Lys Tyr Gly Pro
    50                  55                  60

Ile Leu Gln Leu Gln Leu Gly Tyr Arg Arg Val Leu Val Ile Ser Ser
65                  70                  75                  80

Pro Ser Ala Ala Glu Glu Cys Phe Thr Asn Asn Asp Val Ile Phe Ala
                85                  90                  95

Asn Arg Pro Lys Thr Leu Phe Gly Lys Ile Val Gly Gly Thr Ser Leu
            100                 105                 110

Gly Ser Leu Ser Tyr Gly Asp Gln Trp Arg Asn Leu Arg Arg Val Ala
        115                 120                 125

Ser Ile Glu Ile Leu Ser Val His Arg Leu Asn Glu Phe His Asp Ile
    130                 135                 140

Arg Val Asp Glu Asn Arg Leu Leu Ile Arg Lys Leu Arg Ser Ser Ser
145                 150                 155                 160

Ser Pro Val Thr Leu Ile Thr Val Phe Tyr Ala Leu Thr Leu Asn Val
                165                 170                 175

Ile Met Arg Met Ile Ser Gly Lys Arg Tyr Phe Asp Ser Gly Asp Arg
            180                 185                 190

Glu Leu Glu Glu Glu Gly Lys Arg Phe Arg Glu Ile Leu Asp Glu Thr
        195                 200                 205

Leu Leu Leu Ala Gly Ala Ser Asn Val Gly Asp Tyr Leu Pro Ile Leu
    210                 215                 220

Asn Trp Leu Gly Val Lys Ser Leu Glu Lys Lys Leu Ile Ala Leu Gln
225                 230                 235                 240

Lys Lys Arg Asp Asp Phe Phe Gln Gly Leu Ile Glu Gln Val Arg Lys
```

```
                245                 250                 255
Ser Arg Gly Ala Lys Val Gly Lys Gly Arg Lys Thr Met Ile Glu Leu
            260                 265                 270

Leu Leu Ser Leu Gln Glu Ser Glu Pro Glu Tyr Tyr Thr Asp Ala Met
        275                 280                 285

Ile Arg Ser Phe Val Leu Gly Leu Leu Ala Ala Gly Ser Asp Thr Ser
    290                 295                 300

Ala Gly Thr Met Glu Trp Ala Met Ser Leu Leu Val Asn His Pro His
305                 310                 315                 320

Val Leu Lys Lys Ala Gln Ala Glu Ile Asp Arg Val Ile Gly Asn Asn
                325                 330                 335

Arg Leu Ile Asp Glu Ser Asp Ile Gly Asn Ile Pro Tyr Ile Gly Cys
            340                 345                 350

Ile Ile Asn Glu Thr Leu Arg Leu Tyr Pro Ala Gly Pro Leu Leu Phe
        355                 360                 365

Pro His Glu Ser Ser Ala Asp Cys Val Ile Ser Gly Tyr Asn Ile Pro
    370                 375                 380

Arg Gly Thr Met Leu Ile Val Asn Gln Trp Ala Ile His His Asp Pro
385                 390                 395                 400

Lys Val Trp Asp Asp Pro Glu Thr Phe Lys Pro Glu Arg Phe Gln Gly
                405                 410                 415

Leu Glu Gly Thr Arg Asp Gly Phe Lys Leu Met Pro Phe Gly Ser Gly
            420                 425                 430

Arg Arg Gly Cys Pro Gly Glu Gly Leu Ala Ile Arg Leu Leu Gly Met
        435                 440                 445

Thr Leu Gly Ser Val Ile Gln Cys Phe Asp Trp Glu Arg Val Gly Asp
    450                 455                 460

Glu Met Val Asp Met Thr Glu Gly Leu Gly Val Thr Leu Pro Lys Ala
465                 470                 475                 480

Val Pro Leu Val Ala Lys Cys Lys Pro Arg Ser Glu Met Thr Asn Leu
                485                 490                 495

Leu Ser Glu Leu
            500

<210> SEQ ID NO 6
<211> LENGTH: 513
<212> TYPE: PRT
<213> ORGANISM: Stevia rebaudiana

<400> SEQUENCE: 6

Met Asp Ala Val Thr Gly Leu Leu Thr Val Pro Ala Thr Ala Ile Thr
1               5                   10                  15

Ile Gly Gly Thr Ala Val Ala Leu Ala Val Ala Leu Ile Phe Trp Tyr
            20                  25                  30

Leu Lys Ser Tyr Thr Ser Ala Arg Arg Ser Gln Ser Asn His Leu Pro
        35                  40                  45

Arg Val Pro Glu Val Pro Gly Val Pro Leu Leu Gly Asn Leu Leu Gln
    50                  55                  60

Leu Lys Glu Lys Lys Pro Tyr Met Thr Phe Thr Arg Trp Ala Ala Thr
65                  70                  75                  80

Tyr Gly Pro Ile Tyr Ser Ile Lys Thr Gly Ala Thr Ser Met Val Val
                85                  90                  95

Val Ser Ser Asn Glu Ile Ala Lys Glu Ala Leu Val Thr Arg Phe Gln
            100                 105                 110
```

```
Ser Ile Ser Thr Arg Asn Leu Ser Lys Ala Leu Lys Val Leu Thr Ala
            115                 120                 125

Asp Lys Thr Met Val Ala Met Ser Asp Tyr Asp Tyr His Lys Thr
130                 135                 140

Val Lys Arg His Ile Leu Thr Ala Val Leu Gly Pro Asn Ala Gln Lys
145                 150                 155                 160

Lys His Arg Ile His Arg Asp Ile Met Met Asp Asn Ile Ser Thr Gln
                165                 170                 175

Leu His Glu Phe Val Lys Asn Asn Pro Glu Gln Glu Glu Val Asp Leu
            180                 185                 190

Arg Lys Ile Phe Gln Ser Glu Leu Phe Gly Leu Ala Met Arg Gln Ala
        195                 200                 205

Leu Gly Lys Asp Val Glu Ser Leu Tyr Val Glu Asp Leu Lys Ile Thr
        210                 215                 220

Met Asn Arg Asp Glu Ile Phe Gln Val Leu Val Val Asp Pro Met Met
225                 230                 235                 240

Gly Ala Ile Asp Val Asp Trp Arg Asp Phe Phe Pro Tyr Leu Lys Trp
                245                 250                 255

Val Pro Asn Lys Lys Phe Glu Asn Thr Ile Gln Gln Met Tyr Ile Arg
            260                 265                 270

Arg Glu Ala Val Met Lys Ser Leu Ile Lys Glu His Lys Lys Arg Ile
        275                 280                 285

Ala Ser Gly Glu Lys Leu Asn Ser Tyr Ile Asp Tyr Leu Leu Ser Glu
        290                 295                 300

Ala Gln Thr Leu Thr Asp Gln Gln Leu Leu Met Ser Leu Trp Glu Pro
305                 310                 315                 320

Ile Ile Glu Ser Ser Asp Thr Thr Met Val Thr Thr Glu Trp Ala Met
                325                 330                 335

Tyr Glu Leu Ala Lys Asn Pro Lys Leu Gln Asp Arg Leu Tyr Arg Asp
            340                 345                 350

Ile Lys Ser Val Cys Gly Ser Glu Lys Ile Thr Glu Glu His Leu Ser
        355                 360                 365

Gln Leu Pro Tyr Ile Thr Ala Ile Phe His Glu Thr Leu Arg Arg His
        370                 375                 380

Ser Pro Val Pro Ile Ile Pro Leu Arg His Val His Glu Asp Thr Val
385                 390                 395                 400

Leu Gly Gly Tyr His Val Pro Ala Gly Thr Glu Leu Ala Val Asn Ile
                405                 410                 415

Tyr Gly Cys Asn Met Asp Lys Asn Val Trp Glu Asn Pro Glu Glu Trp
            420                 425                 430

Asn Pro Glu Arg Phe Met Lys Glu Asn Glu Thr Ile Asp Phe Gln Lys
        435                 440                 445

Thr Met Ala Phe Gly Gly Gly Lys Arg Val Cys Ala Gly Ser Leu Gln
450                 455                 460

Ala Leu Leu Thr Ala Ser Ile Gly Ile Gly Arg Met Val Gln Glu Phe
465                 470                 475                 480

Glu Trp Lys Leu Lys Asp Met Thr Gln Glu Glu Val Asn Thr Ile Gly
                485                 490                 495

Leu Thr Thr Gln Met Leu Arg Pro Leu Arg Ala Ile Ile Lys Pro Arg
            500                 505                 510

Ile

<210> SEQ ID NO 7
```

<211> LENGTH: 320
<212> TYPE: PRT
<213> ORGANISM: Blakeslea trispora

<400> SEQUENCE: 7

```
Met Leu Thr Ser Ser Lys Ser Ile Glu Ser Phe Pro Lys Asn Val Gln
1               5                   10                  15

Pro Tyr Gly Lys His Tyr Gln Asn Gly Leu Glu Pro Val Gly Lys Ser
            20                  25                  30

Gln Glu Asp Ile Leu Leu Glu Pro Phe His Tyr Leu Cys Ser Asn Pro
        35                  40                  45

Gly Lys Asp Val Arg Thr Lys Met Ile Glu Ala Phe Asn Ala Trp Leu
    50                  55                  60

Lys Val Pro Lys Asp Asp Leu Ile Val Ile Thr Arg Val Ile Glu Met
65                  70                  75                  80

Leu His Ser Ala Ser Leu Leu Ile Asp Asp Val Glu Asp Asp Ser Val
                85                  90                  95

Leu Arg Arg Gly Val Pro Ala Ala His His Ile Tyr Gly Thr Pro Gln
            100                 105                 110

Thr Ile Asn Cys Ala Asn Tyr Val Tyr Phe Leu Ala Leu Lys Glu Ile
        115                 120                 125

Ala Lys Leu Asn Lys Pro Asn Met Ile Thr Ile Tyr Thr Asp Glu Leu
    130                 135                 140

Ile Asn Leu His Arg Gly Gln Gly Met Glu Leu Phe Trp Arg Asp Thr
145                 150                 155                 160

Leu Thr Cys Pro Thr Glu Lys Glu Phe Leu Asp Met Val Asn Asp Lys
                165                 170                 175

Thr Gly Gly Leu Leu Arg Leu Ala Val Lys Leu Met Gln Glu Ala Ser
            180                 185                 190

Gln Ser Gly Thr Asp Tyr Thr Gly Leu Val Ser Lys Ile Gly Ile His
        195                 200                 205

Phe Gln Val Arg Asp Asp Tyr Met Asn Leu Gln Ser Lys Asn Tyr Ala
    210                 215                 220

Asp Asn Lys Gly Phe Cys Glu Asp Leu Thr Glu Gly Lys Phe Ser Phe
225                 230                 235                 240

Pro Ile Ile His Ser Ile Arg Ser Asp Pro Ser Asn Arg Gln Leu Leu
                245                 250                 255

Asn Ile Leu Lys Gln Arg Ser Ser Ile Glu Leu Lys Gln Phe Ala
            260                 265                 270

Leu Gln Leu Leu Glu Asn Thr Asn Thr Phe Gln Tyr Cys Arg Asp Phe
        275                 280                 285

Leu Arg Val Leu Glu Lys Glu Ala Arg Glu Ile Lys Leu Leu Gly
    290                 295                 300

Gly Asn Ile Met Leu Glu Lys Ile Met Asp Val Leu Ser Val Asn Glu
305                 310                 315                 320
```

<210> SEQ ID NO 8
<211> LENGTH: 736
<212> TYPE: PRT
<213> ORGANISM: Oryza sativa

<400> SEQUENCE: 8

```
Met Glu His Ala Arg Pro Pro Gln Gly Gly Asp Asp Asp Val Ala Ala
1               5                   10                  15

Ser Thr Ser Glu Leu Pro Tyr Met Ile Glu Ser Ile Lys Ser Lys Leu
            20                  25                  30
```

Arg Ala Ala Arg Asn Ser Leu Gly Glu Thr Thr Val Ser Ala Tyr Asp
        35                  40                  45

Thr Ala Trp Ile Ala Leu Val Asn Arg Leu Asp Gly Gly Glu Arg
    50                  55                  60

Ser Pro Gln Phe Pro Glu Ala Ile Asp Trp Ile Ala Arg Asn Gln Leu
65                  70                  75                  80

Pro Asp Gly Ser Trp Gly Asp Ala Gly Met Phe Ile Val Gln Asp Arg
                85                  90                  95

Leu Ile Asn Thr Leu Gly Cys Val Val Ala Leu Ala Thr Trp Gly Val
            100                 105                 110

His Glu Glu Gln Arg Ala Arg Gly Leu Ala Tyr Ile Gln Asp Asn Leu
            115                 120                 125

Trp Arg Leu Gly Glu Asp Asp Glu Glu Trp Met Met Val Gly Phe Glu
        130                 135                 140

Ile Thr Phe Pro Val Leu Leu Glu Lys Ala Lys Asn Leu Gly Leu Asp
145                 150                 155                 160

Ile Asn Tyr Asp Asp Pro Ala Leu Gln Asp Ile Tyr Ala Lys Arg Gln
            165                 170                 175

Leu Lys Leu Ala Lys Ile Pro Arg Glu Ala Leu His Ala Arg Pro Thr
            180                 185                 190

Thr Leu Leu His Ser Leu Glu Gly Met Glu Asn Leu Asp Trp Glu Arg
            195                 200                 205

Leu Leu Gln Phe Lys Cys Pro Ala Gly Ser Leu His Ser Ser Pro Ala
        210                 215                 220

Ala Ser Ala Tyr Ala Leu Ser Glu Thr Gly Asp Lys Glu Leu Leu Glu
225                 230                 235                 240

Tyr Leu Glu Thr Ala Ile Asn Asn Phe Asp Gly Gly Ala Pro Cys Thr
                245                 250                 255

Tyr Pro Val Asp Asn Phe Asp Arg Leu Trp Ser Val Asp Arg Leu Arg
            260                 265                 270

Arg Leu Gly Ile Ser Arg Tyr Phe Thr Ser Glu Ile Glu Glu Tyr Leu
        275                 280                 285

Glu Tyr Ala Tyr Arg His Leu Ser Pro Asp Gly Met Ser Tyr Gly Gly
    290                 295                 300

Leu Cys Pro Val Lys Asp Ile Asp Asp Thr Ala Met Ala Phe Arg Leu
305                 310                 315                 320

Leu Arg Leu His Gly Tyr Asn Val Ser Ser Val Phe Asn His Phe
            325                 330                 335

Glu Lys Asp Gly Glu Tyr Phe Cys Phe Ala Gly Gln Ser Ser Gln Ser
            340                 345                 350

Leu Thr Ala Met Tyr Asn Ser Tyr Arg Ala Ser Gln Ile Val Phe Pro
            355                 360                 365

Gly Asp Asp Asp Gly Leu Glu Gln Leu Arg Ala Tyr Cys Arg Ala Phe
    370                 375                 380

Leu Glu Glu Arg Arg Ala Thr Gly Asn Leu Arg Asp Lys Trp Val Ile
385                 390                 395                 400

Ala Asn Gly Leu Pro Ser Glu Val Glu Tyr Ala Leu Asp Phe Pro Trp
            405                 410                 415

Lys Ala Ser Leu Pro Arg Val Glu Thr Arg Val Tyr Leu Glu Gln Tyr
            420                 425                 430

Gly Ala Ser Glu Asp Ala Trp Ile Gly Lys Gly Leu Tyr Arg Met Thr
    435                 440                 445

Leu Val Asn Asn Asp Leu Tyr Leu Glu Ala Ala Lys Ala Asp Phe Thr
450                 455                 460

Asn Phe Gln Arg Leu Ser Arg Leu Glu Trp Leu Ser Leu Lys Arg Trp
465                 470                 475                 480

Tyr Ile Arg Asn Leu Gln Ala His Gly Val Thr Glu Gln Ser Val
                485                 490                 495

Leu Arg Ala Tyr Phe Leu Ala Ala Asn Ile Phe Glu Pro Asn Arg
                500                 505                 510

Ala Ala Glu Arg Leu Gly Trp Ala Arg Thr Ala Ile Leu Ala Glu Ala
                515                 520                 525

Ile Ala Ser His Leu Arg Gln Tyr Ser Ala Asn Gly Ala Ala Asp Gly
530                 535                 540

Met Thr Glu Arg Leu Ile Ser Gly Leu Ala Ser His Asp Trp Asp Trp
545                 550                 555                 560

Arg Glu Ser Asn Asp Ser Ala Ala Arg Ser Leu Leu Tyr Ala Leu Asp
                565                 570                 575

Glu Leu Ile Asp Leu His Ala Phe Gly Asn Ala Ser Asp Ser Leu Arg
                580                 585                 590

Glu Ala Trp Lys Gln Trp Leu Met Ser Trp Thr Asn Glu Ser Gln Gly
                595                 600                 605

Ser Thr Gly Gly Asp Thr Ala Leu Leu Leu Val Arg Thr Ile Glu Ile
610                 615                 620

Cys Ser Gly Arg His Gly Ser Ala Glu Gln Ser Leu Lys Asn Ser Glu
625                 630                 635                 640

Asp Tyr Ala Arg Leu Glu Gln Ile Ala Ser Ser Met Cys Ser Lys Leu
                645                 650                 655

Ala Thr Lys Ile Leu Ala Gln Asn Gly Gly Ser Met Asp Asn Val Glu
                660                 665                 670

Gly Ile Asp Gln Glu Val Asp Val Glu Met Lys Glu Leu Ile Gln Arg
                675                 680                 685

Val Tyr Gly Ser Ser Ser Asn Asp Val Ser Ser Val Thr Arg Gln Thr
                690                 695                 700

Phe Leu Asp Val Val Lys Ser Phe Cys Tyr Val Ala His Cys Ser Pro
705                 710                 715                 720

Glu Thr Ile Asp Gly His Ile Ser Lys Val Leu Phe Glu Asp Val Asn
                725                 730                 735

<210> SEQ ID NO 9
<211> LENGTH: 757
<212> TYPE: PRT
<213> ORGANISM: Picea glauca

<400> SEQUENCE: 9

Met Lys Arg Glu Gln Tyr Thr Ile Leu Asn Glu Lys Glu Ser Met Ala
1               5                   10                  15

Glu Glu Leu Ile Leu Arg Ile Lys Arg Met Phe Ser Glu Ile Glu Asn
                20                  25                  30

Thr Gln Thr Ser Ala Ser Ala Tyr Asp Thr Ala Trp Val Ala Met Val
                35                  40                  45

Pro Ser Leu Asp Ser Ser Gln Gln Pro Gln Phe Pro Gln Cys Leu Ser
                50                  55                  60

Trp Ile Ile Asp Asn Gln Leu Leu Asp Gly Ser Trp Gly Ile Pro Tyr
65                  70                  75                  80

Leu Ile Ile Lys Asp Arg Leu Cys His Thr Leu Ala Cys Val Ile Ala
                85                  90                  95

-continued

```
Leu Arg Lys Trp Asn Ala Gly Asn Gln Asn Val Glu Thr Gly Leu Arg
            100                 105                 110

Phe Leu Arg Glu Asn Ile Glu Gly Ile Val His Glu Asp Glu Tyr Thr
        115                 120                 125

Pro Ile Gly Phe Gln Ile Ile Phe Pro Ala Met Leu Glu Glu Ala Arg
    130                 135                 140

Gly Leu Gly Leu Glu Leu Pro Tyr Asp Leu Thr Pro Ile Lys Leu Met
145                 150                 155                 160

Leu Thr His Arg Glu Lys Ile Met Lys Gly Lys Ala Ile Asp His Met
                165                 170                 175

His Glu Tyr Asp Ser Ser Leu Ile Tyr Thr Val Glu Gly Ile His Lys
            180                 185                 190

Ile Val Asp Trp Asn Lys Val Leu Lys His Gln Asn Lys Asp Gly Ser
        195                 200                 205

Leu Phe Asn Ser Pro Ser Ala Thr Ala Cys Ala Leu Met His Thr Arg
    210                 215                 220

Lys Ser Asn Cys Leu Glu Tyr Leu Ser Ser Met Leu Gln Lys Leu Gly
225                 230                 235                 240

Asn Gly Val Pro Ser Val Tyr Pro Ile Asn Leu Tyr Ala Arg Ile Ser
                245                 250                 255

Met Ile Asp Arg Leu Gln Arg Leu Gly Leu Ala Arg His Phe Arg Asn
            260                 265                 270

Glu Ile Ile His Ala Leu Asp Asp Ile Tyr Arg Tyr Trp Met Gln Arg
        275                 280                 285

Glu Thr Ser Arg Glu Gly Lys Ser Leu Thr Pro Asp Ile Val Ser Thr
    290                 295                 300

Ser Ile Ala Phe Met Leu Leu Arg Leu His Gly Tyr Asp Val Pro Ala
305                 310                 315                 320

Asp Val Phe Cys Cys Tyr Asp Leu His Ser Ile Glu Gln Ser Gly Glu
                325                 330                 335

Ala Val Thr Ala Met Leu Ser Leu Tyr Arg Ala Ser Gln Ile Met Phe
            340                 345                 350

Pro Gly Glu Thr Ile Leu Glu Glu Ile Lys Thr Val Ser Arg Lys Tyr
        355                 360                 365

Leu Asp Lys Arg Lys Glu Asn Gly Gly Ile Tyr Asp His Asn Ile Val
    370                 375                 380

Met Lys Asp Leu Arg Gly Glu Val Glu Tyr Ala Leu Ser Val Pro Trp
385                 390                 395                 400

Tyr Ala Ser Leu Glu Arg Ile Glu Asn Arg Arg Tyr Ile Asp Gln Tyr
                405                 410                 415

Gly Val Asn Asp Thr Trp Ile Ala Lys Thr Ser Tyr Lys Ile Pro Cys
            420                 425                 430

Ile Ser Asn Asp Leu Phe Leu Ala Leu Ala Lys Gln Asp Tyr Asn Ile
        435                 440                 445

Cys Gln Ala Ile Gln Gln Lys Glu Leu Arg Glu Leu Glu Arg Trp Phe
    450                 455                 460

Ala Asp Asn Lys Phe Ser His Leu Asn Phe Ala Arg Gln Lys Leu Ile
465                 470                 475                 480

Tyr Cys Tyr Phe Ser Ala Ala Thr Leu Phe Ser Pro Glu Leu Ser
                485                 490                 495

Ala Ala Arg Val Val Trp Ala Lys Asn Gly Val Ile Thr Thr Val Val
            500                 505                 510
```

```
Asp Asp Phe Phe Asp Val Gly Gly Ser Ser Glu Glu Ile His Ser Phe
            515                 520                 525

Val Glu Ala Val Arg Val Trp Asp Glu Ala Ala Thr Asp Gly Leu Ser
530                 535                 540

Glu Asn Val Gln Ile Leu Phe Ser Ala Leu Tyr Asn Thr Val Asp Glu
545                 550                 555                 560

Ile Val Gln Gln Ala Phe Val Phe Gln Gly Arg Asp Ile Ser Ile His
                565                 570                 575

Leu Arg Glu Ile Trp Tyr Arg Leu Val Asn Ser Met Met Thr Glu Ala
            580                 585                 590

Gln Trp Ala Arg Thr His Cys Leu Pro Ser Met His Glu Tyr Met Glu
        595                 600                 605

Asn Ala Glu Pro Ser Ile Ala Leu Glu Pro Ile Val Leu Ser Ser Leu
    610                 615                 620

Tyr Phe Val Gly Pro Lys Leu Ser Glu Glu Ile Ile Cys His Pro Glu
625                 630                 635                 640

Tyr Tyr Asn Leu Met His Leu Leu Asn Ile Cys Gly Arg Leu Leu Asn
                645                 650                 655

Asp Ile Gln Gly Cys Lys Arg Glu Ala His Gln Gly Lys Leu Asn Ser
            660                 665                 670

Val Thr Leu Tyr Met Glu Glu Asn Ser Gly Thr Thr Met Glu Asp Ala
        675                 680                 685

Ile Val Tyr Leu Arg Lys Thr Ile Asp Glu Ser Arg Gln Leu Leu Leu
    690                 695                 700

Lys Glu Val Leu Arg Pro Ser Ile Val Pro Arg Glu Cys Lys Gln Leu
705                 710                 715                 720

His Trp Asn Met Met Arg Ile Leu Gln Leu Phe Tyr Leu Lys Asn Asp
                725                 730                 735

Gly Phe Thr Ser Pro Thr Glu Met Leu Gly Tyr Val Asn Ala Val Ile
            740                 745                 750

Val Asp Pro Ile Leu
        755

<210> SEQ ID NO 10
<211> LENGTH: 499
<212> TYPE: PRT
<213> ORGANISM: Pisum Sativum

<400> SEQUENCE: 10

Met Asp Thr Leu Thr Leu Ser Leu Gly Phe Leu Ser Leu Phe Leu Phe
1               5                   10                  15

Leu Phe Leu Leu Lys Arg Ser Thr His Lys His Ser Lys Leu Ser His
                20                  25                  30

Val Pro Val Pro Gly Leu Pro Val Ile Gly Asn Leu Leu Gln Leu
            35                  40                  45

Lys Glu Lys Lys Pro His Lys Thr Phe Thr Lys Met Ala Gln Lys Tyr
50                  55                  60

Gly Pro Ile Phe Ser Ile Lys Ala Gly Ser Ser Lys Ile Ile Val Leu
65                  70                  75                  80

Asn Thr Ala His Leu Ala Lys Glu Ala Met Val Thr Arg Tyr Ser Ser
                85                  90                  95

Ile Ser Lys Arg Lys Leu Ser Thr Ala Leu Thr Ile Leu Thr Ser Asp
            100                 105                 110

Lys Cys Met Val Ala Met Ser Asp Tyr Asn Asp Phe His Lys Met Val
        115                 120                 125
```

Lys Lys His Ile Leu Ala Ser Val Leu Gly Ala Asn Ala Gln Lys Arg
130                 135                 140

Leu Arg Phe His Arg Glu Val Met Met Glu Asn Met Ser Ser Lys Phe
145                 150                 155                 160

Asn Glu His Val Lys Thr Leu Ser Asp Ser Ala Val Asp Phe Arg Lys
                165                 170                 175

Ile Phe Val Ser Glu Leu Phe Gly Leu Ala Leu Lys Gln Ala Leu Gly
                180                 185                 190

Ser Asp Ile Glu Ser Ile Tyr Val Glu Gly Leu Thr Ala Thr Leu Ser
                195                 200                 205

Arg Glu Asp Leu Tyr Asn Thr Leu Val Val Asp Phe Met Glu Gly Ala
210                 215                 220

Ile Glu Val Asp Trp Arg Asp Phe Phe Pro Tyr Leu Lys Trp Ile Pro
225                 230                 235                 240

Asn Lys Ser Phe Glu Lys Lys Ile Arg Arg Val Asp Arg Gln Arg Lys
                245                 250                 255

Ile Ile Met Lys Ala Leu Ile Asn Glu Gln Lys Lys Arg Leu Thr Ser
                260                 265                 270

Gly Lys Glu Leu Asp Cys Tyr Tyr Asp Tyr Leu Val Ser Glu Ala Lys
                275                 280                 285

Glu Val Thr Glu Glu Gln Met Ile Met Leu Leu Trp Glu Pro Ile Ile
290                 295                 300

Glu Thr Ser Asp Thr Thr Leu Val Thr Thr Glu Trp Ala Met Tyr Glu
305                 310                 315                 320

Leu Ala Lys Asp Lys Asn Arg Gln Asp Arg Leu Tyr Glu Glu Leu Leu
                325                 330                 335

Asn Val Cys Gly His Glu Lys Val Thr Asp Glu Glu Leu Ser Lys Leu
                340                 345                 350

Pro Tyr Leu Gly Ala Val Phe His Glu Thr Leu Arg Lys His Ser Pro
                355                 360                 365

Val Pro Ile Val Pro Leu Arg Tyr Val Asp Glu Asp Thr Glu Leu Gly
370                 375                 380

Gly Tyr His Ile Pro Ala Gly Ser Glu Ile Ala Ile Asn Ile Tyr Gly
385                 390                 395                 400

Cys Asn Met Asp Ser Asn Leu Trp Glu Asn Pro Asp Gln Trp Ile Pro
                405                 410                 415

Glu Arg Phe Leu Asp Glu Lys Tyr Ala Gln Ala Asp Leu Tyr Lys Thr
                420                 425                 430

Met Ala Phe Gly Gly Gly Lys Arg Val Cys Ala Gly Ser Leu Gln Ala
                435                 440                 445

Met Leu Ile Ala Cys Thr Ala Ile Gly Arg Leu Val Gln Glu Phe Glu
450                 455                 460

Trp Glu Leu Gly His Gly Glu Glu Glu Asn Val Asp Thr Met Gly Leu
465                 470                 475                 480

Thr Thr His Arg Leu His Pro Leu Gln Val Lys Leu Lys Pro Arg Asn
                485                 490                 495

Arg Ile Tyr

<210> SEQ ID NO 11
<211> LENGTH: 711
<212> TYPE: PRT
<213> ORGANISM: Arabidopsis thaliana

<400> SEQUENCE: 11

```
Met Ser Ser Ser Ser Ser Ser Thr Ser Met Ile Asp Leu Met Ala
1               5                   10                  15

Ala Ile Ile Lys Gly Glu Pro Val Ile Val Ser Asp Pro Ala Asn Ala
            20                  25                  30

Ser Ala Tyr Glu Ser Val Ala Ala Glu Leu Ser Ser Met Leu Ile Glu
            35                  40                  45

Asn Arg Gln Phe Ala Met Ile Val Thr Thr Ser Ile Ala Val Leu Ile
        50                  55                  60

Gly Cys Ile Val Met Leu Val Trp Arg Arg Ser Gly Ser Gly Asn Ser
65                  70                  75                  80

Lys Arg Val Glu Pro Leu Lys Pro Leu Val Ile Lys Pro Arg Glu Glu
                85                  90                  95

Glu Ile Asp Asp Gly Arg Lys Lys Val Thr Ile Phe Phe Gly Thr Gln
            100                 105                 110

Thr Gly Thr Ala Glu Gly Phe Ala Lys Ala Leu Gly Glu Glu Ala Lys
        115                 120                 125

Ala Arg Tyr Glu Lys Thr Arg Phe Lys Ile Val Asp Leu Asp Asp Tyr
    130                 135                 140

Ala Ala Asp Asp Asp Glu Tyr Glu Glu Lys Leu Lys Lys Glu Asp Val
145                 150                 155                 160

Ala Phe Phe Phe Leu Ala Thr Tyr Gly Asp Gly Glu Pro Thr Asp Asn
                165                 170                 175

Ala Ala Arg Phe Tyr Lys Trp Phe Thr Glu Gly Asn Asp Arg Gly Glu
            180                 185                 190

Trp Leu Lys Asn Leu Lys Tyr Gly Val Phe Gly Leu Gly Asn Arg Gln
        195                 200                 205

Tyr Glu His Phe Asn Lys Val Ala Lys Val Val Asp Asp Ile Leu Val
    210                 215                 220

Glu Gln Gly Ala Gln Arg Leu Val Gln Val Gly Leu Gly Asp Asp Asp
225                 230                 235                 240

Gln Cys Ile Glu Asp Asp Phe Thr Ala Trp Arg Glu Ala Leu Trp Pro
                245                 250                 255

Glu Leu Asp Thr Ile Leu Arg Glu Glu Gly Asp Thr Ala Val Ala Thr
            260                 265                 270

Pro Tyr Thr Ala Ala Val Leu Glu Tyr Arg Val Ser Ile His Asp Ser
        275                 280                 285

Glu Asp Ala Lys Phe Asn Asp Ile Asn Met Ala Asn Gly Asn Gly Tyr
    290                 295                 300

Thr Val Phe Asp Ala Gln His Pro Tyr Lys Ala Asn Val Ala Val Lys
305                 310                 315                 320

Arg Glu Leu His Thr Pro Glu Ser Asp Arg Ser Cys Ile His Leu Glu
                325                 330                 335

Phe Asp Ile Ala Gly Ser Gly Leu Thr Tyr Glu Thr Gly Asp His Val
            340                 345                 350

Gly Val Leu Cys Asp Asn Leu Ser Glu Thr Val Asp Glu Ala Leu Arg
        355                 360                 365

Leu Leu Asp Met Ser Pro Asp Thr Tyr Phe Ser Leu His Ala Glu Lys
    370                 375                 380

Glu Asp Gly Thr Pro Ile Ser Ser Ser Leu Pro Pro Pro Phe Pro Pro
385                 390                 395                 400

Cys Asn Leu Arg Thr Ala Leu Thr Arg Tyr Ala Cys Leu Leu Ser Ser
                405                 410                 415
```

```
Pro Lys Lys Ser Ala Leu Val Ala Leu Ala Ala His Ala Ser Asp Pro
            420                 425                 430

Thr Glu Ala Glu Arg Leu Lys His Leu Ala Ser Pro Ala Gly Lys Asp
        435                 440                 445

Glu Tyr Ser Lys Trp Val Val Glu Ser Gln Arg Ser Leu Leu Glu Val
    450                 455                 460

Met Ala Glu Phe Pro Ser Ala Lys Pro Pro Leu Gly Val Phe Phe Ala
465                 470                 475                 480

Gly Val Ala Pro Arg Leu Gln Pro Arg Phe Tyr Ser Ile Ser Ser Ser
                485                 490                 495

Pro Lys Ile Ala Glu Thr Arg Ile His Val Thr Cys Ala Leu Val Tyr
                500                 505                 510

Glu Lys Met Pro Thr Gly Arg Ile His Lys Gly Val Cys Ser Thr Trp
            515                 520                 525

Met Lys Asn Ala Val Pro Tyr Glu Lys Ser Glu Asn Cys Ser Ser Ala
530                 535                 540

Pro Ile Phe Val Arg Gln Ser Asn Phe Lys Leu Pro Ser Asp Ser Lys
545                 550                 555                 560

Val Pro Ile Ile Met Ile Gly Pro Gly Thr Gly Leu Ala Pro Phe Arg
                565                 570                 575

Gly Phe Leu Gln Glu Arg Leu Ala Leu Val Glu Ser Gly Val Glu Leu
            580                 585                 590

Gly Pro Ser Val Leu Phe Phe Gly Cys Arg Asn Arg Arg Met Asp Phe
        595                 600                 605

Ile Tyr Glu Glu Glu Leu Gln Arg Phe Val Glu Ser Gly Ala Leu Ala
    610                 615                 620

Glu Leu Ser Val Ala Phe Ser Arg Glu Gly Pro Thr Lys Glu Tyr Val
625                 630                 635                 640

Gln His Lys Met Met Asp Lys Ala Ser Asp Ile Trp Asn Met Ile Ser
                645                 650                 655

Gln Gly Ala Tyr Leu Tyr Val Cys Gly Asp Ala Lys Gly Met Ala Arg
            660                 665                 670

Asp Val His Arg Ser Leu His Thr Ile Ala Gln Glu Gln Gly Ser Met
        675                 680                 685

Asp Ser Thr Lys Ala Glu Gly Phe Val Lys Asn Leu Gln Thr Ser Gly
    690                 695                 700

Arg Tyr Leu Arg Asp Val Trp
705                 710

<210> SEQ ID NO 12
<211> LENGTH: 481
<212> TYPE: PRT
<213> ORGANISM: Stevia rebaudiana

<400> SEQUENCE: 12

Met Asp Ala Met Ala Thr Thr Glu Lys Lys Pro His Val Ile Phe Ile
1               5                   10                  15

Pro Phe Pro Ala Gln Ser His Ile Lys Ala Met Leu Lys Leu Ala Gln
                20                  25                  30

Leu Leu His His Lys Gly Leu Gln Ile Thr Phe Val Asn Thr Asp Phe
            35                  40                  45

Ile His Asn Gln Phe Leu Glu Ser Ser Gly Pro His Cys Leu Asp Gly
        50                  55                  60

Ala Pro Gly Phe Arg Phe Glu Thr Ile Pro Asp Gly Val Ser His Ser
65                  70                  75                  80
```

```
Pro Glu Ala Ser Ile Pro Ile Arg Glu Ser Leu Leu Arg Ser Ile Glu
                85              90              95

Thr Asn Phe Leu Asp Arg Phe Ile Asp Leu Val Thr Lys Leu Pro Asp
            100             105             110

Pro Pro Thr Cys Ile Ile Ser Asp Gly Phe Leu Ser Val Phe Thr Ile
            115             120             125

Asp Ala Ala Lys Lys Leu Gly Ile Pro Val Met Met Tyr Trp Thr Leu
130             135             140

Ala Ala Cys Gly Phe Met Gly Phe Tyr His Ile His Ser Leu Ile Glu
145             150             155             160

Lys Gly Phe Ala Pro Leu Lys Asp Ala Ser Tyr Leu Thr Asn Gly Tyr
                165             170             175

Leu Asp Thr Val Ile Asp Trp Val Pro Gly Met Glu Gly Ile Arg Leu
            180             185             190

Lys Asp Phe Pro Leu Asp Trp Ser Thr Asp Leu Asn Asp Lys Val Leu
            195             200             205

Met Phe Thr Thr Glu Ala Pro Gln Arg Ser His Lys Val Ser His His
210             215             220

Ile Phe His Thr Phe Asp Glu Leu Glu Pro Ser Ile Ile Lys Thr Leu
225             230             235             240

Ser Leu Arg Tyr Asn His Ile Tyr Thr Ile Gly Pro Leu Gln Leu Leu
                245             250             255

Leu Asp Gln Ile Pro Glu Glu Lys Lys Gln Thr Gly Ile Thr Ser Leu
            260             265             270

His Gly Tyr Ser Leu Val Lys Glu Glu Pro Glu Cys Phe Gln Trp Leu
            275             280             285

Gln Ser Lys Glu Pro Asn Ser Val Val Tyr Val Asn Phe Gly Ser Thr
290             295             300

Thr Val Met Ser Leu Glu Asp Met Thr Glu Phe Gly Trp Gly Leu Ala
305             310             315             320

Asn Ser Asn His Tyr Phe Leu Trp Ile Ile Arg Ser Asn Leu Val Ile
                325             330             335

Gly Glu Asn Ala Val Leu Pro Pro Glu Leu Glu Glu His Ile Lys Lys
            340             345             350

Arg Gly Phe Ile Ala Ser Trp Cys Ser Gln Glu Lys Val Leu Lys His
            355             360             365

Pro Ser Val Gly Gly Phe Leu Thr His Cys Gly Trp Gly Ser Thr Ile
370             375             380

Glu Ser Leu Ser Ala Gly Val Pro Met Ile Cys Trp Pro Tyr Ser Trp
385             390             395             400

Asp Gln Leu Thr Asn Cys Arg Tyr Ile Cys Lys Glu Trp Glu Val Gly
                405             410             415

Leu Glu Met Gly Thr Lys Val Lys Arg Asp Glu Val Lys Arg Leu Val
            420             425             430

Gln Glu Leu Met Gly Glu Gly His Lys Met Arg Asn Lys Ala Lys
            435             440             445

Asp Trp Lys Glu Lys Ala Arg Ile Ala Ile Ala Pro Asn Gly Ser Ser
450             455             460

Ser Leu Asn Ile Asp Lys Met Val Lys Glu Ile Thr Val Leu Ala Arg
465             470             475             480

Asn
```

```
<210> SEQ ID NO 13
<211> LENGTH: 460
<212> TYPE: PRT
<213> ORGANISM: Stevia rebaudiana

<400> SEQUENCE: 13

Met Ala Glu Gln Gln Lys Ile Lys Lys Ser Pro His Val Leu Leu Ile
1               5                   10                  15

Pro Phe Pro Leu Gln Gly His Ile Asn Pro Phe Ile Gln Phe Gly Lys
            20                  25                  30

Arg Leu Ile Ser Lys Gly Val Lys Thr Thr Leu Val Thr Thr Ile His
        35                  40                  45

Thr Leu Asn Ser Thr Leu Asn His Ser Asn Thr Thr Thr Thr Ser Ile
    50                  55                  60

Glu Ile Gln Ala Ile Ser Asp Gly Cys Asp Glu Gly Gly Phe Met Ser
65                  70                  75                  80

Ala Gly Glu Ser Tyr Leu Glu Thr Phe Lys Gln Val Gly Ser Lys Ser
                85                  90                  95

Leu Ala Asp Leu Ile Lys Lys Leu Gln Ser Glu Gly Thr Thr Ile Asp
            100                 105                 110

Ala Ile Ile Tyr Asp Ser Met Thr Glu Trp Val Leu Asp Val Ala Ile
        115                 120                 125

Glu Phe Gly Ile Asp Gly Gly Ser Phe Phe Thr Gln Ala Cys Val Val
    130                 135                 140

Asn Ser Leu Tyr Tyr His Val His Lys Gly Leu Ile Ser Leu Pro Leu
145                 150                 155                 160

Gly Glu Thr Val Ser Val Pro Gly Phe Pro Val Leu Gln Arg Trp Glu
                165                 170                 175

Thr Pro Leu Ile Leu Gln Asn His Glu Gln Ile Gln Ser Pro Trp Ser
            180                 185                 190

Gln Met Leu Phe Gly Gln Phe Ala Asn Ile Asp Gln Ala Arg Trp Val
        195                 200                 205

Phe Thr Asn Ser Phe Tyr Lys Leu Glu Glu Glu Val Ile Glu Trp Thr
    210                 215                 220

Arg Lys Ile Trp Asn Leu Lys Val Ile Gly Pro Thr Leu Pro Ser Met
225                 230                 235                 240

Tyr Leu Asp Lys Arg Leu Asp Asp Asp Lys Asp Asn Gly Phe Asn Leu
                245                 250                 255

Tyr Lys Ala Asn His His Glu Cys Met Asn Trp Leu Asp Asp Lys Pro
            260                 265                 270

Lys Glu Ser Val Val Tyr Val Ala Phe Gly Ser Leu Val Lys His Gly
        275                 280                 285

Pro Glu Gln Val Glu Glu Ile Thr Arg Ala Leu Ile Asp Ser Asp Val
    290                 295                 300

Asn Phe Leu Trp Val Ile Lys His Lys Glu Glu Gly Lys Leu Pro Glu
305                 310                 315                 320

Asn Leu Ser Glu Val Ile Lys Thr Gly Lys Gly Leu Ile Val Ala Trp
                325                 330                 335

Cys Lys Gln Leu Asp Val Leu Ala His Glu Ser Val Gly Cys Phe Val
            340                 345                 350

Thr His Cys Gly Phe Asn Ser Thr Leu Glu Ala Ile Ser Leu Gly Val
        355                 360                 365

Pro Val Val Ala Met Pro Gln Phe Ser Asp Gln Thr Thr Asn Ala Lys
    370                 375                 380
```

```
Leu Leu Asp Glu Ile Leu Gly Val Gly Val Arg Val Lys Ala Asp Glu
385                 390                 395                 400

Asn Gly Ile Val Arg Arg Gly Asn Leu Ala Ser Cys Ile Lys Met Ile
            405                 410                 415

Met Glu Glu Glu Arg Gly Val Ile Ile Arg Lys Asn Ala Val Lys Trp
            420                 425                 430

Lys Asp Leu Ala Lys Val Ala Val His Glu Gly Ser Ser Asp Asn
            435                 440                 445

Asp Ile Val Glu Phe Val Ser Glu Leu Ile Lys Ala
    450                 455                 460

<210> SEQ ID NO 14
<211> LENGTH: 485
<212> TYPE: PRT
<213> ORGANISM: Stevia rebaudiana

<400> SEQUENCE: 14

Met Tyr Asn Val Thr Tyr His Gln Asn Ser Lys Ala Met Ala Thr Ser
1               5                   10                  15

Asp Ser Ile Val Asp Asp Arg Lys Gln Leu His Val Ala Thr Phe Pro
            20                  25                  30

Trp Leu Ala Phe Gly His Ile Leu Pro Tyr Leu Gln Leu Ser Lys Leu
        35                  40                  45

Ile Ala Glu Lys Gly His Lys Val Ser Phe Leu Ser Thr Thr Arg Asn
50                  55                  60

Ile Gln Arg Leu Ser Ser His Ile Ser Pro Leu Ile Asn Val Val Gln
65                  70                  75                  80

Leu Thr Leu Pro Arg Val Gln Glu Leu Pro Glu Asp Ala Glu Ala Thr
                85                  90                  95

Thr Asp Val His Pro Glu Asp Ile Pro Tyr Leu Lys Lys Ala Ser Asp
            100                 105                 110

Gly Leu Gln Pro Glu Val Thr Arg Phe Leu Glu Gln His Ser Pro Asp
        115                 120                 125

Trp Ile Ile Tyr Asp Tyr Thr His Tyr Trp Leu Pro Ser Ile Ala Ala
130                 135                 140

Ser Leu Gly Ile Ser Arg Ala His Phe Ser Val Thr Thr Pro Trp Ala
145                 150                 155                 160

Ile Ala Tyr Met Gly Pro Ser Ala Asp Ala Met Ile Asn Gly Ser Asp
                165                 170                 175

Gly Arg Thr Thr Val Glu Asp Leu Thr Thr Pro Pro Lys Trp Phe Pro
            180                 185                 190

Phe Pro Thr Lys Val Cys Trp Arg Lys His Asp Leu Ala Arg Leu Val
        195                 200                 205

Pro Tyr Lys Ala Pro Gly Ile Ser Asp Gly Tyr Arg Met Gly Leu Val
210                 215                 220

Leu Lys Gly Ser Asp Cys Leu Leu Ser Lys Cys Tyr His Glu Phe Gly
225                 230                 235                 240

Thr Gln Trp Leu Pro Leu Leu Glu Thr Leu His Gln Val Pro Val Val
                245                 250                 255

Pro Val Gly Leu Leu Pro Pro Glu Ile Pro Gly Asp Glu Lys Asp Glu
            260                 265                 270

Thr Trp Val Ser Ile Lys Lys Trp Leu Asp Gly Lys Gln Lys Gly Ser
        275                 280                 285

Val Val Tyr Val Ala Leu Gly Ser Glu Val Leu Val Ser Gln Thr Glu
290                 295                 300
```

```
Val Val Glu Leu Ala Leu Gly Leu Glu Leu Ser Gly Leu Pro Phe Val
305                 310                 315                 320

Trp Ala Tyr Arg Lys Pro Lys Gly Pro Ala Lys Ser Asp Ser Val Glu
            325                 330                 335

Leu Pro Asp Gly Phe Val Glu Arg Thr Arg Asp Arg Gly Leu Val Trp
            340                 345                 350

Thr Ser Trp Ala Pro Gln Leu Arg Ile Leu Ser His Glu Ser Val Cys
            355                 360                 365

Gly Phe Leu Thr His Cys Gly Ser Gly Ser Ile Val Glu Gly Leu Met
            370                 375                 380

Phe Gly His Pro Leu Ile Met Leu Pro Ile Phe Gly Asp Gln Pro Leu
385                 390                 395                 400

Asn Ala Arg Leu Leu Glu Asp Lys Gln Val Gly Ile Glu Ile Pro Arg
            405                 410                 415

Asn Glu Glu Asp Gly Cys Leu Thr Lys Glu Ser Val Ala Arg Ser Leu
            420                 425                 430

Arg Ser Val Val Glu Lys Glu Gly Glu Ile Tyr Lys Ala Asn Ala
            435                 440                 445

Arg Glu Leu Ser Lys Ile Tyr Asn Asp Thr Lys Val Glu Lys Glu Tyr
450                 455                 460

Val Ser Gln Phe Val Asp Tyr Leu Glu Lys Asn Ala Arg Ala Val Ala
465                 470                 475                 480

Ile Asp His Glu Ser
                485

<210> SEQ ID NO 15
<211> LENGTH: 458
<212> TYPE: PRT
<213> ORGANISM: Stevia rebaudiana

<400> SEQUENCE: 15

Met Glu Asn Lys Thr Glu Thr Thr Val Arg Arg Arg Arg Ile Ile
1               5                   10                  15

Leu Phe Pro Val Pro Phe Gln Gly His Ile Asn Pro Ile Leu Gln Leu
            20                  25                  30

Ala Asn Val Leu Tyr Ser Lys Gly Phe Ser Ile Thr Ile Phe His Thr
            35                  40                  45

Asn Phe Asn Lys Pro Lys Thr Ser Asn Tyr Pro His Phe Thr Phe Arg
50                  55                  60

Phe Ile Leu Asp Asn Asp Pro Gln Asp Glu Arg Ile Ser Asn Leu Pro
65                  70                  75                  80

Thr His Gly Pro Leu Ala Gly Met Arg Ile Pro Ile Ile Asn Glu His
            85                  90                  95

Gly Ala Asp Glu Leu Arg Arg Glu Leu Glu Leu Leu Met Leu Ala Ser
            100                 105                 110

Glu Glu Asp Glu Glu Val Ser Cys Leu Ile Thr Asp Ala Leu Trp Tyr
            115                 120                 125

Phe Ala Gln Ser Val Ala Asp Ser Leu Asn Leu Arg Arg Leu Val Leu
            130                 135                 140

Met Thr Ser Ser Leu Phe Asn Phe His Ala His Val Ser Leu Pro Gln
145                 150                 155                 160

Phe Asp Glu Leu Gly Tyr Leu Asp Pro Asp Asp Lys Thr Arg Leu Glu
            165                 170                 175

Glu Gln Ala Ser Gly Phe Pro Met Leu Lys Val Lys Asp Ile Lys Ser
```

```
                180             185             190
Ala Tyr Ser Asn Trp Gln Ile Leu Lys Glu Ile Leu Gly Lys Met Ile
            195                 200             205
Lys Gln Thr Lys Ala Ser Ser Gly Val Ile Trp Asn Ser Phe Lys Glu
        210                 215                 220
Leu Glu Glu Ser Glu Leu Glu Thr Val Ile Arg Glu Ile Pro Ala Pro
225                 230                 235                 240
Ser Phe Leu Ile Pro Leu Pro Lys His Leu Thr Ala Ser Ser Ser Ser
                245                 250                 255
Leu Leu Asp His Asp Arg Thr Val Phe Gln Trp Leu Asp Gln Gln Pro
            260                 265                 270
Pro Ser Ser Val Leu Tyr Val Ser Phe Gly Ser Thr Ser Glu Val Asp
        275                 280                 285
Glu Lys Asp Phe Leu Glu Ile Ala Arg Gly Leu Val Asp Ser Lys Gln
        290                 295                 300
Ser Phe Leu Trp Val Val Arg Pro Gly Phe Val Lys Gly Ser Thr Trp
305                 310                 315                 320
Val Glu Pro Leu Pro Asp Gly Phe Leu Gly Glu Arg Gly Arg Ile Val
                325                 330                 335
Lys Trp Val Pro Gln Gln Glu Val Leu Ala His Gly Ala Ile Gly Ala
            340                 345                 350
Phe Trp Thr His Ser Gly Trp Asn Ser Thr Leu Glu Ser Val Cys Glu
        355                 360                 365
Gly Val Pro Met Ile Phe Ser Asp Phe Gly Leu Asp Gln Pro Leu Asn
370                 375                 380
Ala Arg Tyr Met Ser Asp Val Leu Lys Val Gly Val Tyr Leu Glu Asn
385                 390                 395                 400
Gly Trp Glu Arg Gly Glu Ile Ala Asn Ala Ile Arg Arg Val Met Val
                405                 410                 415
Asp Glu Glu Gly Glu Tyr Ile Arg Gln Asn Ala Arg Val Leu Lys Gln
            420                 425                 430
Lys Ala Asp Val Ser Leu Met Lys Gly Gly Ser Ser Tyr Glu Ser Leu
            435                 440                 445
Glu Ser Leu Val Ser Tyr Ile Ser Ser Leu
        450                 455

<210> SEQ ID NO 16
<211> LENGTH: 436
<212> TYPE: PRT
<213> ORGANISM: Setaria italica

<400> SEQUENCE: 16

Met Asp Ala Ser Asp Ser Ser Pro Leu His Ile Val Ile Phe Pro Trp
1               5                   10                  15
Leu Ala Phe Gly His Met Leu Ala Ser Leu Glu Leu Ala Glu Arg Leu
            20                  25                  30
Ala Ala Arg Gly His Arg Val Ser Phe Val Ser Thr Pro Arg Asn Ile
        35                  40                  45
Ser Arg Leu Arg Pro Val Pro Pro Ala Leu Ala Pro Leu Ile Asp Phe
    50                  55                  60
Val Ala Leu Pro Leu Pro Arg Val Asp Gly Leu Pro Asp Gly Ala Glu
65                  70                  75                  80
Ala Thr Ser Asp Ile Pro Pro Gly Lys Thr Glu Leu His Leu Lys Ala
                85                  90                  95
```

Leu Asp Gly Leu Ala Ala Pro Phe Ala Ala Phe Leu Asp Ala Ala Cys
            100                 105                 110

Ala Asp Gly Ser Thr Asn Lys Val Asp Trp Leu Phe Leu Asp Asn Phe
            115                 120                 125

Gln Tyr Trp Ala Ala Ala Ala Ala Asp His Lys Ile Pro Cys Ala
        130                 135                 140

Leu Asn Leu Thr Phe Ala Ala Ser Thr Ser Ala Glu Tyr Gly Val Pro
145                 150                 155                 160

Arg Val Glu Pro Pro Val Asp Gly Ser Thr Ala Ser Ile Leu Gln Arg
                165                 170                 175

Phe Val Leu Thr Leu Glu Lys Cys Gln Phe Val Ile Gln Arg Ala Cys
            180                 185                 190

Phe Glu Leu Glu Pro Glu Pro Leu Pro Leu Leu Ser Asp Ile Phe Gly
            195                 200                 205

Lys Pro Val Ile Pro Tyr Gly Leu Val Pro Pro Cys Pro Pro Ala Glu
            210                 215                 220

Gly His Lys Arg Glu His Gly Asn Ala Ala Leu Ser Trp Leu Asp Lys
225                 230                 235                 240

Gln Gln Pro Glu Ser Val Leu Phe Ile Ala Leu Gly Ser Glu Pro Pro
                245                 250                 255

Val Thr Val Glu Gln Leu His Glu Ile Ala Leu Gly Leu Glu Leu Ala
            260                 265                 270

Gly Thr Thr Phe Leu Trp Ala Leu Lys Lys Pro Asn Gly Leu Leu Leu
            275                 280                 285

Glu Ala Asp Gly Asp Ile Leu Pro Pro Gly Phe Glu Glu Arg Thr Arg
            290                 295                 300

Asp Arg Gly Leu Val Ala Met Gly Trp Val Pro Gln Pro Ile Ile Leu
305                 310                 315                 320

Ala His Ser Ser Val Gly Ala Phe Leu Thr His Gly Gly Trp Ala Ser
                325                 330                 335

Thr Ile Glu Gly Val Met Ser Gly His Pro Met Leu Phe Leu Thr Phe
            340                 345                 350

Leu Asp Glu Gln Arg Ile Asn Ala Gln Leu Ile Glu Arg Lys Lys Ala
            355                 360                 365

Gly Leu Arg Val Pro Arg Arg Glu Lys Asp Gly Ser Tyr Asp Arg Gln
            370                 375                 380

Gly Ile Ala Gly Ala Ile Arg Ala Val Met Cys Glu Glu Ser Lys
385                 390                 395                 400

Ser Val Phe Ala Ala Asn Ala Lys Lys Met Gln Glu Ile Val Ser Asp
                405                 410                 415

Arg Asn Cys Gln Glu Lys Tyr Ile Asp Glu Leu Ile Gln Arg Leu Gly
            420                 425                 430

Ser Phe Glu Lys
        435

<210> SEQ ID NO 17
<211> LENGTH: 564
<212> TYPE: PRT
<213> ORGANISM: Artificial Sequence
<220> FEATURE:
<223> OTHER INFORMATION: Synthetic Construct

<400> SEQUENCE: 17

Met Gln Ser Thr Thr Ser Val Lys Leu Ser Pro Phe Asp Leu Met Thr
1               5                   10                  15

Ala Leu Leu Asn Gly Lys Val Ser Phe Asp Thr Ser Asn Thr Ser Asp
            20                  25                  30

Thr Asn Ile Pro Leu Ala Val Phe Met Glu Asn Arg Glu Leu Leu Met
        35                  40                  45

Ile Leu Thr Thr Ser Val Ala Val Leu Ile Gly Cys Val Val Val Leu
    50                  55                  60

Val Trp Val Leu Asp Trp Val Trp Leu Lys Pro Lys Lys Leu Glu Arg
65                  70                  75                  80

Cys Leu Arg Glu Gln Gly Leu Lys Gly Asn Ser Tyr Trp Phe Leu Tyr
                85                  90                  95

Gly Asp Met Lys Glu Asn Ser Ile Leu Leu Lys Gln Ala Lys Ser Lys
            100                 105                 110

Pro Met Asn Leu Ser Thr Ser His Asp Ile Ala Pro Gln Val Ile Pro
        115                 120                 125

Phe Val Asp Gln Thr Val Lys Val Tyr Gly Lys Asn Ser Phe Asp Trp
    130                 135                 140

Ile Gly Pro Ile Pro Arg Val Asn Ile Met Asn Pro Glu Glu Leu Lys
145                 150                 155                 160

Asp Val Phe Thr Lys Tyr Asp Asp Phe Ile Lys Pro Ile Ser Asn Pro
                165                 170                 175

Leu Phe Lys Leu Leu Ala Thr Gly Leu Ala Thr Tyr Glu Gly Glu Lys
            180                 185                 190

Trp Ala Lys His Arg Arg Ile Ile Asn Pro Thr Phe His Ser Glu Lys
        195                 200                 205

Leu Lys Arg Met Leu Pro Ser Phe His Gln Ser Cys Thr Glu Met Ile
210                 215                 220

Lys Glu Trp Glu Ser Leu Val Ser Lys Glu Gly Ser Ser Cys Glu Leu
225                 230                 235                 240

Asp Val Trp Pro Phe Leu Glu Asn Met Thr Ala Asp Val Ile Ser Arg
                245                 250                 255

Thr Ala Phe Gly Thr Ser Tyr Lys Lys Gly Arg Lys Ile Phe Glu Leu
            260                 265                 270

Leu Arg Glu Gln Ala Ile Tyr Ala Thr Lys Ala Ile Gln Ser Phe Tyr
        275                 280                 285

Ile Pro Gly Trp Arg Phe Leu Pro Thr Lys Met Asn Lys Arg Met Lys
290                 295                 300

Glu Ile Asn Lys Glu Ile Lys Gly Leu Ile Lys Gly Ile Ile Ile Lys
305                 310                 315                 320

Arg Glu His Thr Ile Lys Ala Gly Glu Glu Thr Lys Asp Asp Leu Leu
                325                 330                 335

Gly Tyr Leu Met Glu Ser Asn Leu Lys Asp Ile Arg Glu His Gly Lys
            340                 345                 350

Asn Asn Lys Asn Phe Gly Met Ser Ile Glu Asp Val Ile Glu Glu Cys
        355                 360                 365

Lys Leu Phe Tyr Phe Ala Gly Gln Glu Thr Thr Ser Val Leu Leu Val
    370                 375                 380

Trp Thr Met Val Leu Leu Gly Gln Asn Gln Asn Trp Gln Asp Arg Ala
385                 390                 395                 400

Arg Gln Glu Ile Leu Gln Val Phe Gly Ser Asn Lys Pro Asp Phe Asp
                405                 410                 415

Gly Leu Thr His Leu Lys Val Val Thr Met Ile Leu Leu Glu Val Leu
            420                 425                 430

Arg Leu Tyr Pro Ala Val Ile Glu Leu Pro Arg Thr Ile His Lys Lys

```
                    435                 440                 445
Thr Gln Leu Gly Lys Phe Ser Leu Pro Glu Gly Val Glu Val Arg Leu
    450                 455                 460
Pro Thr Leu Leu Ile His His Asp Lys Glu Leu Trp Gly Asp Asp Ala
465                 470                 475                 480
Asn Glu Phe Lys Pro Glu Arg Phe Ser Glu Val Ser Lys Ala Thr
                485                 490                 495
Lys Ser Arg Leu Ser Phe Phe Pro Phe Gly Ala Gly Pro Arg Ile Cys
                500                 505                 510
Ile Gly Gln Asn Phe Ala Met Met Glu Ala Lys Leu Ala Leu Val Leu
            515                 520                 525
Ile Leu Gln His Phe Thr Phe Glu Leu Ser Pro Ser Tyr Ala His Ala
        530                 535                 540
Pro Ser Tyr Arg Ile Thr Leu Gln Pro Gln Tyr Gly Val Pro Ile Ile
545                 550                 555                 560
Leu His Arg Arg

<210> SEQ ID NO 18
<211> LENGTH: 564
<212> TYPE: PRT
<213> ORGANISM: Artificial Sequence
<220> FEATURE:
<223> OTHER INFORMATION: Synthetic Construct

<400> SEQUENCE: 18

Met Gln Ser Thr Thr Ser Val Lys Leu Ser Pro Phe Asp Leu Met Thr
1               5                   10                  15
Ala Leu Leu Asn Gly Lys Val Ser Phe Asp Thr Ser Asn Thr Ser Asp
                20                  25                  30
Thr Asn Ile Pro Leu Ala Val Phe Met Glu Asn Arg Glu Leu Leu Met
            35                  40                  45
Ile Leu Thr Thr Ser Val Ala Val Leu Ile Gly Cys Val Val Val Leu
        50                  55                  60
Val Trp Val Leu Asp Trp Val Trp Leu Lys Pro Lys Lys Leu Glu Arg
65                  70                  75                  80
Cys Leu Arg Glu Gln Gly Leu Lys Gly Asn Ser Tyr Thr Phe Leu Tyr
                85                  90                  95
Gly Asp Met Lys Glu Asn Ser Ile Leu Leu Lys Gln Ala Lys Ser Lys
                100                 105                 110
Pro Met Asn Leu Ser Thr Ser His Asp Ile Ala Pro Gln Val Ile Pro
            115                 120                 125
Phe Val Asp Gln Thr Val Lys Val Tyr Gly Lys Asn Ser Phe Asp Trp
        130                 135                 140
Ile Gly Pro Ile Pro Arg Val Asn Ile Met Asn Pro Glu Glu Leu Lys
145                 150                 155                 160
Asp Val Phe Thr Lys Tyr Asp Asp Phe Ile Lys Pro Ile Ser Asn Pro
                165                 170                 175
Leu Phe Lys Leu Leu Ala Thr Gly Leu Ala Thr Tyr Glu Gly Glu Lys
                180                 185                 190
Trp Ala Lys His Arg Arg Ile Ile Asn Pro Thr Phe His Ser Glu Lys
            195                 200                 205
Leu Lys Arg Met Leu Pro Ser Phe His Gln Ser Cys Thr Glu Met Ile
        210                 215                 220
Lys Glu Trp Glu Ser Leu Val Ser Lys Glu Gly Ser Ser Cys Glu Leu
225                 230                 235                 240
```

-continued

```
Asp Val Trp Pro Phe Leu Glu Asn Met Thr Ala Asp Val Ile Ser Arg
            245                 250                 255
Thr Ala Phe Gly Thr Ser Tyr Lys Lys Gly Arg Lys Ile Phe Glu Leu
        260                 265                 270
Leu Arg Glu Gln Ala Ile Tyr Ala Thr Lys Ala Ile Gln Ser Phe Tyr
    275                 280                 285
Ile Pro Gly Trp Arg Phe Leu Pro Thr Lys Met Asn Lys Arg Met Lys
290                 295                 300
Glu Ile Asn Lys Glu Ile Lys Gly Leu Ile Lys Gly Ile Ile Ile Lys
305                 310                 315                 320
Arg Glu His Thr Ile Lys Ala Gly Glu Glu Thr Lys Asp Asp Leu Leu
                325                 330                 335
Gly Tyr Leu Met Glu Ser Asn Leu Lys Asp Ile Arg Glu His Gly Lys
            340                 345                 350
Asn Asn Lys Asn Phe Gly Met Ser Ile Glu Asp Val Ile Glu Glu Cys
        355                 360                 365
Lys Leu Phe Tyr Phe Ala Gly Gln Glu Thr Thr Ser Val Leu Leu Val
    370                 375                 380
Trp Thr Met Val Leu Leu Gly Gln Asn Gln Asn Trp Gln Asp Arg Ala
385                 390                 395                 400
Arg Gln Glu Ile Leu Gln Val Phe Gly Ser Asn Lys Pro Asp Phe Asp
                405                 410                 415
Gly Leu Thr His Leu Lys Val Val Thr Met Ile Leu Leu Glu Val Leu
            420                 425                 430
Arg Leu Tyr Pro Ala Val Ile Glu Leu Pro Arg Thr Ile His Lys Lys
        435                 440                 445
Thr Gln Leu Gly Lys Phe Ser Leu Pro Glu Gly Val Glu Val Arg Leu
    450                 455                 460
Pro Thr Leu Leu Ile His His Asp Lys Glu Leu Trp Gly Asp Asp Ala
465                 470                 475                 480
Asn Glu Phe Lys Pro Glu Arg Phe Ser Glu Gly Val Ser Lys Ala Thr
                485                 490                 495
Lys Ser Arg Leu Ser Phe Phe Pro Phe Gly Gly Pro Arg Ile Cys
            500                 505                 510
Ile Gly Gln Asn Phe Ala Met Met Glu Ala Lys Leu Ala Leu Val Leu
        515                 520                 525
Ile Leu Gln His Phe Thr Phe Glu Leu Ser Pro Ser Tyr Ala His Ala
    530                 535                 540
Pro Ser Tyr Arg Ile Thr Leu Gln Pro Gln Tyr Gly Val Pro Ile Ile
545                 550                 555                 560
Leu His Arg Arg
```

<210> SEQ ID NO 19
<211> LENGTH: 564
<212> TYPE: PRT
<213> ORGANISM: Artificial Sequence
<220> FEATURE:
<223> OTHER INFORMATION: Synthetic Construct

<400> SEQUENCE: 19

```
Met Gln Ser Thr Thr Ser Val Lys Leu Ser Pro Phe Asp Leu Met Thr
1               5                   10                  15
Ala Leu Leu Asn Gly Lys Val Ser Phe Asp Thr Ser Asn Thr Ser Asp
            20                  25                  30
```

-continued

```
Thr Asn Ile Pro Leu Ala Val Phe Met Glu Asn Arg Glu Leu Leu Met
         35                  40                  45

Ile Leu Thr Thr Ser Val Ala Val Leu Ile Gly Cys Val Val Leu
 50                  55                  60

Val Trp Val Leu Asp Trp Val Trp Leu Lys Pro Lys Leu Glu Arg
 65                  70                  75                  80

Cys Leu Arg Glu Gln Gly Leu Lys Gly Asn Ser Tyr Trp Phe Leu Tyr
                 85                  90                  95

Gly Asp Met Lys Glu Asn Ser Ile Leu Leu Lys Gln Ala Lys Ser Lys
                100                 105                 110

Pro Met Asn Leu Ser Thr Ser His Asp Ile Ala Pro Gln Val Ile Pro
                115                 120                 125

Phe Val Asp Gln Thr Val Lys Val Tyr Gly Lys Asn Ser Phe Asp Trp
130                 135                 140

Ile Gly Pro Ile Pro Arg Val Asn Ile Met Asn Pro Glu Glu Leu Lys
145                 150                 155                 160

Asp Val Phe Thr Lys Tyr Asp Asp Phe Ile Lys Pro Ile Ser Asn Pro
                165                 170                 175

Leu Phe Lys Leu Leu Ala Gly Gly Leu Ala Thr Tyr Glu Gly Glu Lys
                180                 185                 190

Trp Ala Lys His Arg Arg Ile Ile Asn Pro Thr Phe His Ser Glu Lys
                195                 200                 205

Leu Lys Arg Met Leu Pro Ser Phe His Gln Ser Cys Thr Glu Met Ile
                210                 215                 220

Lys Glu Trp Glu Ser Leu Val Ser Lys Glu Gly Ser Ser Cys Glu Leu
225                 230                 235                 240

Asp Val Trp Pro Phe Leu Glu Asn Met Thr Ala Asp Val Ile Ser Arg
                245                 250                 255

Thr Ala Phe Gly Thr Ser Tyr Lys Lys Gly Arg Lys Ile Phe Glu Leu
                260                 265                 270

Leu Arg Glu Gln Ala Ile Tyr Ala Thr Lys Ala Ile Gln Ser Phe Tyr
                275                 280                 285

Ile Pro Gly Trp Arg Phe Leu Pro Thr Lys Met Asn Lys Arg Met Lys
                290                 295                 300

Glu Ile Asn Lys Glu Ile Lys Gly Leu Ile Lys Gly Ile Ile Lys
305                 310                 315                 320

Arg Glu His Thr Ile Lys Ala Gly Glu Glu Thr Lys Asp Asp Leu Leu
                325                 330                 335

Gly Tyr Leu Met Glu Ser Asn Leu Lys Asp Ile Arg Glu His Gly Lys
                340                 345                 350

Asn Asn Lys Asn Phe Gly Met Ser Ile Glu Asp Val Ile Glu Glu Cys
                355                 360                 365

Lys Leu Phe Tyr Phe Ala Gly Gln Glu Thr Thr Ser Val Leu Leu Val
                370                 375                 380

Trp Thr Met Val Leu Leu Gly Gln Asn Gln Asn Trp Gln Asp Arg Ala
385                 390                 395                 400

Arg Gln Glu Ile Leu Gln Val Phe Gly Ser Asn Lys Pro Asp Phe Asp
                405                 410                 415

Gly Leu Thr His Leu Lys Val Val Thr Met Ile Leu Leu Glu Val Leu
                420                 425                 430

Arg Leu Tyr Pro Ala Val Ile Glu Leu Pro Arg Thr Ile His Lys Lys
                435                 440                 445

Thr Gln Leu Gly Lys Phe Ser Leu Pro Glu Gly Val Glu Val Arg Leu
```

```
                450             455             460
Pro Thr Leu Leu Ile His His Asp Lys Glu Leu Trp Gly Asp Asp Ala
465                 470                 475                 480

Asn Glu Phe Lys Pro Glu Arg Phe Ser Glu Val Ser Lys Ala Thr
                485                 490                 495

Lys Ser Arg Leu Ser Phe Phe Pro Phe Gly Ala Gly Pro Arg Ile Cys
            500                 505                 510

Ile Gly Gln Asn Phe Ala Met Met Glu Ala Lys Leu Ala Leu Val Leu
        515                 520                 525

Ile Leu Gln His Phe Thr Phe Glu Leu Ser Pro Ser Tyr Ala His Ala
    530                 535                 540

Pro Ser Tyr Arg Ile Thr Leu Gln Pro Gln Tyr Gly Val Pro Ile Ile
545                 550                 555                 560

Leu His Arg Arg

<210> SEQ ID NO 20
<211> LENGTH: 564
<212> TYPE: PRT
<213> ORGANISM: Artificial Sequence
<220> FEATURE:
<223> OTHER INFORMATION: Synthetic Construct

<400> SEQUENCE: 20

Met Gln Ser Thr Thr Ser Val Lys Leu Ser Pro Phe Asp Leu Met Thr
1               5                   10                  15

Ala Leu Leu Asn Gly Lys Val Ser Phe Asp Thr Ser Asn Thr Ser Asp
            20                  25                  30

Thr Asn Ile Pro Leu Ala Val Phe Met Glu Asn Arg Glu Leu Leu Met
        35                  40                  45

Ile Leu Thr Thr Ser Val Ala Val Leu Ile Gly Cys Val Val Val Leu
    50                  55                  60

Val Trp Val Leu Asp Trp Val Trp Leu Lys Pro Lys Lys Leu Glu Arg
65                  70                  75                  80

Cys Leu Arg Glu Gln Gly Leu Lys Gly Asn Ser Tyr Thr Phe Leu Tyr
                85                  90                  95

Gly Asp Met Lys Glu Asn Ser Ile Leu Leu Lys Gln Ala Lys Ser Lys
            100                 105                 110

Pro Met Asn Leu Ser Thr Ser His Asp Ile Ala Pro Gln Val Ile Pro
        115                 120                 125

Phe Val Asp Gln Thr Val Lys Val Tyr Gly Lys Asn Ser Phe Asp Trp
    130                 135                 140

Ile Gly Pro Ile Pro Arg Val Asn Ile Met Asn Pro Glu Glu Leu Lys
145                 150                 155                 160

Asp Val Phe Thr Lys Tyr Asp Asp Phe Ile Lys Pro Ile Ser Asn Pro
                165                 170                 175

Leu Phe Lys Leu Leu Ala Gly Gly Leu Ala Thr Tyr Glu Gly Glu Lys
            180                 185                 190

Trp Ala Lys His Arg Arg Ile Ile Asn Pro Thr Phe His Ser Glu Lys
        195                 200                 205

Leu Lys Arg Met Leu Pro Ser Phe His Gln Ser Cys Thr Glu Met Ile
    210                 215                 220

Lys Glu Trp Glu Ser Leu Val Ser Lys Glu Gly Ser Ser Cys Glu Leu
225                 230                 235                 240

Asp Val Trp Pro Phe Leu Glu Asn Met Thr Ala Asp Val Ile Ser Arg
                245                 250                 255
```

```
Thr Ala Phe Gly Thr Ser Tyr Lys Lys Gly Arg Lys Ile Phe Glu Leu
            260                 265                 270

Leu Arg Glu Gln Ala Ile Tyr Ala Thr Lys Ala Ile Gln Ser Phe Tyr
        275                 280                 285

Ile Pro Gly Trp Arg Phe Leu Pro Thr Lys Met Asn Lys Arg Met Lys
    290                 295                 300

Glu Ile Asn Lys Glu Ile Lys Gly Leu Ile Lys Gly Ile Ile Lys
305                 310                 315                 320

Arg Glu His Thr Ile Lys Ala Gly Glu Glu Thr Lys Asp Asp Leu Leu
                325                 330                 335

Gly Tyr Leu Met Glu Ser Asn Leu Lys Asp Ile Arg Glu His Gly Lys
            340                 345                 350

Asn Asn Lys Asn Phe Gly Met Ser Ile Glu Asp Val Ile Glu Glu Cys
        355                 360                 365

Lys Leu Phe Tyr Phe Ala Gly Gln Glu Thr Thr Ser Val Leu Leu Val
    370                 375                 380

Trp Thr Met Val Leu Leu Gly Gln Asn Gln Asn Trp Gln Asp Arg Ala
385                 390                 395                 400

Arg Gln Glu Ile Leu Gln Val Phe Gly Ser Asn Lys Pro Asp Phe Asp
                405                 410                 415

Gly Leu Thr His Leu Lys Val Val Thr Met Ile Leu Leu Glu Val Leu
            420                 425                 430

Arg Leu Tyr Pro Ala Val Ile Glu Leu Pro Arg Thr Ile His Lys Lys
        435                 440                 445

Thr Gln Leu Gly Lys Phe Ser Leu Pro Glu Gly Val Glu Val Arg Leu
    450                 455                 460

Pro Thr Leu Leu Ile His His Asp Lys Glu Leu Trp Gly Asp Ala
465                 470                 475                 480

Asn Glu Phe Lys Pro Glu Arg Phe Ser Glu Gly Val Ser Lys Ala Thr
                485                 490                 495

Lys Ser Arg Leu Ser Phe Phe Pro Phe Gly Gly Pro Arg Ile Cys
            500                 505                 510

Ile Gly Gln Asn Phe Ala Met Met Glu Ala Lys Leu Ala Leu Val Leu
        515                 520                 525

Ile Leu Gln His Phe Thr Phe Glu Leu Ser Pro Ser Tyr Ala His Ala
    530                 535                 540

Pro Ser Tyr Arg Ile Thr Leu Gln Pro Gln Tyr Gly Val Pro Ile Ile
545                 550                 555                 560

Leu His Arg Arg

<210> SEQ ID NO 21
<211> LENGTH: 564
<212> TYPE: PRT
<213> ORGANISM: Artificial Sequence
<220> FEATURE:
<223> OTHER INFORMATION: Synthetic Construct

<400> SEQUENCE: 21

Met Gln Ser Thr Thr Ser Val Lys Leu Ser Pro Phe Asp Leu Met Thr
1               5                   10                  15

Ala Leu Leu Asn Gly Lys Val Ser Phe Asp Thr Ser Asn Thr Ser Asp
            20                  25                  30

Thr Asn Ile Pro Leu Ala Val Phe Met Glu Asn Arg Glu Leu Leu Met
        35                  40                  45
```

```
Ile Leu Thr Thr Ser Val Ala Val Leu Ile Gly Cys Val Val Leu
 50                  55                  60

Val Trp Val Leu Asp Trp Val Trp Leu Lys Pro Lys Lys Leu Glu Arg
 65                  70                  75                  80

Cys Leu Arg Glu Gln Gly Leu Lys Gly Asn Ser Tyr Thr Phe Leu Tyr
                 85                  90                  95

Gly Asp Met Lys Glu Asn Ser Ile Leu Leu Lys Gln Ala Lys Ser Lys
                100                 105                 110

Pro Met Asn Leu Ser Thr Ser His Asp Ile Ala Pro Gln Val Ile Pro
                115                 120                 125

Phe Val Asp Gln Thr Val Lys Val Tyr Gly Lys Asn Ser Phe Asp Trp
                130                 135                 140

Ile Gly Pro Ile Pro Arg Val Asn Ile Met Asn Pro Glu Glu Leu Lys
145                 150                 155                 160

Asp Val Phe Thr Lys Tyr Asp Asp Phe Ile Lys Pro Ile Ser Asn Pro
                165                 170                 175

Leu Phe Lys Leu Leu Ala Gly Gly Leu Ala Thr Tyr Glu Gly Glu Lys
                180                 185                 190

Trp Ala Lys His Arg Arg Ile Ile Asn Pro Thr Phe His Ser Glu Lys
                195                 200                 205

Leu Lys Arg Met Leu Pro Ser Phe His Gln Ser Cys Thr Glu Met Ile
                210                 215                 220

Lys Glu Trp Glu Ser Leu Val Ser Lys Glu Gly Ser Ser Cys Glu Leu
225                 230                 235                 240

Asp Val Trp Pro Phe Leu Glu Asn Met Thr Ala Asp Val Ile Ser Arg
                245                 250                 255

Thr Ala Phe Gly Thr Ser Tyr Lys Lys Gly Arg Lys Ile Phe Glu Leu
                260                 265                 270

Leu Arg Glu Gln Ala Ile Tyr Ala Thr Lys Ala Ile Gln Ser Phe Tyr
                275                 280                 285

Ile Pro Gly Trp Arg Phe Leu Pro Thr Lys Met Asn Lys Arg Met Lys
                290                 295                 300

Glu Ile Asn Lys Glu Ile Lys Gly Leu Ile Lys Gly Ile Ile Ile Lys
305                 310                 315                 320

Arg Glu His Thr Ile Lys Ala Gly Glu Glu Thr Lys Asp Asp Leu Leu
                325                 330                 335

Gly Tyr Leu Met Glu Ser Asn Leu Lys Asp Ile Arg Glu His Gly Lys
                340                 345                 350

Asn Asn Lys Asn Phe Gly Met Ser Ile Glu Asp Val Ile Glu Glu Cys
                355                 360                 365

Lys Leu Phe Tyr Phe Ala Gly Gln Glu Thr Thr Ser Val Leu Leu Val
                370                 375                 380

Trp Thr Met Val Leu Leu Gly Gln Asn Gln Asn Trp Gln Asp Arg Ala
385                 390                 395                 400

Arg Gln Glu Ile Leu Gln Val Phe Gly Ser Asn Lys Pro Asp Phe Asp
                405                 410                 415

Gly Leu Thr His Leu Lys Val Val Thr Met Ile Leu Leu Glu Val Leu
                420                 425                 430

Arg Leu Tyr Pro Ala Val Ile Glu Leu Pro Arg Thr Ile His Lys Lys
                435                 440                 445

Thr Gln Leu Gly Lys Phe Ser Leu Pro Glu Gly Val Glu Val Arg Leu
450                 455                 460

Pro Thr Leu Leu Ile His His Asp Lys Glu Leu Trp Gly Asp Asp Ala
```

```
              465                 470                 475                 480
Asn Glu Phe Lys Pro Glu Arg Phe Ser Glu Gly Val Ser Lys Ala Thr
                485                 490                 495

Lys Ser Arg Leu Ser Phe Phe Pro Phe Gly Ala Gly Pro Arg Ile Cys
                500                 505                 510

Ile Gly Gln Asn Phe Ala Met Met Glu Ala Lys Leu Ala Leu Val Leu
                515                 520                 525

Ile Leu Gln His Phe Thr Phe Glu Leu Ser Pro Ser Tyr Ala His Ala
                530                 535                 540

Pro Ser Tyr Arg Ile Thr Leu Gln Pro Gln Tyr Gly Val Pro Ile Ile
545                 550                 555                 560

Leu His Arg Arg

<210> SEQ ID NO 22
<211> LENGTH: 66
<212> TYPE: PRT
<213> ORGANISM: Artificial Sequence
<220> FEATURE:
<223> OTHER INFORMATION: Synthetic Construct

<400> SEQUENCE: 22

Met Gln Ser Thr Thr Ser Val Lys Leu Ser Pro Phe Asp Leu Met Thr
1               5                   10                  15

Ala Leu Leu Asn Gly Lys Val Ser Phe Asp Thr Ser Asn Thr Ser Asp
                20                  25                  30

Thr Asn Ile Pro Leu Ala Val Phe Met Glu Asn Arg Glu Leu Leu Met
            35                  40                  45

Ile Leu Thr Thr Ser Val Ala Val Leu Ile Gly Cys Val Val Val Leu
        50                  55                  60

Val Trp
65

<210> SEQ ID NO 23
<211> LENGTH: 462
<212> TYPE: PRT
<213> ORGANISM: Oryza sativa

<400> SEQUENCE: 23

Met Asp Ser Gly Tyr Ser Ser Ser Tyr Ala Ala Ala Gly Met His
1               5                   10                  15

Val Val Ile Cys Pro Trp Leu Ala Phe Gly His Leu Leu Pro Cys Leu
                20                  25                  30

Asp Leu Ala Gln Arg Leu Ala Ser Arg Gly His Arg Val Ser Phe Val
            35                  40                  45

Ser Thr Pro Arg Asn Ile Ser Arg Leu Pro Pro Val Arg Pro Ala Leu
        50                  55                  60

Ala Pro Leu Val Ala Phe Val Ala Leu Pro Leu Pro Arg Val Glu Gly
65                  70                  75                  80

Leu Pro Asp Gly Ala Glu Ser Thr Asn Asp Val Pro His Asp Arg Pro
                85                  90                  95

Asp Met Val Glu Leu His Arg Arg Ala Phe Asp Gly Leu Ala Ala Pro
                100                 105                 110

Phe Ser Glu Phe Leu Gly Thr Ala Cys Ala Asp Trp Val Ile Val Asp
            115                 120                 125

Val Phe His His Trp Ala Ala Ala Ala Ala Leu Glu His Lys Val Pro
        130                 135                 140
```

```
Cys Ala Met Met Leu Leu Gly Ser Ala His Met Ile Ala Ser Ile Ala
145                 150                 155                 160

Asp Arg Arg Leu Glu Arg Ala Glu Thr Glu Ser Pro Ala Ala Ala Gly
            165                 170                 175

Gln Gly Arg Pro Ala Ala Pro Thr Phe Glu Val Ala Arg Met Lys
            180                 185                 190

Leu Ile Arg Thr Lys Gly Ser Ser Gly Met Ser Leu Ala Glu Arg Phe
            195                 200                 205

Ser Leu Thr Leu Ser Arg Ser Ser Leu Val Val Gly Arg Ser Cys Val
            210                 215                 220

Glu Phe Glu Pro Glu Thr Val Pro Leu Leu Ser Thr Leu Arg Gly Lys
225                 230                 235                 240

Pro Ile Thr Phe Leu Gly Leu Met Pro Pro Leu His Glu Gly Arg Arg
            245                 250                 255

Glu Asp Gly Glu Asp Ala Thr Val Arg Trp Leu Asp Ala Gln Pro Ala
            260                 265                 270

Lys Ser Val Val Tyr Val Ala Leu Gly Ser Glu Val Pro Leu Gly Val
            275                 280                 285

Glu Lys Val His Glu Leu Ala Leu Gly Leu Glu Leu Ala Gly Thr Arg
            290                 295                 300

Phe Leu Trp Ala Leu Arg Lys Pro Thr Gly Val Ser Asp Ala Asp Leu
305                 310                 315                 320

Leu Pro Ala Gly Phe Glu Glu Arg Thr Arg Gly Arg Gly Val Val Ala
            325                 330                 335

Thr Arg Trp Val Pro Gln Met Ser Ile Leu Ala His Ala Ala Val Gly
            340                 345                 350

Ala Phe Leu Thr His Cys Gly Trp Asn Ser Thr Ile Glu Gly Leu Met
            355                 360                 365

Phe Gly His Pro Leu Ile Met Leu Pro Ile Phe Gly Asp Gln Gly Pro
            370                 375                 380

Asn Ala Arg Leu Ile Glu Ala Lys Asn Ala Gly Leu Gln Val Ala Arg
385                 390                 395                 400

Asn Asp Gly Asp Gly Ser Phe Asp Arg Glu Gly Val Ala Ala Ala Ile
            405                 410                 415

Arg Ala Val Ala Val Glu Glu Glu Ser Ser Lys Val Phe Gln Ala Lys
            420                 425                 430

Ala Lys Lys Leu Gln Glu Ile Val Ala Asp Met Ala Cys His Glu Arg
            435                 440                 445

Tyr Ile Asp Gly Phe Ile Gln Gln Leu Arg Ser Tyr Lys Asp
450                 455                 460
```